(12) United States Patent
Rahman et al.

(10) Patent No.: US 12,375,149 B2
(45) Date of Patent: Jul. 29, 2025

(54) CHANNEL STATE INFORMATION REPORTING

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 18/506,025

(22) Filed: Nov. 9, 2023

(65) Prior Publication Data

US 2024/0204845 A1 Jun. 20, 2024

Related U.S. Application Data

(60) Provisional application No. 63/460,537, filed on Apr. 19, 2023, provisional application No. 63/460,246, filed on Apr. 18, 2023, provisional application No. 63/459,856, filed on Apr. 17, 2023, provisional application No. 63/455,169, filed on Mar. 28, 2023, provisional application No. 63/454,537, filed on Mar. 24, 2023, provisional application No. 63/451,147, filed on Mar. 9, 2023, provisional application No. 63/448,583, filed on Feb. 27, 2023, provisional application No. 63/443,275, filed on Feb. 3, 2023, provisional application No. 63/425,180, filed on Nov. 14, 2022.

(51) Int. Cl.
*H04B 7/06* (2006.01)

(52) U.S. Cl.
CPC ......... *H04B 7/0626* (2013.01); *H04B 7/0639* (2013.01)

(58) Field of Classification Search
CPC ............................ H04B 7/0626; H04B 7/0639
See application file for complete search history.

(56) References Cited

U.S. PATENT DOCUMENTS

2021/0028823 A1* 1/2021 Park ...................... H04W 80/02
2021/0211173 A1* 7/2021 Rahman .................... H04J 1/16
(Continued)

FOREIGN PATENT DOCUMENTS

| WO | 2022137048 A1 | 6/2022 |
| WO | 2022219544 A2 | 10/2022 |

OTHER PUBLICATIONS

"3rd Generation Partnership Project; Technical Specification Group Radio Access Network; Evolved Universal Terrestrial Radio Access (E-UTRA); Physical channels and modulation (Release 17)," 3GPP TS 36.211 V17.0.0, Dec. 2021, 250 pages.
(Continued)

*Primary Examiner* — Jaison Joseph

(57) ABSTRACT

Apparatuses and method for channel state information (CSI) reporting. A method performed by a user equipment (UE) includes receiving a configuration about a channel state information (CSI) report. The configuration indicates (i) a value of $N_4$, (ii) a value of paramCombination indicating values of three parameters, and (iii) a codebookType. The method further includes determining the CSI report based on the configuration and transmitting the CSI report. Here, $N_4$ is a number of time-domain (TD) slot intervals.

20 Claims, 14 Drawing Sheets

(56) References Cited

U.S. PATENT DOCUMENTS

| | | | | |
|---|---|---|---|---|
| 2021/0297134 A1* | 9/2021 | Rahman | ............... | H04B 7/0632 |
| 2022/0116090 A1* | 4/2022 | Rahman | ............... | H04B 7/0626 |
| 2022/0329303 A1* | 10/2022 | Rahman | ............... | H04L 5/0048 |
| 2024/0204845 A1* | 6/2024 | Rahman | ................ | H04B 7/048 |
| 2024/0305434 A1* | 9/2024 | Rahman | ............... | H04B 7/0632 |
| 2025/0038812 A1* | 1/2025 | Lin | ....................... | H04W 76/28 |

OTHER PUBLICATIONS

"3rd Generation Partnership Project; Technical Specification Group Radio Access Network; Evolved Universal Terrestrial Radio Access (E-UTRA); Multiplexing and channel coding (Release 17)," 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)," 3GPP TS 36.213 V17.0.0, Dec. 2021, 582 pages.

"3rd Generation Partnership Project; Technical Specification Group Radio Access Network; Evolved Universal Terrestrial Radio Access (E-UTRA); Medium Access Control (MAC) protocol specification (Release 17)," 3GPP TS 36.321 V17.0.0, Mar. 2022, 146 pages.

"3rd Generation Partnership Project; Technical Specification Group Radio Access Network; Evolved Universal Terrestrial Radio Access (E-UTRA); Radio Resource Control (RRC); Protocol specification (Release 17)," 3GPP TS 36.331 V17.0.0, Mar. 2022, 1119 pages.

"3rd Generation Partnership Project; Technical Specification Group Services and System Aspects; Feasibility Study on New Services and Markets Technology Enablers; Stage 1 (Release 14)," 3GPP TR 22.891 V1.2.0, Nov. 2015, 96 pages.

"3rd Generation Partnership Project; Technical Specification Group Radio Access Network; NR; Multiplexing and channel coding (Release 17)," 3GPP TS 38.212 V17.0.0, Dec. 2021, 190 pages.

"3rd Generation Partnership Project; Technical Specification Group Radio Access Network; NR; Physical layer procedures for data (Release 17)," 3GPP TS 38.214 V17.0.0, Dec. 2021, 217 pages.

Fraunhofer IIS et al., "Measurement results on Doppler spectrum for various UE mobility environments and related CSI enhancements", 3GPP TSG RAN WG#86, RP-192978, Dec. 2019, 13 pages.

"3rd Generation Partnership Project; Technical Specification Group Radio Access Network; NR; Physical channels and modulation (Release 17)," 3GPP TS 38.211 V17.0.0, Dec. 2021, 134 pages.

International Search Report and Written Opinion issued Feb. 29, 2024 regarding International Application No. PCT/KR2023/018194, 7 pages.

Xiaomi, "Views on CSI enhancement for high/medium UE velocities and CJT", 3GPP TSG RAN WG1 #111, R1-2211336, Nov. 2022, 15 pages.

ZTE, "CSI enhancement for high/medium UE velocities and CJT", 3GPP TSG RAN WG1 Meeting #111, R1-2210937, Nov. 2022, 26 pages.

Lenovo, "CSI enhancements for high mobility and coherent JT", 3GPP TSG RAN WG1 #111, R1-2211292, Nov. 2022, 21 pages.

* cited by examiner

CHANNEL STATE INFORMATION REPORTING

CROSS-REFERENCE TO RELATED AND CLAIM OF PRIORITY

The present application claims priority under 35 U.S.C. § 119(e) to U.S. Provisional Patent Application No. 63/425,180 filed on Nov. 14, 2022; U.S. Provisional Patent Application No. 63/443,275 filed on Feb. 3, 2023; U.S. Provisional Patent Application No. 63/448,583 filed on Feb. 27, 2023; U.S. Provisional Patent Application No. 63/451,147 filed on Mar. 9, 2023; U.S. Provisional Patent Application No. 63/454,537 filed on Mar. 24, 2023; U.S. Provisional Patent Application No. 63/455,169 filed on Mar. 28, 2023; Provisional Patent Application No. 63/459,856 filed on Apr. 17, 2023; U.S. Provisional Patent Application No. 63/460,246 filed on Apr. 18, 2023; and U.S. Provisional Patent Application No. 63/460,537 filed on Apr. 19, 2023, which are hereby incorporated by reference in their entirety.

TECHNICAL FIELD

The present disclosure relates generally to wireless communication systems and, more specifically, the present disclosure is related to apparatuses and method for channel state information (CSI) reporting.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to CSI reporting.

In one embodiment, a user equipment (UE) is provided. The UE includes a transceiver configured to receive a configuration about a CSI report. The configuration indicates (i) a value of $N_4$, (ii) a value of paramCombination indicating values of three parameters, and (iii) a codebookType. The UE further includes a processor operably coupled to the transceiver. The processor, based on the configuration, configured to determine the CSI report. The transceiver is further configured to transmit the CSI report. Here, $N_4$ is a number of time-domain (TD) slot intervals.

In another embodiment, a base station (BS) is provided. The BS includes a processor and a transceiver operably coupled to the processor. The transceiver is configured to transmit a configuration about a CSI report and receive the CSI report. The configuration indicating (i) a value of $N_4$, (ii) a value of paramCombination indicating values of three parameters, and (iii) a codebookType. Here, $N_4$ is a number of TD slot intervals.

In yet another embodiment, a method performed by a UE is provided. The method includes receiving a configuration about a CSI report. The configuration indicates (i) a value of $N_4$, (ii) a value of paramCombination indicating values of three parameters, and (iii) a codebookType. The method further includes determining the CSI report based on the configuration and transmitting the CSI report. Here, $N_4$ is a number of TD slot intervals.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
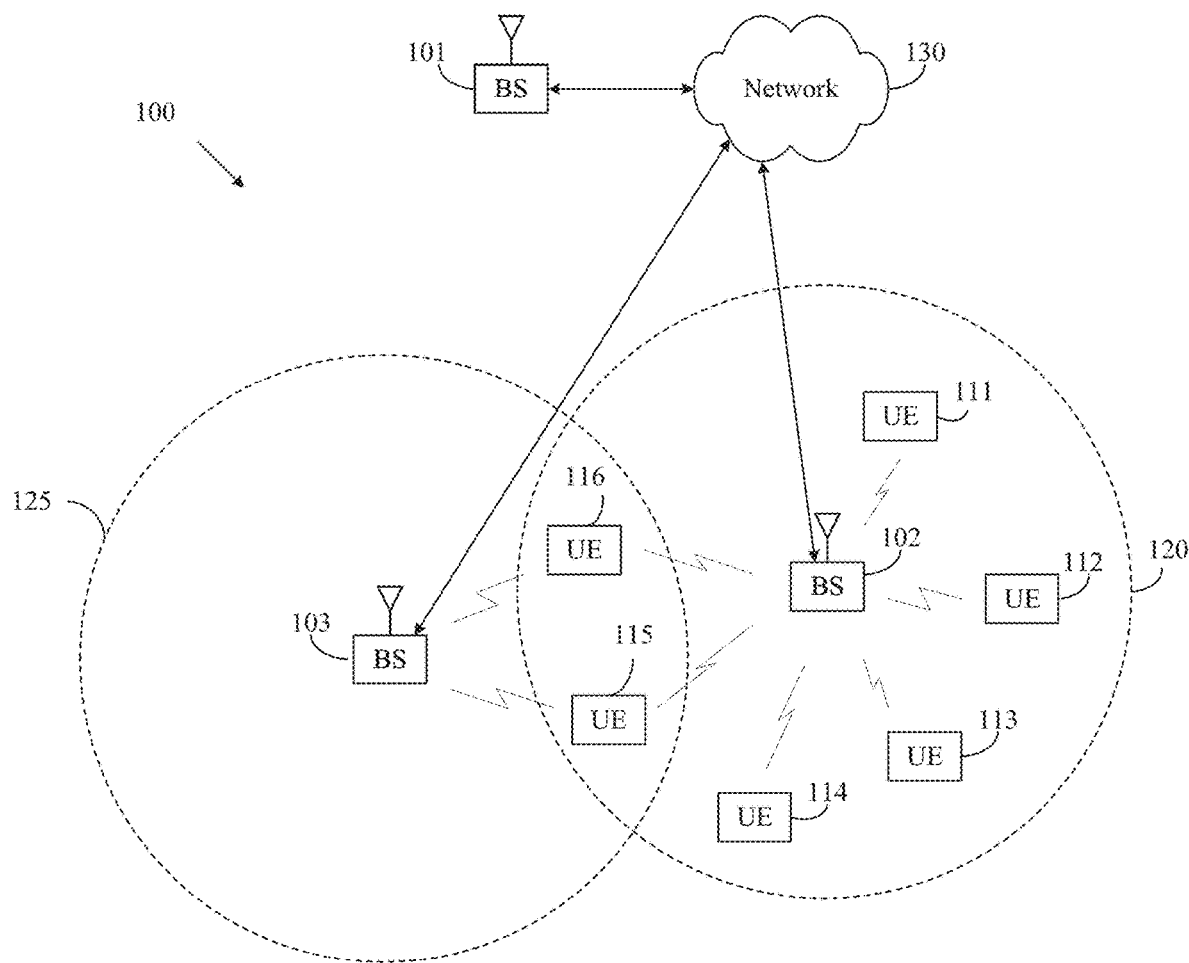
FIG. 1 illustrates an example wireless network according to embodiments of the present disclosure.

FIGS. 1-20, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 36.211 v17.0.0, "E-UTRA, Physical channels and modulation;" [2] 3GPP TS 36.212 v17.0.0, "E-UTRA, Multiplexing and Channel coding;" [3] 3GPP TS 36.213 v17.0.0, "E-UTRA, Physical Layer Procedures;" [4] 3GPP TS 36.321 v17.0.0, "E-UTRA, Medium Access Control (MAC) protocol specification;" [5] 3GPP TS 36.331 v17.0.0, "E-UTRA, Radio Resource Control (RRC) Protocol Specification;" [6] 3GPP TR 22.891 v1.2.0; [7] 3GPP TS 38.212 v17.0.0, "E-UTRA, NR, Multiplexing and Channel coding;" [8] 3GPP TS 38.214 v17.0.0, "E-UTRA, NR, Physical layer procedures for data;" [9] RP-192978, "Measurement results on Doppler spectrum for various UE mobility environments and related CSI enhancements," Fraunhofer IIS, Fraunhofer HHI, Deutsche Telekom; and 3GPP TS 38.211 v17.0.0, "E-UTRA, NR, Physical channels and modulation".

Figure 2:
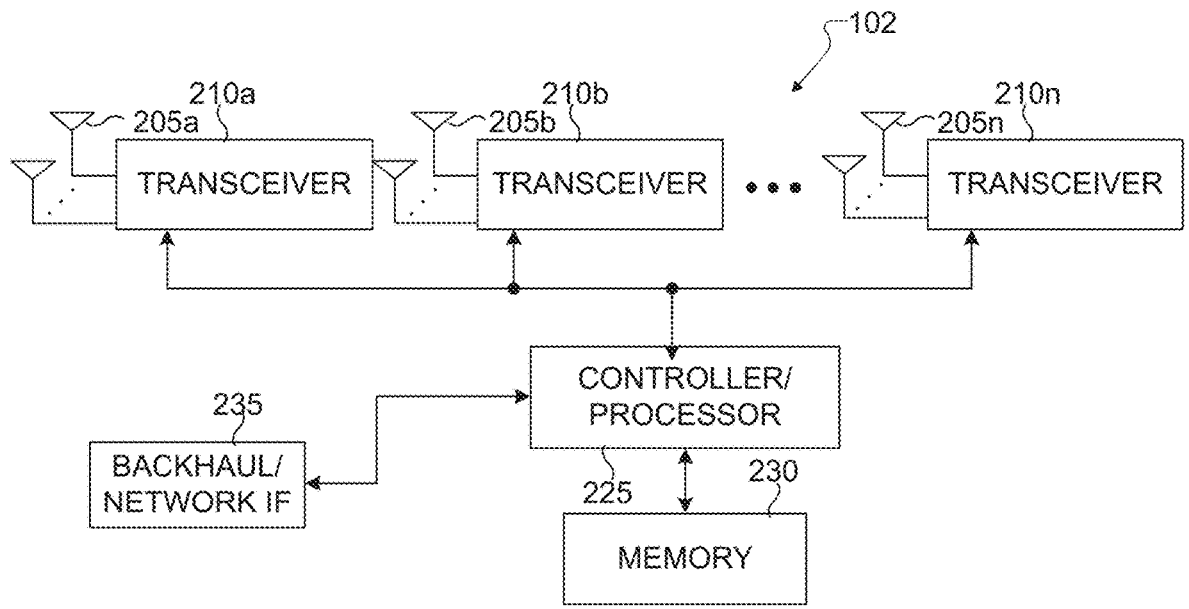
FIG. 2 illustrates an example gNodeB (gNB) according to embodiments of the present disclosure.
Figure 3:
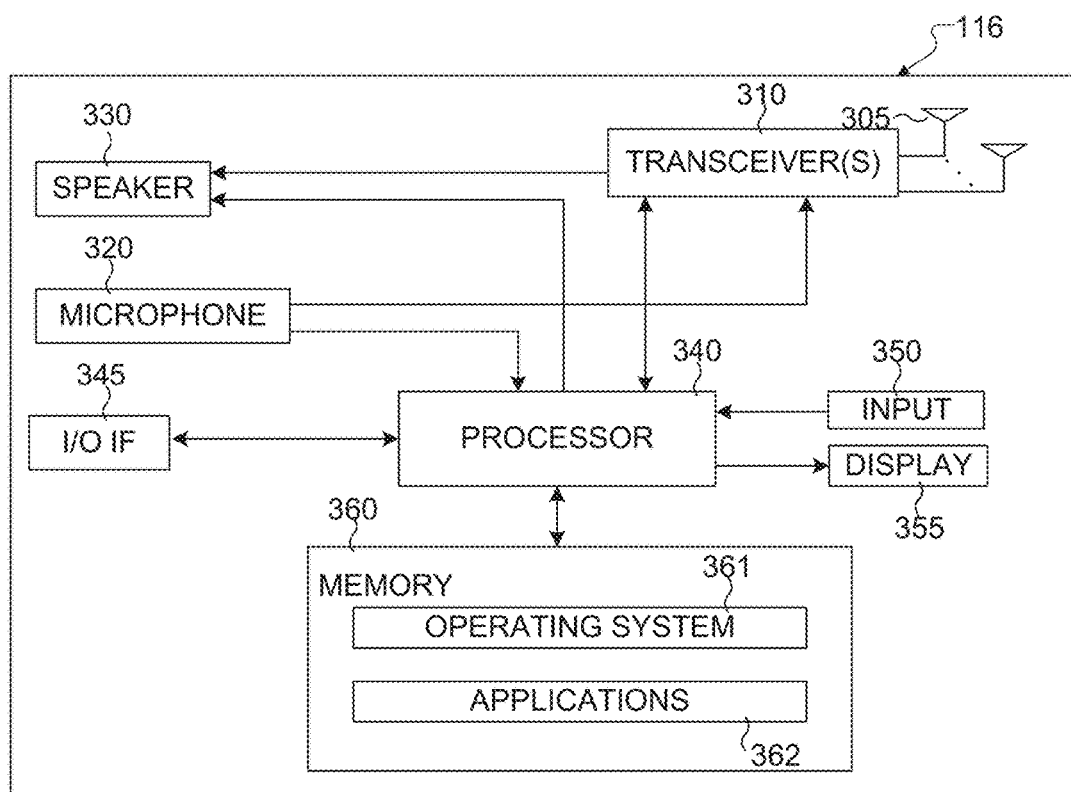
FIG. 3 illustrates an example UE according to embodiments of the present disclosure.

FIGS. 1-20 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of the present disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3' generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for CSI reporting. In certain embodiments, one or more of the BSs 101-103 include circuitry, programing, or a combination thereof to support CSI reporting.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the wireless network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for CSI reporting. Any of a wide variety of other functions could be supported in the gNB 102 by the controller/processor 225.

The controller/processor 225 is also capable of executing programs and other processes resident in the memory 230, such as processes to support CSI reporting. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for CSI reporting as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
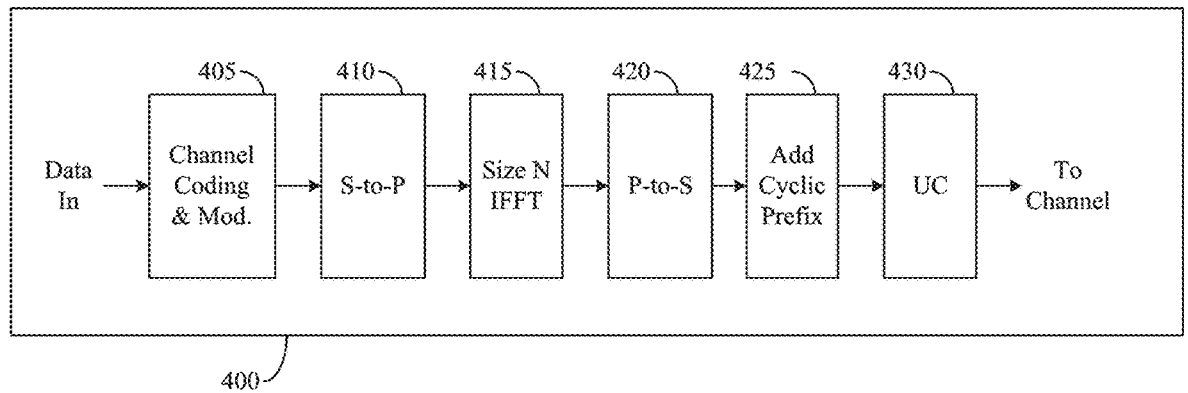
FIGS. 4A and 4B illustrate an example of a wireless transmit and receive paths according to embodiments of the present disclosure.
Figure 4B:
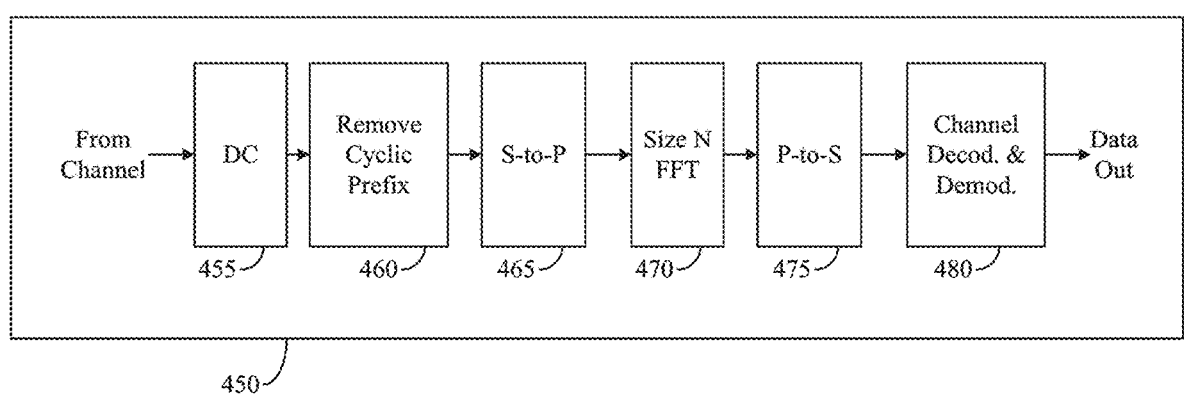

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the transmit path 400 is configured to perform CSI reporting as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S)

block 420, an add cyclic prefix block 425, and an up-converter (UC) 430. The receive path 450 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5:
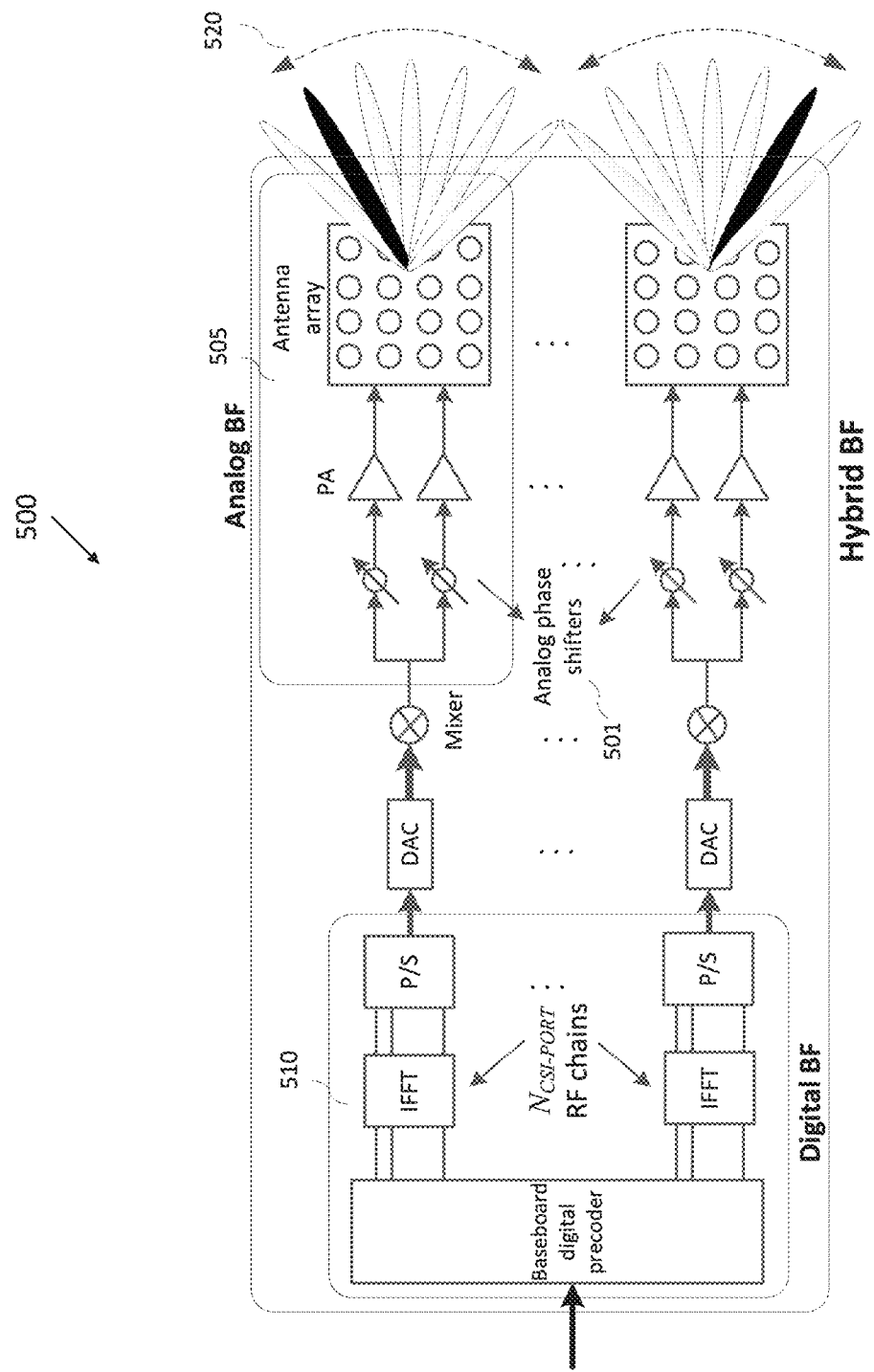
FIG. 5 illustrates an example of a transmitter structure for beamforming according to embodiments of the present disclosure.

FIG. 5 illustrates an example of a transmitter structure 500 for beamforming according to embodiments of the present disclosure. In certain embodiments, one or more of gNB 102 or UE 116 includes the transmitter structure 500. For example, one or more of antenna 205 and its associated systems or antenna 305 and its associated systems can be included in transmitter structure 500. This example is for illustration only and other embodiments can be used without departing from the scope of the present disclosure.

Accordingly, embodiments of the present disclosure recognize that Rel-14 LTE and Rel-15 NR support up to 32 CSI reference signal (CSI-RS) antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is the same as the number of CSI-RS ports NCSI-PORT. A digital beamforming unit 510 performs a linear combination across NCSI-PORT analog beams to further increase a precoding gain. While analog beams are wideband (hence not frequency-selective), digital precoding can be varied across frequency sub-bands or resource blocks. Receiver operation can be conceived analogously.

Since the transmitter structure 500 of FIG. 5 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 5 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are essential to compensate for the additional path loss.

To enable digital precoding, efficient design of CSI-RS is a crucial factor. For this reason, three types of CSI reporting mechanism corresponding to three types of CSI-RS measurement can be evaluated: 1) 'CLASS A' CSI reporting which corresponds to non-precoded CSI-RS, 2) 'CLASS B' reporting with K=1 CSI-RS resource which corresponds to UE-specific beamformed CSI-RS, and 3) 'CLASS B' reporting with K>1 CSI-RS resources which corresponds to cell-specific beamformed CSI-RS. For non-precoded (NP) CSI-RS, a cell-specific one-to-one mapping between CSI-RS port and transceiver unit (TXRU) is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (including multiple ports). Here, (at least at a given time/frequency) CSI-RS ports have narrow beam widths and hence not cell wide coverage, and (at least from the eNB (or gNB) perspective) at least some CSI-RS port-resource combinations have different beam directives.

In scenarios where DL long-term channel statistics can be measured through UL signals at a serving eNodeB, UE-specific beamforming (BF) CSI-RS can be readily used. This is typically feasible when UL-DL duplex distance is sufficiently small. However, when this condition does not hold, some UE feedback is essential for the eNodeB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

The present disclosure relates generally to wireless communication systems and, more specifically, to compression-based CSI reporting.

A communication system includes a downlink (DL) that conveys signals from transmission points such as Base Stations (BSs) or NodeBs to User Equipments (UEs) and an UpLink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE, DL signals can include data signals conveying information content, control signals conveying DL Control Information (DCI), and Reference Signals (RS) that are also known as pilot signals. An eNodeB transmits data information through a Physical DL Shared Channel (PDSCH). An eNodeB transmits DCI through a Physical DL Control Channel (PDCCH) or an Enhanced PDCCH (EPDCCH)—see also document and standard [3]. An eNodeB transmits acknowledgement information in response to data Transport Block (TB) transmission from a UE in a Physical Hybrid Automatic Repeat Request Indicator Channel (PHICH). An eNodeB transmits one or more of multiple types of RS including a UE-Common RS (CRS), a Channel State Information RS (CSI-RS), or a DeModulation RS (DMRS). A CRS is transmitted over a DL system BandWidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe (or slot) and can have, for example, duration of 1 millisecond.

DL signals also include transmission of a logical channel that carries system control information. A broadcast control channel (BCCH) is mapped to either a transport channel referred to as a Broadcast Channel (BCH) when it conveys a Master Information Block (MIB) or to a DL Shared Channel (DL-SCH) when it conveys a System Information Block (SIB)—see also document and standard [3] and document and standard [5]. Most system information is included in different SIBs that are transmitted using DL-SCH. A presence of system information on a DL-SCH in a subframe (or slot) can be indicated by a transmission of a corresponding PDCCH conveying a codeword with a cyclic redundancy check (CRC) scrambled with a special System Information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe (or slot) and a group of Physical resource blocks (PRBs). A transmission BW incudes frequency resource units referred to as Resource Blocks (RBs). Each RB includes $N_{sc}^{RB}$ sub-carriers, or Resource Elements (REs), such as 12 REs. A unit of one RB over one subframe (or slot) is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL Control Information (UCI), and UL RS. UL RS includes DMRS and Sounding RS (SRS). A UE transmits DMRS only in a BW of a respective PUSCH or Physical UL Control Channel (PUCCH). An eNodeB can use a DMRS to demodulate data signals or UCI signals. A UE transmits SRS to provide an eNodeB with an UL CSI. A UE transmits data information or UCI through a respective PUSCH or a PUCCH. If a UE requires to transmit data information and UCI in a same UL subframe (or slot), it may multiplex both in a PUSCH. UCI includes Hybrid Automatic Repeat reQuest ACKnowledgement (HARQ-ACK) information, indicating correct (ACK) or incorrect (NACK) detection for a data TB in a PDSCH or absence of a PDCCH detection (DTX), Scheduling Request (SR) indicating whether a UE has data in its buffer, Rank Indicator (RI), and Channel State Information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH (see also document and standard [3]).

An UL subframe (or slot) includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe (or slot) symbol can be used to multiplex SRS transmissions from one or more UEs. A number of subframe (or slot) symbols that are available for data/UCI/DMRS transmission is $N_{symb}=2 \cdot (N_{symb}^{UL}-1)-$ $N_{SRS}$, where $N_{SRS}=1$ if a last subframe (or slot) symbol is used to transmit SRS and $N_{SRS}=0$ otherwise.

Figure 6:
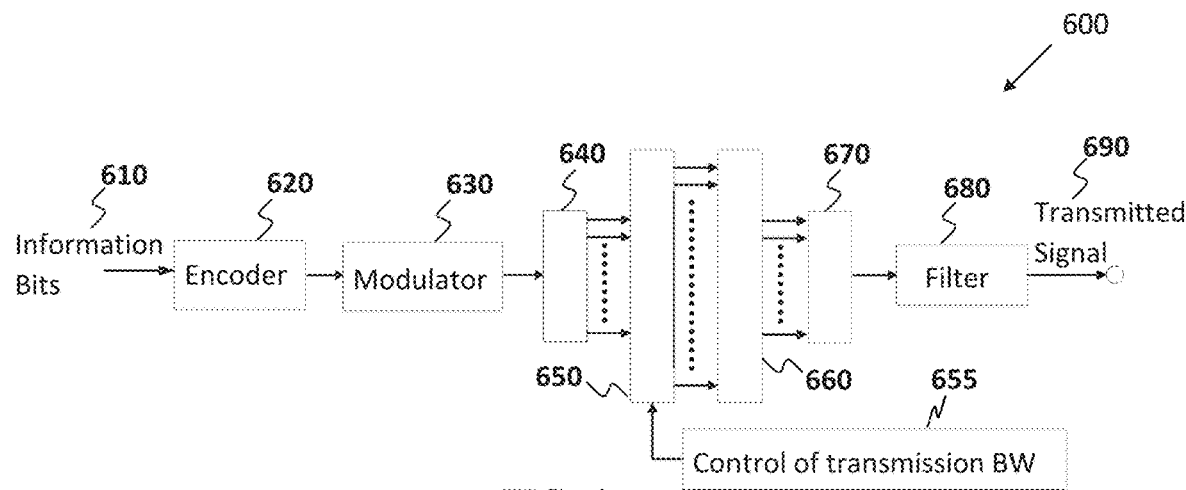
FIG. 6 illustrates an example of a transmitter structure for physical downlink shared channel (PDSCH) in a subframe according to embodiments of the present disclosure.

FIG. 6 illustrates an example of a transmitter structure 600 for PDSCH in a subframe according to embodiments of the present disclosure. For example, transmitter structure 600 can be implemented in gNB 102 of FIG. 1. This example is for illustration only and other embodiments can be used without departing from the scope of the present disclosure.

As illustrated in FIG. 6, information bits 610 are encoded by encoder 620, such as a turbo encoder, and modulated by modulator 630, for example using Quadrature Phase Shift Keying (QPSK) modulation. A Serial to Parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse Fast Fourier Transform (IFFT), the output is then serialized by a Parallel to Serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
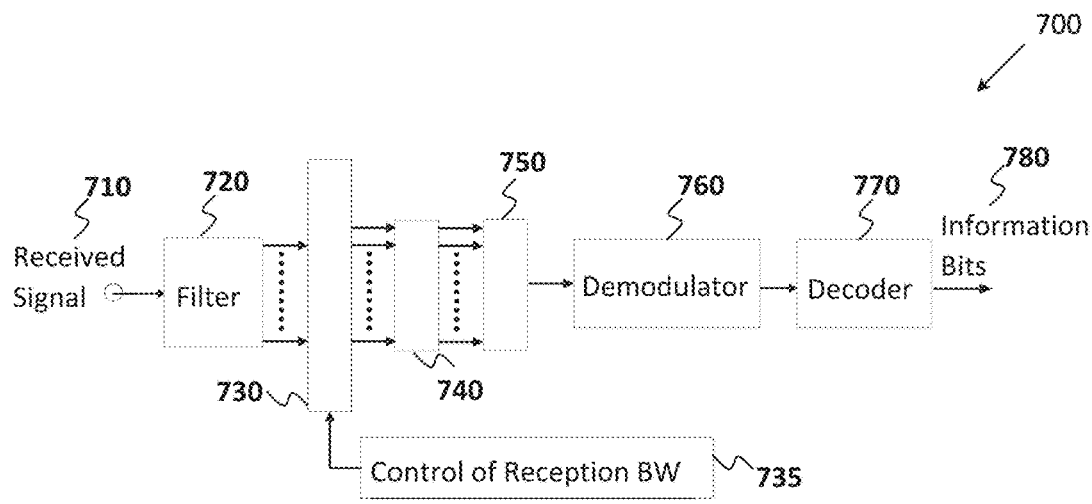
FIG. 7 illustrates an example of a receiver structure for PDSCH in a subframe according to embodiments of the present disclosure.

FIG. 7 illustrates an example of a receiver structure 700 for PDSCH in a subframe according to embodiments of the present disclosure. For example, receiver structure 700 can be implemented by the UE 116 of FIG. 3. This example is for illustration only and other embodiments can be used without departing from the scope of the present disclosure.

With reference to FIG. 7, a received signal 710 is filtered by filter 720, REs 730 for an assigned reception BW are selected by BW selector 735, unit 740 applies a Fast Fourier Transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
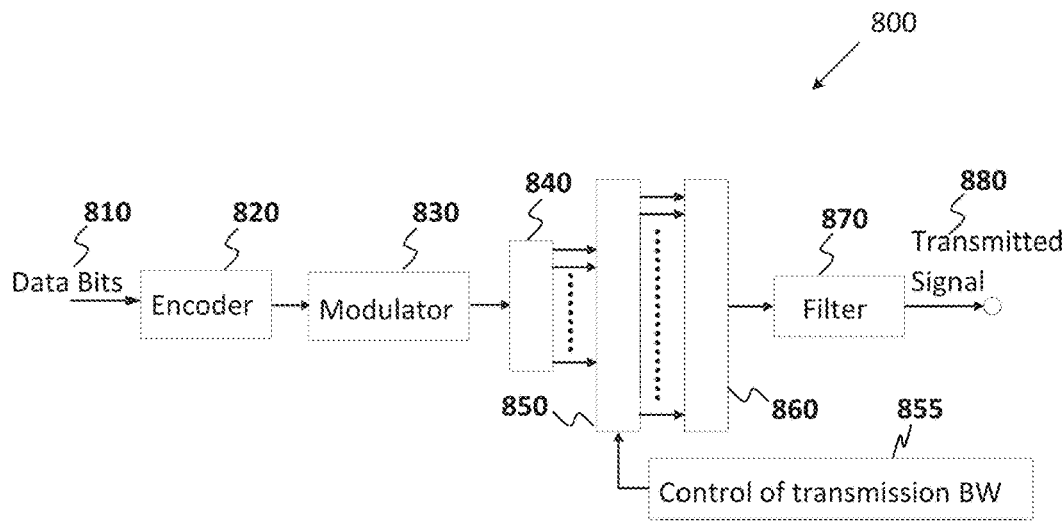
FIG. 8 illustrates an example of a transmitter structure for physical uplink shared channel (PUSCH) in a subframe according to embodiments of the present disclosure.

FIG. 8 illustrates an example of a transmitter structure 800 for PUSCH in a subframe according to embodiments of the present disclosure. For example, transmitter structure 800 can be implemented in gNB 102 of FIG. 1. This example is for illustration only and other embodiments can be used without departing from the scope of the present disclosure.

As illustrated in FIG. 8, information data bits 810 are encoded by encoder 820, such as a turbo encoder, and modulated by modulator 830. A Discrete Fourier Transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
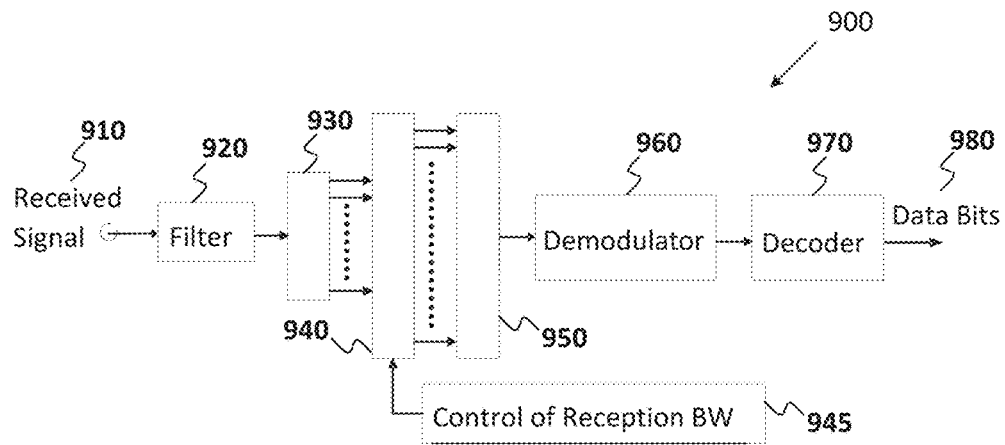
FIG. 9 illustrates an example of a receiver structure for a PUSCH in a subframe according to embodiments of the present disclosure.

FIG. 9 illustrates an example of a receiver structure 900 for a PUSCH in a subframe according to embodiments of the present disclosure; For example, receiver structure 900 can be implemented by the UE 116 of FIG. 3. This example is for illustration only and other embodiments can be used without departing from the scope of the present disclosure.

As illustrated in FIG. 9, a received signal 910 is filtered by filter 920. Subsequently, after a cyclic prefix is removed (not shown), unit 930 applies a FFT, REs 940 corresponding to an assigned PUSCH reception BW are selected by a reception BW selector 945, unit 950 applies an Inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

In next generation cellular systems, various use cases are envisioned beyond the capabilities of LTE. Termed 5G or the fifth generation cellular system, a system capable of operating at sub-6 GHz and above-6 GHz (for example, in mmWave regime) becomes one of the requirements. In document and standard [6], 74 5G use cases has been identified and described; those use cases can be roughly categorized into three different groups. A first group is termed 'enhanced mobile broadband' (eMBB), targeted to high data rate services with less stringent latency and reliability requirements. A second group is termed 'ultra-reliable and low latency' (URLL) targeted for applications with less stringent data rate requirements, but less tolerant to latency. A third group is termed 'massive MTC' (mMTC) targeted for large number of low-power device connections such as 1 million per $km^2$ with less stringent the reliability, data rate, and latency requirements.

The 3GPP specification (such as 4G LTE and 5G NR) supports up to 32 CSI-RS antenna ports which enable an eNB (or gNB) to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

In a wireless communication system, MIMO is often identified as key feature in order to achieve high system throughput requirements. One of the key components of a MIMO transmission scheme is the accurate CSI acquisition at the eNB (or gNB) (or TRP). For multi-user MIMO (MU-MIMO), in particular, the availability of accurate CSI is essential in order to guarantee high MU performance. For time division duplexing (TDD) systems, the CSI can be acquired using the SRS transmission relying on the channel reciprocity. For frequency division duplexing (FDD) systems, on the other hand, it can be acquired using the CSI-RS transmission from eNB (or gNB), and CSI acquisition and feedback from UE. In legacy FDD systems, the CSI feedback framework is 'implicit' in the form of channel quality indicator (CQI)/precoding matrix indicator (PMI)/rank indicator (RI) (also CSI reference signal identity (CRI) and layer identity (LI)) derived from a codebook assuming SU transmission from eNB (or gNB).

In 5G or NR systems ([document and standard [7], document and standard [8]), the herein-mentioned "implicit" CSI reporting paradigm from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, embodiments of the present disclosure recognize the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in document and standard [8]). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) requires to be reported by the UE 116. However, when reciprocity or partial reciprocity does exist between UL and DL, then some of the CSI components can be obtained based on the UL channel estimated using SRS transmission from the UE 116. In Rel. 16 NR, the DFT-based FD compression is extended to this partial reciprocity case (referred to as Rel. 16 enhanced Type II port selection codebook in document and standard [8]), wherein the DFT-based SD basis in $W_1$ is replaced with SD CSI-RS port selection, i.e., L out of $$\frac{P_{CSI-RS}}{2}$$

CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB 102 based on UL channel estimated using SRS measurements.

In Rel. 17 NR, CSI reporting has been enhanced to support the following:

Further enhanced Type II port selection codebook: it has been known in the literature that UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD or/and M ports are selected in FD. The CSI-RS ports in this case are beamformed in SD (assuming UL-DL channel reciprocity in angular domain) or/and FD (assuming UL-DL channel reciprocity in delay/frequency domain), and the corresponding SD or/and FD beamforming information can be obtained at the gNB 102 based on UL channel estimated using SRS measurements. In Rel. 17, such a codebook is supported (which is referred to as Rel. 17 further enhanced Type II port selection codebook in document and standard [8]).

Non-coherent joint transmission (NCJT) CSI reporting: When the UE 116 can communicate with multiple TRPs that are distributed at different locations in space (e.g., within a cell), the CSI reporting can correspond to a single TRP hypothesis (i.e., CSI reporting for one of the multiple TRPs) or multi-TRP hypothesis (i.e., CSI reporting for at least two of the multiple TRPs). The CSI reporting for both single TRP and multi-TRP hypotheses are supported in Rel. 17. However, the multi-TRP CSI reporting assume a NCJT, i.e., a layer (and precoder) of the transmission is restricted to be transmitted from only one TRP.

In Rel. 18 MIMO WID includes the following objectives on CSI enhancements:

Study, and if justified, specify enhancements of CSI acquisition for Coherent-JT targeting FR1 and up to 4 TRPs, assuming ideal backhaul and synchronization as well as the same number of antenna ports across TRPs, as follows:

Rel-16/17 Type-II codebook refinement for coherent joint transmission (CJT) multi-TRP (mTRP) targeting FDD and its associated CSI reporting, taking into account throughput-overhead trade-off Study, and if justified, specify CSI reporting enhancement for high/medium UE velocities by exploiting time-domain correlation/Doppler-domain information to assist DL precoding, targeting FR1, as follows:

Rel-16/17 Type-II codebook refinement, without modification to the spatial and frequency domain basis.

UE reporting of time-domain channel properties measured via CSI-RS for tracking.

The first objective extends the Rel.17 NCJT CSI to coherent JT (CJT), and the second extends FD compression in the Rel.16/17 codebook to include time (Doppler) domain compression. Both extensions are based on the same legacy codebook, i.e., Rel. 16/17 codebook. In the present disclosure, a unified codebook design evaluating both extensions have been proposed.

Figure 10:
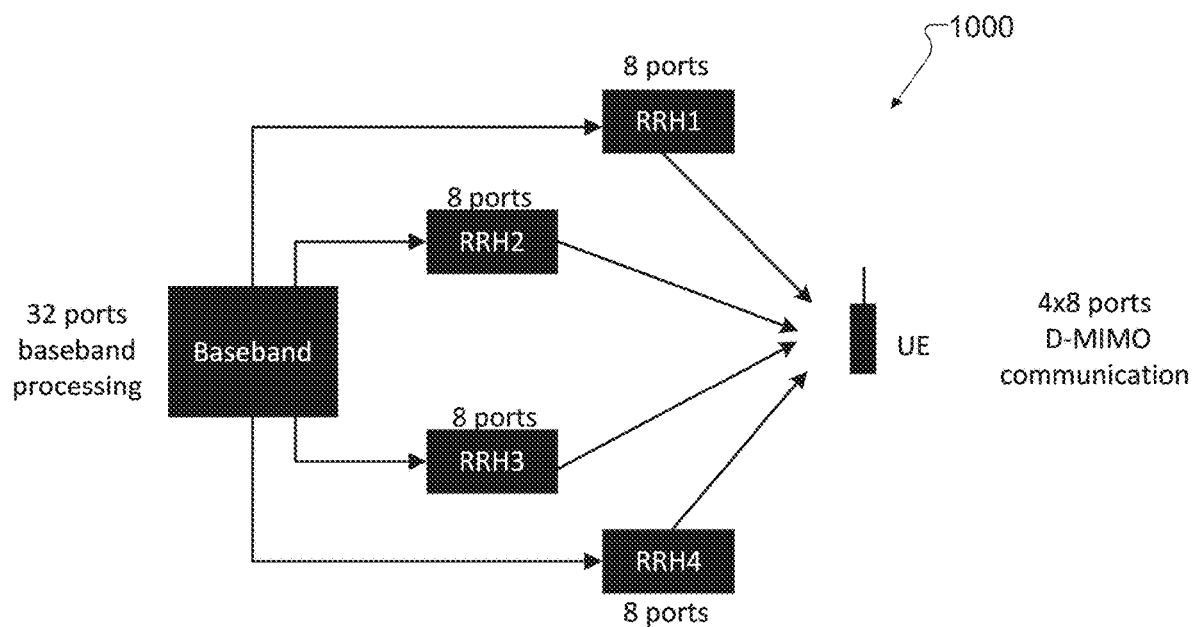
FIG. 10 illustrates an example of a distributed MIMO (DMIMO) according to embodiments of the present disclosure.

FIG. 10 illustrates an example of a DMIMO according to embodiments of the present disclosure. For example, the DMIMO 1000 may be implemented by one or more BSs such as BS 102. The DMIMO 1000 is for illustration only and other embodiments can be used without departing from the scope of the present disclosure.

The main use case or scenario of interest for CJT/DMIMO is as follows. Although NR supports up to 32 CSI-RS antenna ports, for a cellular system operating in a sub-1 GHz frequency range (e.g. less than 1 GHz), supporting large number of CSI-RS antenna ports (e.g. 32) at one site or remote radio head (RRH) or TRP is challenging due to larger antenna form factors at these frequencies (when compared with a system operating at a higher frequency such as 2 GHz or 4 GHz. At such low frequencies, the maximum number of CSI-RS antenna ports that can be co-located at a site (or RRH or TRP) can be limited, for example to 8. This limits the spectral efficiency of such systems. In particular, the MU-MIMO spatial multiplexing gains offered due to large number of CSI-RS antenna ports (such as 32) cannot be achieved. One way to operate a sub-1 GHz system with large number of CSI-RS antenna ports is based on distributing antenna ports at multiple sites (or RRHs). The multiple sites or RRHs can still be connected to a single (common) baseband unit, hence the signal transmitted/received via multiple distributed RRHs can still be processed at a centralized location. For example, 32 CSI-RS ports can be distributed across 4 RRHs, each with 8 antenna ports. Such a MIMO system can be referred to as a distributed MIMO (D-MIMO) or a CJT system.

The multiple RRHs in a D-MIMO setup can be utilized for spatial multiplexing gain (based on CSI reporting). Since RRHs are geographically separated, they (RRHs) tend to contribute differently to CSI reporting. This motivates a dynamic RRH selection followed by CSI reporting condition on the RRH selection. The present disclosure provides example embodiments on how channel and interference signal can be measure under different RRH selection hypotheses. Additionally, the signaling details of such a CSI reporting and CSI-RS measurement are also provided.

Figure 11:
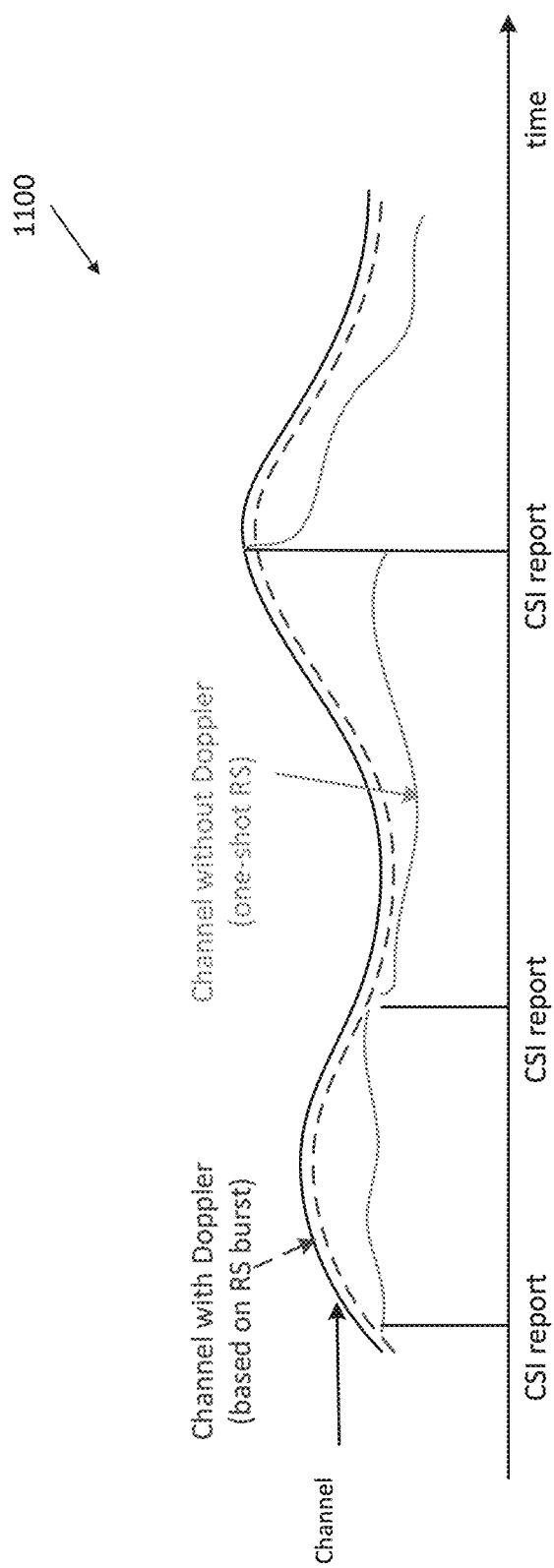
FIG. 11 illustrates an example of a timeline for channel measurement with and without Doppler components according to embodiments of the present disclosure.

FIG. 11 illustrates an example of a timeline 1100 for channel measurement with and without Doppler components according to embodiments of the present disclosure. For example, timeline 1100 for channel measurement with and without Doppler components can be utilized by the UE 116 of FIG. 3. This example is for illustration only and can be used without departing from the scope of the present disclosure.

The main use case or scenario of interest for time-/Doppler-domain compression is moderate to high mobility scenarios. When the UE 116's speed is in a moderate or high speed regime, the performance of the Rel. 15/16/17 codebooks starts to deteriorate quickly due to fast channel variations (which in turn is due to UE mobility that contributes to the Doppler component of the channel), and a one-shot nature of CSI-RS measurement and CSI reporting in Rel. 15/16/17. This limits the usefulness of Rel. 15/16/17 codebooks to low mobility or static UEs only. For moderate or high mobility scenarios, an enhancement in CSI-RS measurement and CSI reporting is called for, which is based on the Doppler components of the channel. As described in document and standard [9], the Doppler components of the channel remain almost constant over a large time duration, referred to as channel stationarity time, which is significantly larger than the channel coherence time. Note that the current (Rel. 15/16/17) CSI reporting is based on the channel coherence time, which is not suitable when the channel has significant Doppler components. The Doppler components of the channel can be calculated based on measuring a reference signal (RS) burst, where the RS can be CSI-RS or SRS. When RS is CSI-RS, the UE 116 measures a CSI-RS burst, and use it to obtain Doppler components of the DL channel, and when RS is SRS, the gNB 102 measures an SRS burst, and use it to obtain Doppler components of the UL channel. The obtained Doppler components can be reported by the UE 116 using a codebook (as part of a CS report). Or the gNB 102 can use the obtained Doppler components of the UL channel to beamform CSI-RS for CSI reporting by the UE 116. When the channel is measured with the Doppler components (e.g., based on an RS burst), the measured channel can remain close to the actual varying channel. On the other hand, when the channel is measured without the Doppler components (e.g., based on a one-shot RS), the measured channel can be far from the actual varying channel.

The present disclosure relates to CSI acquisition at gNB. In particular, it relates to the CSI reporting based on a high-resolution (or Type II) codebook comprising spatial-, frequency- and time- (Doppler-) domain components. Key novel aspects include:

Overhead reduction of non-zero coefficients reporting.
From 3D bitmap to two 2D bitmaps (2LM bitmap across SD and FD, and another bitmap across FD and DD or joint (SD, FD) and DD).
Restrictions (condition) on number of non-zero (NZ) entries in the $2^{nd}$ bitmap.
Rel.16-based codebook: parameter combinations (L, $p_v$, β)
Rel.17-based codebook: parameter combinations (M, α, β)
Restrictions on some parameter combinations Aspects, features, and advantages of the present disclosure are readily apparent from the following detailed description, simply by illustrating a number of particular embodiments and implementations, including the best mode contemplated for carrying out the present disclosure. Embodiments of the present disclosure also capable of other and different embodiments, and its several details can be modified in various obvious respects, all without departing from the spirit and scope of the present disclosure. Accordingly, the drawings and description are to be regarded as illustrative in nature, and not as restrictive. Embodiments of the present disclosure are illustrated by way of example, and not by way of limitation, in the figures of the accompanying drawings.

In the following, for brevity, both FDD and TDD are regarded as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with one another or can operate as standalone schemes.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can include one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" or bandwidth part (BWP) can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may be called for multiple CSI reporting bands. The value of n can either be configured semi-statically (via higher-layer signaling or RRC) or dynamically (via MAC CE or L1 DL control signaling). Alternatively, the UE 116 can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 12:
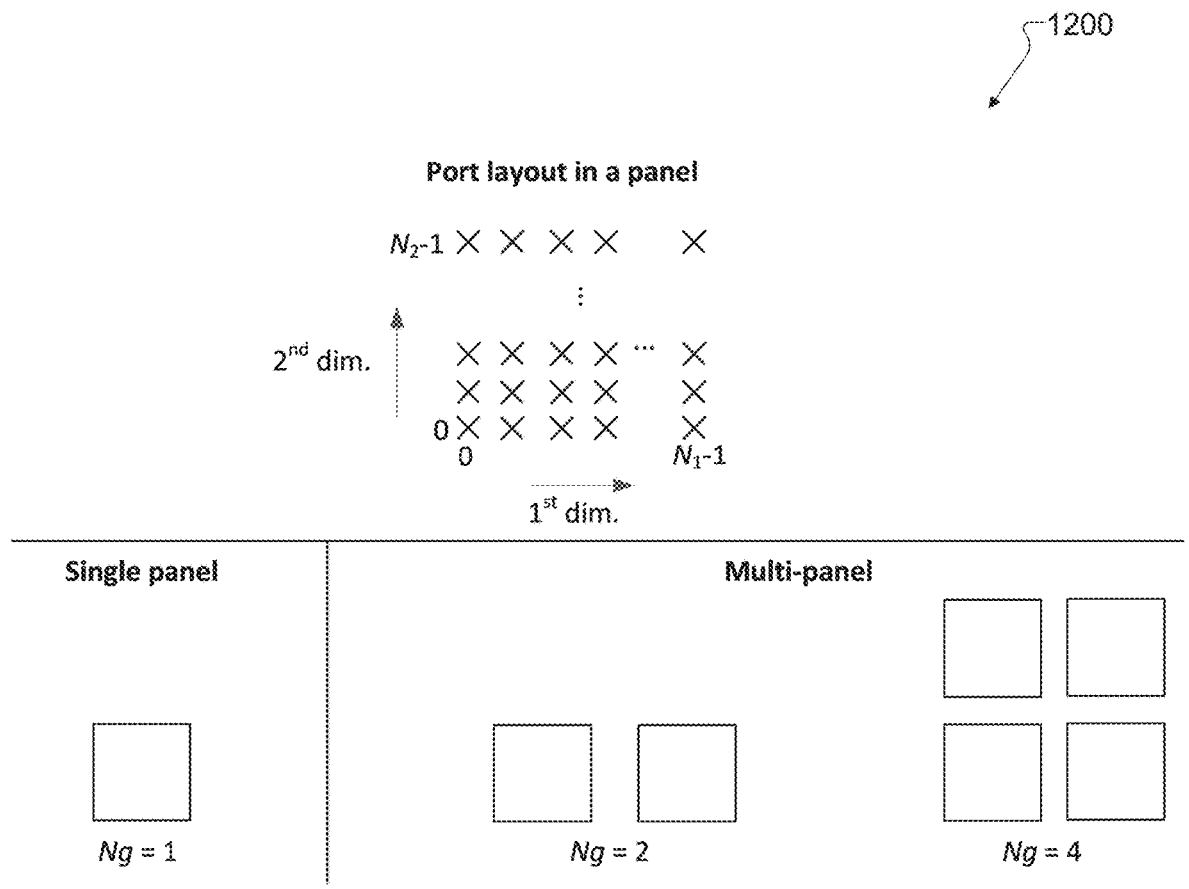
FIG. 12 illustrates a diagram of an antenna port layout according to embodiments of the present disclosure.

FIG. 12 illustrates a diagram 1200 of an antenna port layout according to embodiments of the present disclosure. For example, diagram 1200 of an antenna port layout can be implemented by the BS 102 of FIG. 1. This example is for illustration only and can be used without departing from the scope of the present disclosure.

With reference to FIG. 12, we assume that $N_1$ and $N_2$ are the number of antenna ports with the same polarization in the first and second dimensions, respectively. For 2D antenna port layouts, we have $N_1>1$, $N_2>1$, and for 1D antenna port layouts $N_1>1$ and $N_2=1$. So, for a dual-polarized antenna port layout, the total number of antenna ports is $2N_1N_2$ when each antenna maps to an antenna port. "X" represents two antenna polarizations. In the present disclosure, the term "polarization" refers to a group of antenna ports. For example, antenna ports $$j = X+0, X+1, \ldots, X+\frac{P_{CSIRS}}{2}-1$$

comprise a first antenna polarizes, and antenna ports $$j = X+\frac{P_{CSIRS}}{2}, X+\frac{P_{CSIRS}}{2}+1, \ldots, X+P_{CSIRS}-1$$

comprise a second antenna polarization, where $P_{CSIRS}$ is a number of CSI-RS antenna ports and X is a starting antenna port number (e.g. X=3000, then antenna ports are 3000, 3001, 3002, ... ). Let $N_g$ be a number of antenna panels at the gNB 102. When there are multiple antenna panels ($N_g>1$), we assume that each panel is dual-polarized antenna ports with $N_1$ and $N_2$ ports in two dimensions. Note that the antenna port layouts may or may not be the same in different antenna panels.

In one example, the antenna architecture of a D-MIMO or coherent joint transmission (CJT) system is structured. For example, the antenna structure at each RRH (or TRP) is dual-polarized (single or multi-panel as shown FIG. 12). The antenna structure at each RRH/TRP can be the same. Or the antenna structure at an RRH/TRP can be different from another RRH/TRP. Likewise, the number of ports at each RRH/TRP can be the same. Or the number of ports at one RRH/TRP can be different from another RRH/TRP. In one example, $N_g=N_{RRH}$, a number of RRHs/TRPs in the D-MIMO transmission.

In another example, the antenna architecture of a D-MIMO or CJT system is unstructured. For example, the antenna structure at one RRH/TRP can be different from another RRH/TRP.

We assume a structured antenna architecture in the rest of the present disclosure. For simplicity, we assume each RRH/TRP is equivalent to a panel, although an RRH/TRP can have multiple panels in practice. However, the present disclosure is not restrictive to a single panel assumption at each RRH/TRP and can easily be extended (covers) the case when an RRH/TRP has multiple antenna panels.

In one embodiment, an RRH constitutes (or corresponds to or is equivalent to) at least one of the following:
In one example, an RRH corresponds to a TRP.
In one example, an RRH or TRP corresponds to a CSI-RS resource. A UE is configured with $K=N_{RRH}>1$ non-zero-power (NZP) CSI-RS resources and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained herein.
In one example, an RRH or TRP corresponds to a CSI-RS resource group, where a group comprises one or multiple NZP CSI-RS resources. A UE is configured with $K \geq N_{RRH}>1$ non-zero-power (NZP) CSI-RS resources and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained in the present disclosure. In particular, the K CSI-RS resources can be partitioned into N RRH resource groups. The information about the resource grouping can be provided together with the CSI-RS resource setting/configuration, or with the CSI reporting setting/configuration, or with the CSI-RS resource configuration.
In one example, an RRH or TRP corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an RRH/TRP. The information about the subsets of ports or grouping of ports can be provided together with the CSI-RS resource setting/configuration, or with the CSI reporting setting/configuration, or with the CSI-RS resource configuration.
In one example an RRH or TRP corresponds to one or more examples described herein depending on a configuration. For example, this configuration can be explicit via a parameter (e.g., an RRC parameter). Or it can be implicit.
  In one example, when implicit, it could be based on the value of K. For example, when K>1 CSI-RS resources, an RRH corresponds to example, and when K=1 CSI-RS resource, an RRH corresponds to one or more examples described herein.
  In another example, the configuration could be based on the configured codebook. For example, an RRH corresponds to a CSI-RS resource or resource group when the codebook corresponds to a decoupled codebook (modular or separate codebook for each RRH), and an RRH corresponds to a subset (or a group) of CSI-RS ports when codebook corresponds to a coupled (joint or coherent) codebook (one joint codebook across RRHs).

In one example, when RRH or TRP maps (or corresponds to) a CSI-RS resource or resource group, and a UE can select a subset of RRHs (resources or resource groups) and report the CSI for the selected RRHs (resources or resource groups). The selected RRHs can be reported via an indicator. For example, the indicator can be a CRI or a PMI (component) or a new indicator.

In one example, when RRH maps (or corresponds to) a CSI-RS port group, and a UE can select a subset of RRHs (port groups) and report the CSI for the selected RRHs (port groups). The selected RRHs can be reported via an indicator. For example, the indicator can be a CRI or a PMI (component) or a new indicator.

In one example, when multiple (K>1) CSI-RS resources are configured for N RRH RRHs, a decoupled (modular) codebook is used/configured, and when a single (K=1) CSI-RS resource for N RRH RRHs, a joint codebook is used/configured.

Figure 13:
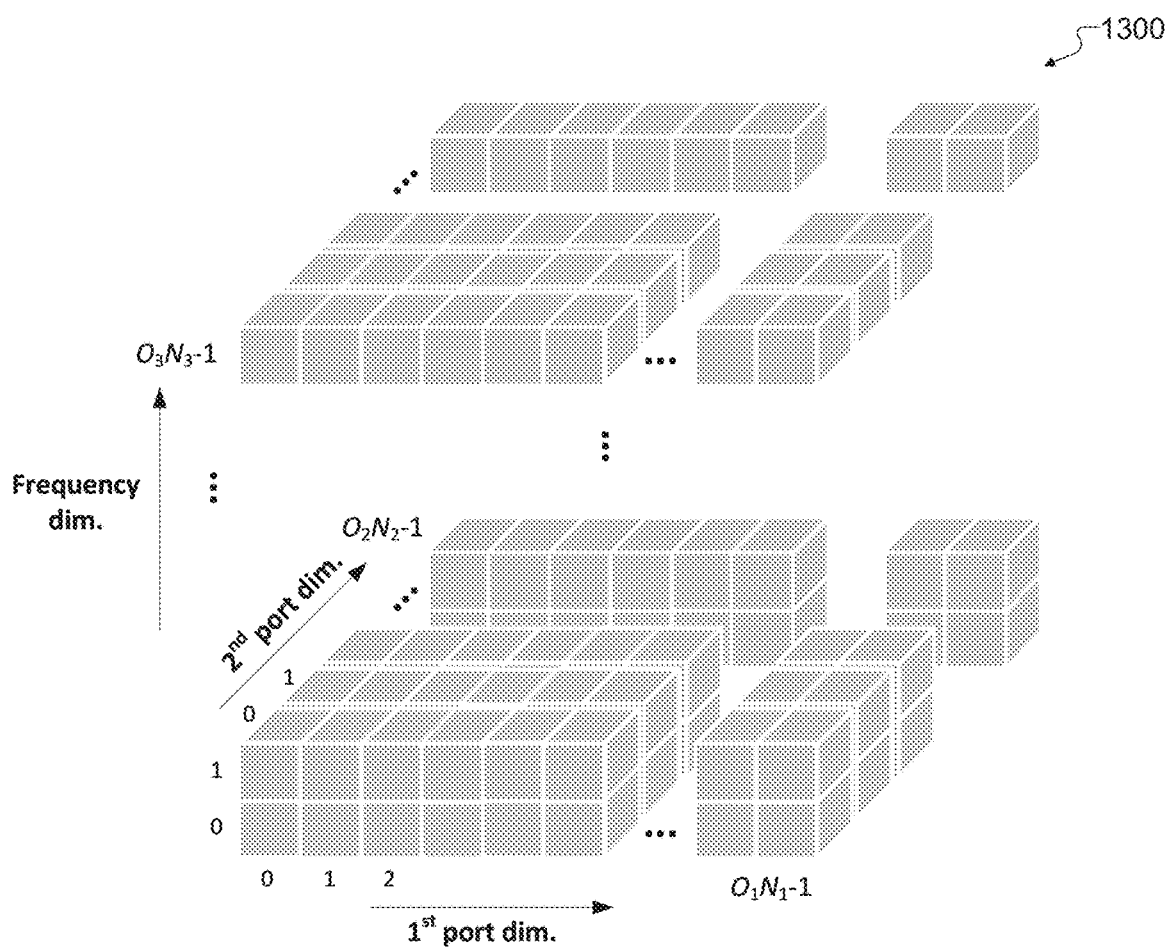
FIG. 13 illustrates a diagram of an example 3D grid of direct fourier transform (DFT) beams according to embodiments of the present disclosure.

FIG. 13 illustrates a diagram 1300 of an example 3D grid of DFT beams according to embodiments of the present disclosure. For example, diagram 1300 can be implemented by the BS 102 of FIG. 1. This example is for illustration only and can be used without departing from the scope of the present disclosure.

As described in U.S. Pat. No. 10,659,118 issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include frequency dimension in addition to the 1st and 2nd antenna port dimensions. FIG. 13 illustrates the following:

1st dimension is associated with the 1st port dimension,
2nd dimension is associated with the 2nd port dimension, and
3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In one example, $O_1=O_2=4$ and $O_3=1$. In another example, the oversampling factors $O_i$ belongs to $\{2, 4, 8\}$. In yet another example, at least one of $O_1$, $O_2$, and $O_3$ is higher layer configured (via RRC signaling).

As explained in document and standard [8], a UE is configured with higher layer parameter codebookType set to 'typeII-PortSelection-r16' for an enhanced Type II CSI reporting in which the pre-coders for all SBs and for a given layer $l=1, \ldots, v$, where v is the associated RI value, is given by either $$W^l = AC_l B^H = [a_0 a_1 \ldots a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H = \qquad (Eq.\ 1)$$

$$\sum_{f=0}^{M-1} \sum_{i=0}^{L-1} c_{l,i,f}(a_i b_f^H) = \sum_{i=0}^{L-1} \sum_{f=0}^{M-1} c_{l,i,f}(a_i b_f^H),$$

or $$W^l = \begin{bmatrix} A & 0 \\ 0 & A \end{bmatrix} C_l B^H = \begin{bmatrix} a_0 a_1 \ldots a_{L-1} & 0 \\ 0 & a_0 a_1 \ldots a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H = \qquad (Eq.\ 2)$$

$$\begin{bmatrix} \sum_{f=0}^{M-1} \sum_{i=0}^{L-1} c_{l,i,f}(a_i b_f^H) \\ \sum_{f=0}^{M-1} \sum_{i=0}^{L-1} c_{l,i+L,f}(a_i b_f^H) \end{bmatrix},$$

where $N_1$ is a number of antenna ports in a first antenna port dimension (having the same antenna polarization).

$N_2$ is a number of antenna ports in a second antenna port dimension (having the same antenna polarization).

$P_{CSI-RS}$ is a number of CSI-RS ports configured to the UE 116.

$N_3$ is a number of SBs for PMI reporting or number of FD units or number of FD components (that comprise the CSI reporting band) or a total number of precoding matrices indicated by the PMI (one for each FD unit/component).

$a_i$ is a $2N_1 N_2 \times 1$ (Eq. 1) or $N_1 N_2 \times 1$ (Eq. 2) column vector, or $a_i$ is a $P_{CSIRS} \times 1$ (Eq. 1) or $\frac{P_{CSIRS}}{2} \times 1$ port selection column vector, where a port selection vector is a defined as a vector which contains a value of 1 in one element and zeros elsewhere.

$b_f$ is a $N_3 \times 1$ column vector.

$c_{l,i,f}$ is a complex coefficient.

In a variation, when the UE 116 reports a subset K<2LM coefficients (where K is either fixed, configured by the gNB 102 or reported by the UE 116), then the coefficient $c_{l,i,f}$ in precoder equations Eq. 1 or Eq. 2 is replaced with $x_{l,i,f} \times c_{l,i,f}$, where $x_{l,i,f}=1$ if the coefficient $c_{l,i,f}$ is reported by the UE 116 according to some embodiments of the present disclosure.

$x_{l,i,f}=0$ otherwise (i.e., $c_{l,i,f}$ is not reported by the UE 116).

The indication whether $x_{l,i,f}=1$ or 0 is according to one or more embodiments described in the present disclosure. For example, it can be via a bitmap.

In a variation, the precoder equations Eq. 1 or Eq. 2 are respectively generalized to $$W^l = \sum_{i=0}^{L-1} \sum_{f=0}^{M_i-1} c_{l,i,f}(a_i b_{i,f}^H) \qquad (Eq.\ 3)$$

and $$W^l = \begin{bmatrix} \sum_{i=0}^{L-1} \sum_{f=0}^{M_i-1} c_{l,i,f}(a_i b_{i,f}^H) \\ \sum_{i=0}^{L-1} \sum_{=0}^{M_i-1} c_{l,i+L,f}(a_i b_{i,f}^H) \end{bmatrix}, \qquad (Eq.\ 4)$$

where for a given i, the number of basis vectors is $M_i$ and the corresponding basis vectors are $\{b_{i,f}\}$. Note that $M_i$ is the number of coefficients $c_{l,i,f}$ reported by the UE 116 for a given i, where $M_i \leq M$ (where $\{M_i\}$ or $\Sigma M_i$ is either fixed, configured by the gNB 102 or reported by the UE 116).

The columns of $W^l$ are normalized to norm one. For rank R or R layers (v=R), the pre-coding matrix is given by $$W^{(R)} = \frac{1}{\sqrt{R}}[W^1 \ W^2 \ \ldots \ W^R].$$

Eq. 2 is assumed in the rest of the present disclosure. However, the embodiments of the present disclosure are general and are also application to Eq. 1, Eq. 3, and Eq. 4.

Here $$L \leq \frac{P_{CSI-RS}}{2}$$

and $M \leq N_3$. If $$L = \frac{P_{CSI-RS}}{2},$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f = w_f$, where the quantity $w_f$ is given by $$w_f = \left[1 \quad e^{j\frac{2\pi n_{3,l}^{(f)}}{O_3 N_3}} \quad e^{j\frac{2\pi \cdot 2 n_{3,l}^{(f)}}{O_3 N_3}} \quad \ldots \quad e^{j\frac{2\pi \cdot (N_3-1) n_{3,l}^{(f)}}{O_3 N_3}}\right]^T.$$

When $O_3=1$, the FD basis vector for layer $l \in \{1, \ldots, v\}$ (where v is the RI or rank value) is given by $$w_f = [y_{0,l}^{(f)} y_{1,l}^{(f)} \ldots y_{N_3-1,l}^{(f)}]^T,$$

where $$y_{t,l}^{(f)} = e^{j\frac{2\pi t n_{3,l}^{(f)}}{N_3}}$$

and $n_{3,l} = [n_{3,l}^{(0)}, \ldots, n_{3,l}^{(M-1)}]$ where $n_{3,l}^{(f)} \in \{0, 1, \ldots, N_3-1\}$.

In another example, discrete cosine transform (DCT) basis is used to construct/report basis B for the $3^{rd}$ dimension. The m-th column of the DCT compression matrix is simply given by $$[W_f]_{nm} = \begin{cases} \frac{1}{\sqrt{K}}, & n = 0 \\ \sqrt{\frac{2}{K}} \cos\frac{\pi(2m+1)n}{2K}, & n = 1, \ldots K-1 \end{cases},$$

and $$K = N_3,$$

and $$m = 0, \ldots, N_3 - 1.$$

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The present disclosure is applicable to any other basis vectors to construct/report A and B.

On a high level, a precoder $W^l$ can be described as follows.

$$W = A_l C_l B_l^H = W_1 \tilde{W}_2 W_f^H, \quad (5)$$

where $A=W_1$ corresponds to the Rel. 15 $W_1$ in Type II CSI codebook (document and standard [8]), and $B=W_f$.

The $C_l = \tilde{W}_2$ matrix includes of all the called for linear combination coefficients (e.g., amplitude and phase or real or imaginary). Each reported coefficient ($c_{l,i,f} = p_{l,i,f} \phi_{l,i,f}$) in $\tilde{W}_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to $\{2, 3, 4\}$. If multiple values for A are supported, then one value is configured via higher layer signaling. In another example, the amplitude coefficient ($p_{l,i,f}$) is reported as $p_{l,i,f} = p_{l,i,f}^{(1)} p_{l,i,f}^{(2)}$ where $p_{l,i,f}^{(1)}$ is a reference or first amplitude which is reported using an A1-bit amplitude codebook where A1 belongs to $\{2, 3, 4\}$, and $p_{l,i,f}^{(2)}$ a differential or second amplitude which is reported using a A2-bit amplitude codebook where A2≤A1 belongs to $\{2, 3, 4\}$.

For layer l, let us denote the linear combination (LC) coefficient associated with spatial domain (SD) basis vector (or beam) $i \in \{0, 1, \ldots, 2L-1\}$ and frequency domain (FD) basis vector (or beam) $f \in \{0, 1, \ldots, M-1\}$ as $c_{l,i,f}$, and the strongest coefficient as $c_{l,i^*,f^*}$. The strongest coefficient is reported out of the $K_{NZ}$ non-zero (NZ) coefficients that is reported using a bitmap, where $K_{NZ} \leq K_0 = \lceil \beta \times 2LM \rceil < 2LM$ and β is higher layer configured. The remaining $2LM - K_{NZ}$ coefficients that are not reported by the UE 116 are assumed to be zero. The following quantization scheme is used to quantize/report the $K_{NZ}$ NZ coefficients.

UE reports the following for the quantization of the NZ coefficients in $\tilde{W}_2$ A X-bit indicator for the strongest coefficient index (i*, f*), where $X = \lceil \log_2 K_{NZ} \rceil$ or $\lceil \log_2 2L \rceil$.

Strongest coefficient $c_{l,i^*,f^*} = 1$ (hence its amplitude/phase are not reported).

Two antenna polarization-specific reference amplitudes are used.

For the polarization associated with the strongest coefficient $c_{l,i^*,f^*} = 1$, since the reference amplitude $p_{l,i,f}^{(1)} = 1$, is not reported.

For the other polarization, reference amplitude $p_{l,i,f}^{(1)}$ is quantized to 4 bits.

The 4-bit amplitude alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}\right\}.$$

For $\{c_{l,i,f}, (i, f) \neq (i^*, f^*)\}$:

For each polarization, differential amplitudes $p_{l,i,f}^{(2)}$ of the coefficients calculated relative to the associated polarization-specific reference amplitude and quantized to 3 bits.

The 3-bit amplitude alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

Note: The final quantized amplitude $p_{l,i,f}$ is given by $p_{l,i,f}^{(1)} \times p_{l,i,f}^{(2)}$.

Each phase is quantized to either 8PSK ($N_{ph}=8$) or 16PSK ($N_{ph}=16$) (which is configurable).

For the polarization $r^* \in \{0,1\}$ associated with the strongest coefficient $c_{l^*,i^*,f^*}$, we have $$r^* = \left\lfloor \frac{i^*}{L} \right\rfloor$$

and the reference amplitude $p_{l,l,f}^{(1)} = p_{l,r^*}^{(1)} = 1$. For the other polarization $r \in \{0,1\}$ and $r \neq r^*$, we have $$r = \left(\left\lfloor \frac{i^*}{L} \right\rfloor + 1\right)$$

mod 2 and the reference amplitude $p_{l,i,f}^{(1)} = p_{l,r}^{(1)}$ is quantized (reported) using the 4-bit amplitude codebook mentioned herein.

In Rel. 16 enhanced Type II and Type II port selection codebooks, a UE can be configured to report M FD basis vectors. In one example, $$M = \left\lceil p \times \frac{N_3}{R} \right\rceil,$$

where R is higher-layer configured from $\{1,2\}$ and p is higher-layer configured from $$\left\{\frac{1}{4}, \frac{1}{2}\right\}.$$

In one example, the p value is higher-layer configured for rank 1-2 CSI reporting. For rank >2 (e.g., rank 3-4), the p value (denoted by $v_0$) can be different. In one example, for rank 1-4, (p, $v_0$) is jointly configured from $$\left\{\left(\frac{1}{2}, \frac{1}{4}\right), \left(\frac{1}{4}, \frac{1}{4}\right), \left(\frac{1}{4}, \frac{1}{8}\right)\right\},$$

i.e.

$$M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3 = N_{SB} \times R$ where $N_{SB}$ is the number of SBs for CQI reporting. In one example, M is replaced with $M_v$ to show its dependence on the rank value v, hence p is replaced with $p_u$, $v \in \{1,2\}$ and $v_0$ is replaced with $p_v$, $v \in \{3,4\}$.

A UE can be configured to report $M_v$ FD basis vectors in one-step from $N_3$ basis vectors freely (independently) for each layer $l \in \{1, \ldots, v\}$ of a rank v CSI reporting. Alternatively, a UE can be configured to report $M_v$ FD basis vectors in two-step as follows.

In step 1, an intermediate set (InS) comprising $N_3' < N_3$ basis vectors are selected/reported, wherein the InS is common for all layers.

In step 2, for each layer $l \in \{1, \ldots, v\}$ of a rank v CSI reporting, $M_v$ FD basis vectors are selected/reported freely (independently) from $N_3'$ basis vectors in the InS.

In one example, one-step method is used when $N_3 \leq 19$ and two-step method is used when $N_3 > 19$. In one example, $N_3' = \lceil \alpha M_v \rceil$ where $\alpha > 1$ is either fixed (to 2 for example) or configurable.

The codebook parameters used in the DFT based frequency domain compression (eq. 5) are (L, $p_v$ for $v \in \{1,2\}$, $p_v$ for $v \in \{3,4\}$, β, α, $N_{ph}$). The set of values for these codebook parameters are as follows.

L: the set of values is $\{2,4\}$ in general, except $L \in \{2,4,6\}$ for rank 1-2, 32 CSI-RS antenna ports, and R=1.

($p_v$ for $v \in \{1,2\}$, $p_v$ for $$v \in \{3, 4\}) \in \left\{\left(\frac{1}{2}, \frac{1}{4}\right), \left(\frac{1}{4}, \frac{1}{4}\right), \left(\frac{1}{4}, \frac{1}{8}\right)\right\}.$$

$$\beta \in \left\{\frac{1}{4}, \frac{1}{2}, \frac{3}{4}\right\}.$$

α=2.
$N_{ph}$=16.

The set of values for these codebook parameters are as in Table 1. The UE is not expected to be configured with paramCombination equal to 3, 4, 5, 6, 7, or 8 when $P_{CSI-RS}$=4, 7 or 8 when $P_{CSI-RS}$<32

7 or 8 when higher layer parameter typeII-RI-Restriction-r16 is configured with $r_i$=1 for any i>1.

7 or 8 when R=2.

TABLE 1

| paramCombination | L | $p_v$ $v \in \{1, 2\}$ | $p_v$ $v \in \{3, 4\}$ | β |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |
| 7 | 6 | ¼ | — | ½ |
| 8 | 6 | ¼ | — | ¾ |

In Rel. 17 (further enhanced Type II port selecting codebook), $M \in \{1,2\}$, $$L = \frac{K_1}{2}$$

where $K_1 = \alpha \times P_{CSIRS}$, and codebook parameters (M, α, β) are configured from Table 2. The UE is not expected to be configured with paramCombination-r17 equal to 1 or 6 when $P_{CSI-RS} \in \{4,12\}$, 7 or 8 when $P_{CSI-RS}$=32, 5 when $P_{CSI-RS}$=4 and higher layer parameter typeII-PortSelectionRI-Restriction-r17 is configured with $r_i$=1 for any i>1.

TABLE 2

| paramCombination-r17 | M | α | β |
|---|---|---|---|
| 1 | 1 | ¾ | ½ |
| 2 | 1 | 1 | ½ |
| 3 | 1 | 1 | ¾ |
| 4 | 1 | 1 | 1 |
| 5 | 2 | ½ | ½ |
| 6 | 2 | ¾ | ½ |
| 7 | 2 | 1 | ½ |
| 8 | 2 | 1 | ¾ |

The framework mentioned herein (equation 5) represents the precoding-matrices for multiple ($N_3$) FD units using a linear combination (double sum) over 2L (or $K_1$) SD beams/ports and $M_v$ FD beams. This framework can also be used to represent the precoding-matrices in time domain (TD) by replacing the FD basis matrix $W_f$ with a TD basis matrix $W_t$, wherein the columns of $W_t$ comprises $M_v$ TD beams that represent some form of delays or channel tap locations. Hence, a precoder $W^l$ can be described as follows.

$$W = A_l C_l B_l^H = W_1 \tilde{W}_2 W_t^H, \quad (5A)$$

In one example, the $M_v$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The rest of the present disclosure is applicable to both space-frequency (equation 5) and space-time (equation 5A) frameworks.

In the present disclosure, the framework mentioned herein for CSI reporting based on space-frequency compression (equation 5) or space-time compression (equation 5A) frameworks can be extended in two directions:

time or Doppler domain compression (e.g., for moderate to high mobility UEs) and joint transmission across multiple RRHs/TRP (e.g., for a DMIMO or multiple TRP systems).

Figure 14:
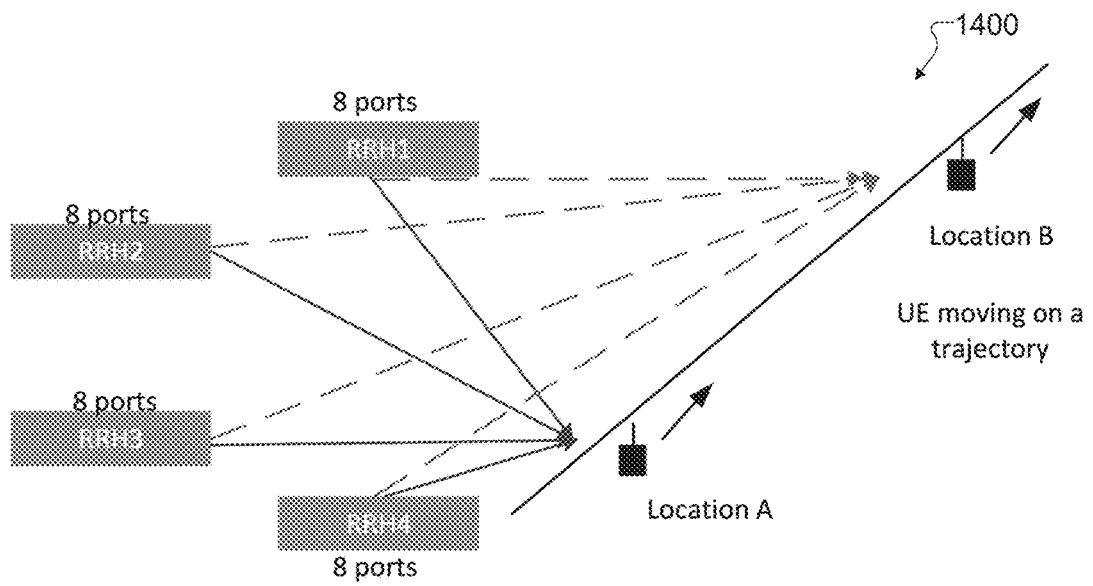
FIG. 14 illustrates an example of a UE moving on a trajectory located in a distributed MIMO according to embodiments of the present disclosure.

FIG. 14 illustrates an example of a UE moving on a trajectory 1400 located in a distributed MIMO according to embodiments of the present disclosure. For example, trajectory 1400 located in a distributed MIMO can be implemented by the UE 116 of FIG. 1. This example is for illustration only and can be used without departing from the scope of the present disclosure.

While the UE 116 moves from a location A to another location B at high speed (e.g., 60 kmph), the UE 116 measures the channel and the interference (e.g., via NZP CSI-RS resources and CSI interference measurement (CSI-IM) resources, respectively), and then uses them to determine/report CSI regarding CJT from multiple RRHs. The reported CSI can be based on a codebook, which includes components regarding both multiple RRHs, and time-/Doppler-domain channel compression.

Figure 15:
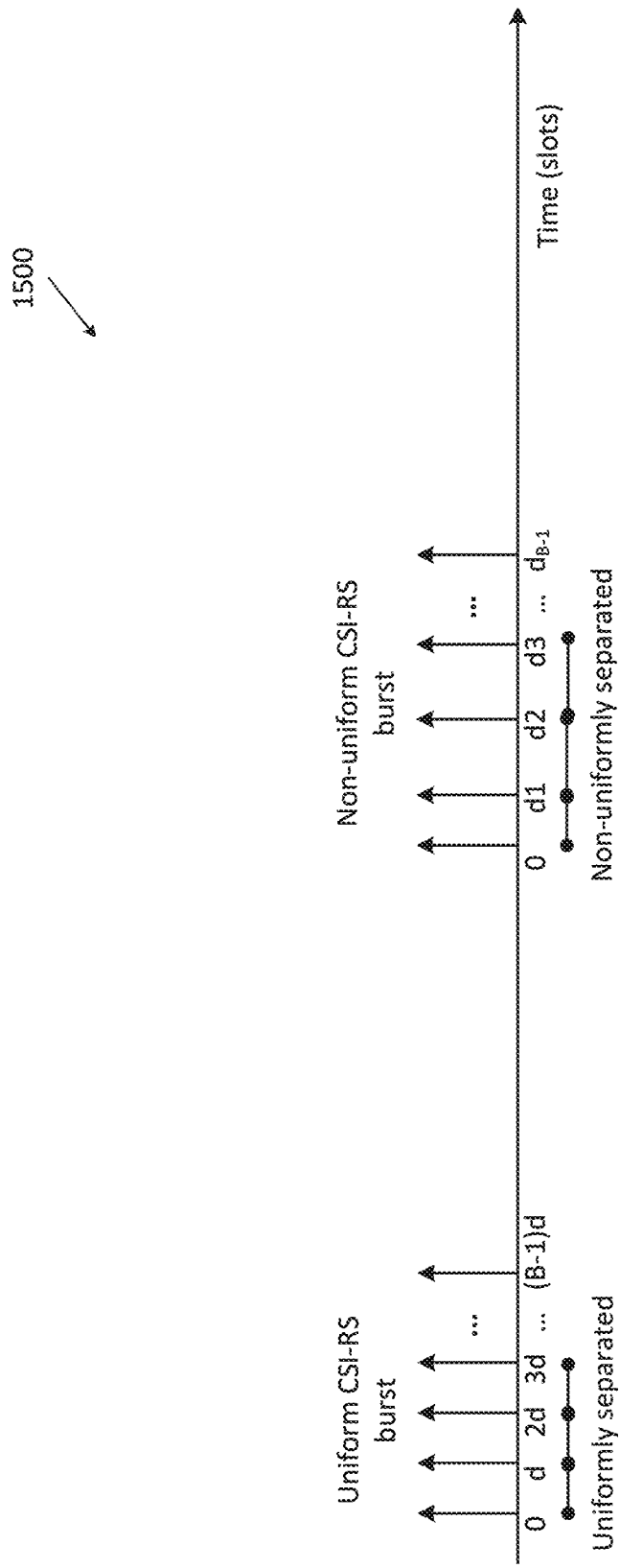
FIG. 15 illustrates an example of a timeline for a UE to receive non-zero-power (NZP) channel state information reference signal (CSI-RS) resource(s) bursts according to embodiments of the present disclosure.

FIG. 15 illustrates an example of a timeline 1500 for a UE to receive NZP CSI-RS resource(s) bursts according to embodiments of the present disclosure. For example, timeline 1500 can be utilized by the UE 116 of FIG. 3. This example is for illustration only and other embodiments can be used without departing from the scope of the present disclosure.

In another embodiment, a UE is configured to receive a burst of NZP CSI-RS resource(s), referred to as CSI-RS burst for brevity, within B time slots comprising a measurement window, where B≥1. The B time slots can be accordingly to at least one of the following examples.

In one example, the B time slots are evenly/uniformly spaced with an inter-slot spacing d.

In one example, the B time slots can be non-uniformly spaced with inter-slot spacing $e_1 = d_1$, $e_2 = d_2 - d_1$, $e_3 = d_3 - d_2$, ..., so on, where $e_i \neq e_j$ for at least one pair (i, j) with i≠j.

The UE 116 receives the CSI-RS burst, estimates the B instances of the DL channel measurements, and uses the channel estimates to obtain the Doppler component(s) of the DL channel. The CSI-RS burst can be linked to (or associated with) a single CSI reporting setting (e.g., via higher layer parameter CSI-ReportConfig), wherein the corresponding CSI report includes an information about the Doppler component(s) of the DL channel.

Let $h_t$ be the DL channel estimate based on the CSI-RS resource(s) received in time slot $t \in \{0, 1, \ldots, B-1\}$. When the DL channel estimate in slot t is a matrix $G_t$ of size $N_{Rx} \times N_{Tx} \times N_{Sc}$, then $h_t = \text{vec}(G_t)$, where $N_{Rx}$, $N_{Tx}$, and $N_{Sc}$ are number of receive (Rx) antennae at the UE 116, number of CSI-RS ports measured by the UE 116, and number of subcarriers in frequency band of the CSI-RS burst, respectively. The notation vec(X) is used to denote the vectorization operation wherein the matrix X is transformed into a vector by concatenating the elements of the matrix in an order, for example, 1→2→3→and so on, implying that the concatenation starts from the first dimension, then moves second dimension, and continues until the last dimension. Let $H_B = [h_0 \, h_1 \, \ldots \, h_{B-1}]$ be a concatenated DL channel. The Doppler component(s) of the DL channel can be obtained based on $H_B$. For example, $H_B$ can be represented as $C\Phi^H = \sum_{s=0}^{N-1} c_s \phi_s^H$ where $\Phi = [\phi_0 \, \phi_1 \, \ldots \, \phi_{N-1}]$ is a Doppler domain (DD) basis matrix whose columns comprise basis vectors, $C = [c_0 \, c_1 \, \ldots \, c_{N-1}]$ is a coefficient matrix whose columns comprise coefficient vectors, and N<B is the number of DD basis vectors. Since the columns of $H_B$ are likely to be correlated, a DD compression can be achieved when the value of N is small (compared to the value of B). In this example, the Doppler component(s) of the channel is represented by the DD basis matrix $\Phi$ and the coefficient matrix C.

The details of the CSI-RS bursts can be according to the U.S. provisional patent application 63/160,430 "Method and Apparatus for configuring a reference signal burst" filed on Mar. 3, 2021.

When there are multiple TRPs/RRHs ($N_{RRH} > 1$), the UE 116 can be configured to measure the CSI-RS burst(s) according to at least one of the following examples.

In one example, the UE 116 is configured to measure $N_{RRH}$ CSI-RS bursts, one from each TRP/RRH. The $N_{RRH}$ CSI-RS bursts can be overlapping in time (i.e., measured in same time slots). Or they can be staggered in time (i.e., measured in different time slots). Whether overlapping or staggered can be determined based on configuration. It can also depend on the total number of CSI-RS ports across RRHs/TRPs. When the total number of ports is small (e.g., <=32), they can overlap, otherwise (>32), they are staggered. The number of time instances B can be the same for all of the $N_{RRH}$ bursts. Or the number B can be the same or different across bursts (or TRPs/RRHs).

In one example, each CSI-RS burst corresponds to a semi-persistent (SP) CSI-RS resource. The SP CSI-RS resource can be activated or/and deactivated based on a MAC CE or/and DCI based signaling. The rest of the details can be as described in the U.S. provisional patent application 63/160,430.

In another example, each CSI-RS burst corresponds to a group of B≥1 aperiodic (Ap) CSI-RS resources. The Ap-CSI-RS resources can be triggered via a DCI with slot offsets such that they can be measured in B different time slots. The rest of the details can be as described in the U.S. provisional patent application 63/160,430.

In another example, each CSI-RS burst corresponds to a periodic CSI-RS (P-CSI-RS) resource. The P-CSI-RS resource can be configured via higher layer. The first measurement instance (time slot) and the measurement window of the CSI-RS burst (from the P-CSI-RS resource) can be fixed or configured. The rest of the details can be as described in the U.S. provisional patent application 63/160,430.

In another example, a CSI-RS burst can either be a P-CSI-RS, or SP-CSI-RS or Ap-CSI-RS resource.

In one example, the time-domain behavior (P, SP, or Ap) of $N_{RRH}$ CSI-RS bursts is the same.

In another example, the time-domain behavior of $N_{RRH}$ CSI-RS bursts can be the same or different.

In another example, the UE 116 is configured to measure K≥$N_{RRH}$ CSI-RS bursts, where K=$\Sigma_{r=1}^{N_{RRH}} K_r$ and $K_r$ is a number of CSI-RS bursts associated with RRH/TRP r, where r∈{1, ..., $N_{RRH}$}. Each CSI-RS burst is according to at least one of the examples described herein. When $K_r$>1, multiple CSI-RS bursts are linked to (or associated with) a CSI reporting setting, i.e., the UE 116 receives the N r CSI-RS bursts, estimates the DL channels, and obtains the Doppler component(s) of the channel using all of the $N_r$ CSI-RS bursts. The rest of the details can be as described in the U.S. provisional patent application 63/160,430.

In another example, the UE 116 is configured to measure one CSI-RS burst across all of N RRH TRPs/RRHs. Let P be a number of CSI-RS ports associated with the NZP CSI-RS resource measured via the CSI-RS burst. The CSI-RS burst is according to at least one of the examples in described herein. The total of P ports can be divided into $N_{RRH}$ groups/subsets of ports and one group/subset of ports is associated with (or corresponds to) a TRP/RRH. Then, P=$\Sigma_{r=1}^{N_{RRH}} P_r$ and $P_r$ is a number of CSI-RS ports in the group/subset of ports associated with RRH/TRP r.

In one example, in each of the B time instances, a UE is configured to measure all groups/subsets of ports, i.e., in each time instance within the burst, the UE 116 measures all of P ports (or $N_{RRH}$ groups/subsets of ports).

In another example, a UE is configured to measure subsets/groups of ports across multiple time instances, i.e., in each time instance within the burst, the UE 116 measures a subset of P ports or a subset of groups of ports (RRHs/TRPs).

In one example, in each time instance, the UE 116 measures only one group/subset of ports (1 TRP per time instance). In this case, B=$N_{RRH}$×C or B≥$N_{RRH}$×C, where C is a number of measurement instances for each TRP/RRH.

In another example, the UE 116 is configured to measure one half of the port groups in a time instance, and the remaining half in another time instance.

In one example, the two time instances can be consecutive, for example, the UE 116 measures one half of port groups in even-numbered time instances, and the remaining half in the odd-numbered time instances.

In one example, a first half of the time instances (e.g., $0, 1, \ldots, \frac{B}{2} - 1$)

is configured to measure one half of the port groups, and the second half or the time instances (e.g., $\frac{B}{2}, \ldots B - 1$)

is configured to measure the remaining half of the port groups.

In another example, the UE 116 is configured to measure multiple CSI-RS bursts, where each burst is according to at least one of the examples described herein. Multiple CSI-RS bursts are linked to (or associated with) a CSI reporting setting, i.e., the UE 116 receives multiple CSI-RS bursts, estimates the DL channels, and obtains the Doppler component(s) of the channel using all of multiple CSI-RS bursts.

Let $N_4$ be the length of the DD basis vectors {$\phi_s$}, e.g., each basis vector is a length $N_4$×1 column vector.

Figure 16:
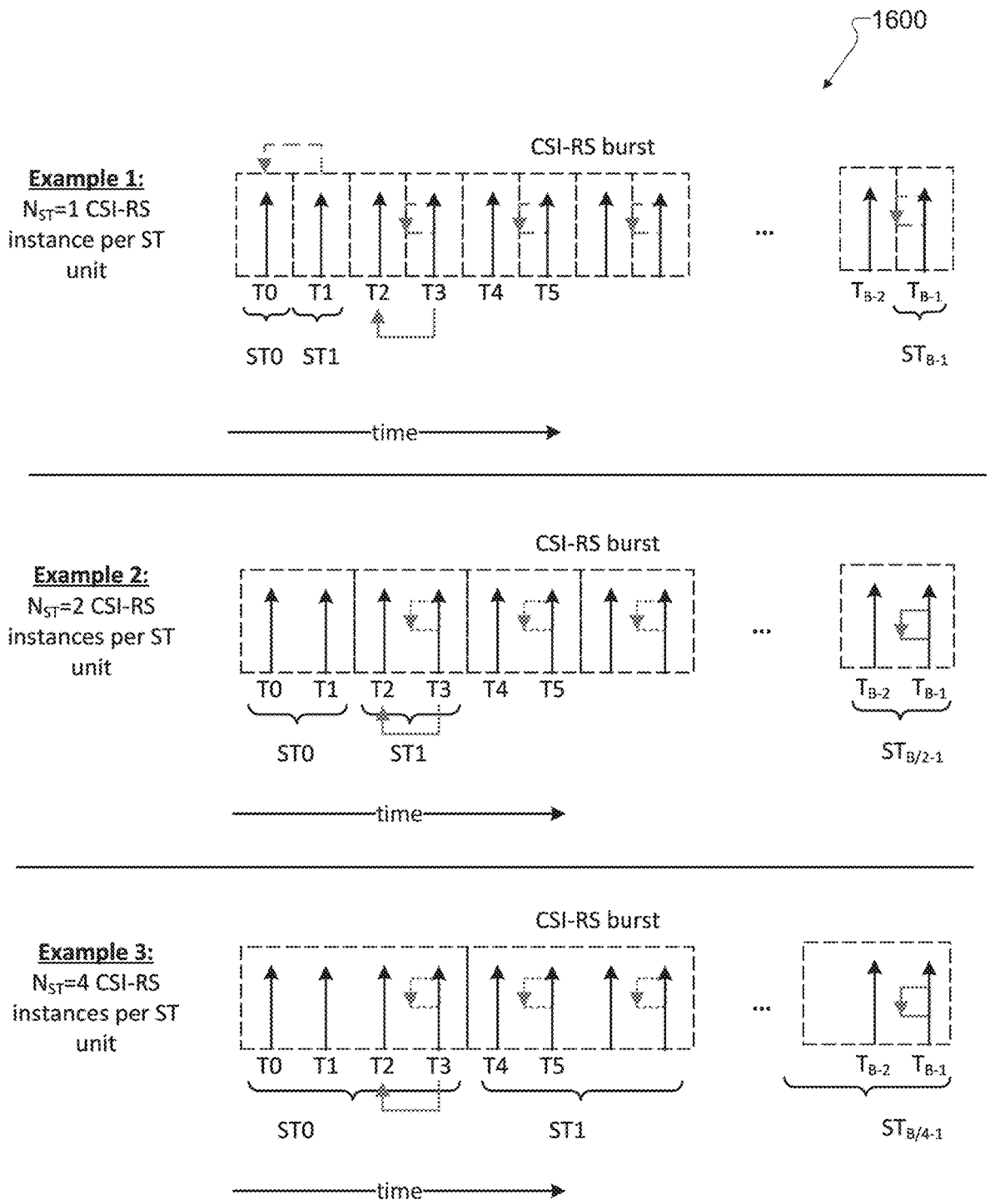
FIG. 16 illustrates an example of a timeline for partitioned CSI-RS burst instances according to embodiments of the present disclosure.

FIG. 16 illustrates an example of a timeline 1600 for partitioned CSI-RS burst instances according to embodiments of the present disclosure. For example, timeline 1600 can be utilized by the UE 116 of FIG. 3. This example is for illustration only and other embodiments can be used without departing from the scope of the present disclosure.

In another embodiment, a UE is configured to determine a value of $N_4$ based on the value B (number of CSI-RS instances) in a CSI-RS burst and components across which the DD compression is performed, where each component corresponds to one or multiple time instances within the CSI-RS burst. In one example, $N_4$ is fixed (e.g., $N_4$=B) or configured (e.g., via RRC or MAC CE or DCI) or reported by the UE 116 (as part of the CSI report). In one example, the B CSI-RS instances can be partitioned into sub-time (ST) units (instances), where each ST unit is defined as (up to) $N_{ST}$ contiguous time instances in the CSI-RS burst. In this example, a component for the DD compression corresponds to a ST unit. With reference to FIG. 16, three examples of the ST units are shown. In the first example, each ST unit comprises $N_{ST}$=1 time instance in the CSI-RS burst. In the second example, each ST unit comprises $N_{ST}$=2 contiguous time instances in the CSI-RS burst. In the third example, each ST unit comprises $N_{ST}$=4 contiguous time instances in the CSI-RS burst.

The value of $N_{ST}$ can be fixed (e.g., $N_{ST}$=1 or 2 or 4) or indicated to the UE 116 (e.g., via higher layer RRC or MAC CE or DCI based signaling) or reported by the UE 116 (e.g., as part of the CSI report). The value of $N_{ST}$ (fixed or indicated or reported) can be subject to a UE capability reporting. The value of $N_{ST}$ can also be dependent on the value of B (e.g., one value for a range of values for B and another value for another range of values for B).

The details of the sub-time units can be according to the UE 116 provisional patent application 63/165,956 "Method and Apparatus for configuring CSI reporting granularity" filed on Mar. 25, 2021.

When there are multiple TRPs/RRHs ($N_{RRH}$>1), the UE 116 can be configured to determine a value of $N_4$ according to at least one of the following examples.

In one example, a value of $N_4$ is the same for all TRPs/RRHs.

In another example, a value of $N_4$ can be the same or different across TRPs/RRHs.

Figure 17:
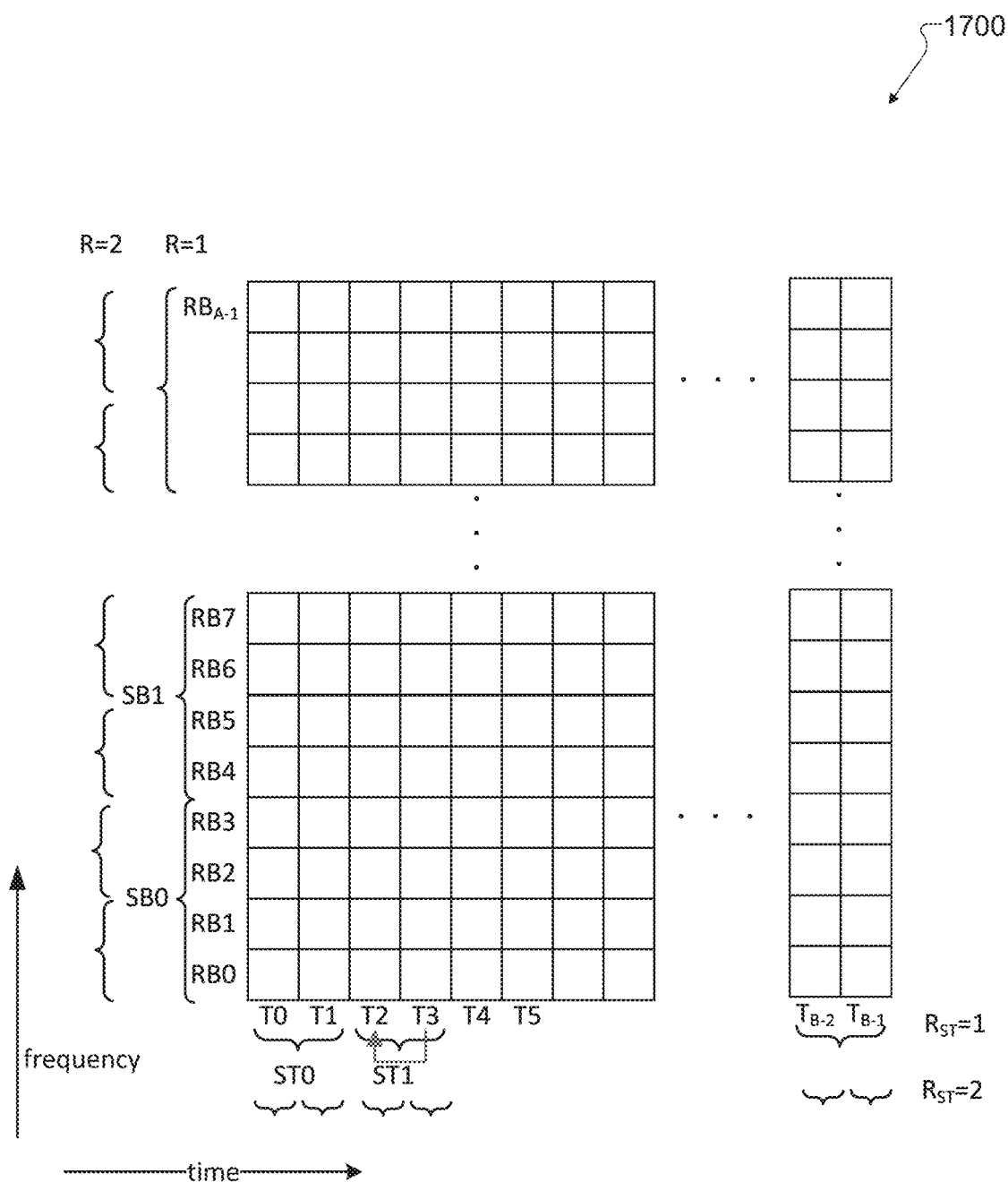
FIG. 17 is an example of a timeline for resource block (RB) and subband (SB) partitions according to embodiments of the present disclosure.

FIG. 17 is an example of a timeline 1700 for RB and SB partitions according to embodiments of the present disclosure. For example, timeline 1700 for RB and SB partitions can be utilized by the UE 116 of FIG. 3. This example is for illustration only and other embodiments can be used without departing from the scope of the present disclosure.

In another embodiment, a UE is configured with J≥1 CSI-RS bursts (as illustrated in the present disclosure) that occupy a frequency band and a time span (duration), wherein the frequency band comprises A RBs, and the time span comprises B time instances (of CSI-RS resource(s)). When J>1, the A RBs or/and B time instances can be aggregated across J CSI-RS bursts. In one example, the frequency band equals the CSI reporting band, and the time span equals the number of CSI-RS resource instances (across J CSI-RS bursts). Both can be configured to the UE 116 for a CSI reporting, which can be based on the DD compression.

The UE 116 is further configured to partition (divide) the A RBs into subbands (SBs) or/and the B time instances into sub-times (STs). The partition of A RBs can be based on a SB size value $N_{SB}$, which can be configured to the UE 116 (document and standard [8]). The partition of B time instances can be based either a ST size value $N_{ST}$ or an r value, as described in the present disclosure. With reference to FIG. 17, RB0, RB1, . . . , $RB_{A-1}$ comprise A RBs, $T_0$, $T_1$, . . . , $T_{B-1}$ comprise B time instances, the SB size $N_{SB}$=4, and the ST size $N_{ST}$=2.

When there are multiple TRPs/RRHs ($N_{RRH}$>1), the UE 116 can be configured to determine subbands (SBs) or/and sub-times (STs) according to at least one of the following examples.

In one example, both subbands (SBs) or/and sub-times (STs) are the same for all TRPs/RRHs.

In another example, subbands (SBs) are the same for all TRPs/RRHs, but sub-times (STs) can be the same or different across RRHs/TRPs.

In another example, subtimes (STs) are the same for all TRPs/RRHs, but subbands (SBs) can be the same or different across RRHs/TRPs.

In another example, both subtimes (STs) and subbands (SBs) can be the same or different across RRHs/TRPs.

For illustration, one or more examples described herein is assumed in the rest of the present disclosure.

The CSI reporting is based on channel measurements (based on CSI-RS bursts) in three-dimensions (3D): the first dimension corresponds to SD comprising $P_{CSIRS}$ CSI-RS antenna ports (in total across all of $N_{RRH}$ RRHs/TRPs), the second dimension corresponds to FD comprising $N_3$ FD units (e.g. SB), and the third dimension corresponds to DD comprising $N_4$ DD units (e.g. ST). The 3D channel measurements can be compressed using basis vectors (or matrices) similar to the Rel. 16 enhanced Type II codebook. Let $W_1$, $W_f$, and $W_d$ respectively denote basis matrices whose columns comprise basis vectors for SD, FD, and DD.

In another embodiment, the DD compression (or DD component or $W_d$ basis) can be turned OFF/ON from the codebook. When turned OFF, $W_d$ can be fixed (hence not reported), e.g., $W_d$=1 (scalar 1) or $W_d$=[1, . . . , 1] (all-one vector) or $$W_d = \frac{1}{n}[1, \ldots, 1]$$

(all-one vector) or $$W_d = I = \begin{bmatrix} 1 & 0 & 0 \\ 0 & \ddots & 0 \\ 0 & 0 & 1 \end{bmatrix}$$

(identity matrix), where n is a scaling factor (e.g. n=$N_4$) or $W_d = h_{d*} = [\phi_0^{(d*)} \phi_1^{(d*)} \ldots \phi_{N_4-1}^{(d*)}]$, where d* is an index of a fixed DD basis vector $h_{d*}$. In one example, d*=0. In one example, when the DD basis vectors comprise an orthogonal DFT basis set, $h_{d*}$ is a DD basis vector which corresponds to the DC component. When turned ON, $W_d$ (DD basis vectors) is reported.

In one example, $W_d$ is turned OFF/ON via an explicit signaling, e.g., an explicit RRC parameter.

In one example, $W_d$ is turned OFF/ON via a codebook parameter. For example, similar to M=1 in Rel.17, when N=1 is configured, W d is turned OFF, and when a value N>1 is configured, $W_d$ is turned ON. Here, N denotes a number of DD basis vectors comprising columns of $W_d$.

In one example, the UE 116 reports whether the DD component is turned OFF (not reported) or ON (reported). This reporting can be via a dedicated parameter (e.g., new UCI/CSI parameter). Or this reporting can be via an existing parameter (e.g., PMI component). A two-part UCI (cf. Rel. 15 NR) can be reused wherein the information whether $W_d$ is turned OFF/ON is included in UCI part 1.

In one example, $W_d$ is turned OFF/ON depending on the codebookType. When the codebookType is regular Type II codebook (similar to Rel 16 Type II codebook), $W_d$ is turned ON, and when the codebookType is Type II port selection codebook (similar to Rel 17 Type II codebook), $W_d$ is turned ON/OFF.

In another embodiment, a UE is configured with a CSI reporting based on a codebook, where the codebook comprises three bases (SD, FD, and DD/TD), and has a structure such that precoder for layer 1 is given by $$W_l = W_1 \tilde{W}_2 (W_{f,d})^H.$$

Where $W_1$ includes SD basis vectors.

$W_{f,d}$ includes FD basis vectors and TD/DD basis vectors.

$\tilde{W}_2$ is a coefficient matrix.

Let the length of each TD/DD basis vector be $N_4$, and the number of TD/DD basis vectors be Q. In one example, $N_4$ is configured, e.g., via higher-layer (RRC) signalling. In one example, Q is configured via RRC, or reported by the UE 116 (e.g., as part of CSI report). In one example, the legacy (Rel. 16 enhanced Type II or Rel. 17 further enhanced Type II codebook) is used for reporting $W_1$, $W_f$ (for each layer), and $\tilde{W}_2$ (for each layer).

In another example, at least one of the following examples is used/configured regarding $W_{f,d}$.

In one example, $W_{f,d} = W_f \otimes I$, hence $W_l = W_1 \tilde{W}_2 (W_f \otimes I)^H$, where the notation $\otimes$ is used for the Kronecker product. Note that when I is z×z identity matrix, then $W_f \otimes I$ implies that $W_f$ is repeated z times. Therefore, $= W_1 \tilde{W}_2 (W_f \otimes I)^H$ corresponds to one $W_1$, one $W_f$, and z number of $\tilde{W}_2$ reports. In one example, z corresponds to number of TD/DD units. In one example, z corresponds to value of $N_4$ (i.e., z=$N_4$). In one example, the legacy (Rel. 16 enhanced Type II or Rel. 17 further enhanced Type II codebook) is used for reporting one $W_1$, one $W_f$ (for each layer), and multiple $\tilde{W}_2$ (for each layer).

In one example, $W_{f,d}=W_f \otimes W_d$, hence $W_l=W_1\tilde{W}_2 (W_f \otimes W_d)^H$. In one example, $W_d$ comprises orthogonal DFT vectors as columns. The columns of the $W_d$ correspond to the DD basis vectors.

In one example, $W_{f,d}$ is according to one or more examples described herein based on a condition on the value of $N_4$. For example, For $N_4 \leq x$, $W_{f,d}$ is according to one or more examples described herein.

For $N_4 > x$, $W_{f,d}$ is according to one or more examples described herein. In one example, $W_d$ is an orthogonal DFT basis matrix commonly selected for all SD/FD bases reusing the legacy $W_1$ and $W_f$ (Rel. 16 enhanced Type II or Rel. 17 further enhanced Type II codebook). In one example, DFT vectors for DD basis has a oversampling or rotation factor ($O_4$). In one example, $O_4=4$ or 1 is fixed. In one example, $O_4$ is identical (the same) for different SD components. In one example, $O_4$ is different for different SD components.

In one example, x is fixed, e.g., x=1 or x=2.

In one example, x is configured, e.g., via higher layer (RRC) or MAC CE or DCI (e.g., CSI request field triggering a Aperiodic CSI report).

In one example, x is reported by the UE 116, e.g., the UE 116 reports the value of x via UE capability reporting, or via CSI report.

When x=1, the condition is equivalent to the following.

For $N_4=1$, $W_{f,d}$ is according to one or more examples described herein. In this case, since I=1, $W_l=W_1\tilde{W}_2 (W_f)_H$, i.e., there is no DD/TD basis, or it is replaced with a scalar value 1. In this case, the PMI reporting can be according to legacy codebook (Rel. 16 enhanced Type II or Rel. 17 further enhanced Type II codebook).

For $N_4>1$, $W_{f,d}$ is according to one or more examples described herein. In one example, $W_d$ is an orthogonal DFT basis matrix commonly selected for all SD/FD bases reusing the legacy $W_1$ and $W_f$ (Rel. 16 enhanced Type II or Rel. 17 further enhanced Type II codebook). In one example, DFT vectors for DD basis has a oversampling or rotation factor ($O_4$). In one example, $O_4=4$ or 1 is fixed. In one example, $O_4$ is identical (the same) for different SD components. In one example, $O_4$ is different for different SD components. In one example, only Q (denoting the number of selected DD basis vectors or columns of $W_d$)>1 is allowed, i.e., the UE 116 is expected to be configured with Q>1 (e.g., Q=2 or 3 or . . . ), or the UE 116 is not expected to be configured with Q=1.

In one example, at least one of the following examples is used/configured regarding the value of $N_4$.

In one example, the set of supported values for $N_4$ includes $N_4=1$. When $N_4=1$, the $W_{f,d}$ is according to one or more examples described herein. In particular, since I=1, $W_l=W_1\tilde{W}_2(W_f)^H$, i.e., there is no DD/TD basis, or it is replaced with a scalar value 1. In this case, the PMI reporting can be according to legacy codebook (Rel. 16 enhanced Type II or Rel. 17 further enhanced Type II codebook).

In one example, the set of supported values for $N_4$ does not include $N_4=2$. Or, the UE 116 is not expected to be configured with $N_4=2$. Or the UE 116 is expected to be configured with a value of $N_4 \neq 2$.

In one example, the set of supported values for $N_4$ includes $N_4=2$.

In one example, when $N_4=2$, the $W_{f,d}$ is according to one or more examples described herein, implying the DD basis is a 2×2 identity matrix I. That is, two $\tilde{W}_2$ are reported (corresponding to 2 TD units) for each layer, in addition to one $W_1$ and one $W_f$ for each layer.

In one example, when $N_4=2$, the $W_{f,d}$ is according to one or more examples described herein, implying the DD basis is an orthogonal DFT matrix $W_d$.

In one example, only Q=1 is supported (or can be configured) when $N_4=2$. Or the UE 116 is expected to be configured with Q=1 when $N_4=2$ is configured. Or the UE 116 is not expected to be configured with Q=2 when $N_4=2$ is configured.

In one example, only Q=2 is supported (or can be configured) when $N_4=2$. Or the UE 116 is expected to be configured with Q=2 when $N_4=2$ is configured. Or the UE 116 is not expected to be configured with Q=1 when $N_4=2$ is configured.

In one example, only Q=1 or only Q=2 or both Q=1,2 can be configured to a UE subject to the UE 116 capability reporting about the value of Q or/and $N_4$ from the UE 116.

In one example, when $N_4=2$, then one or more examples described herein can be used/configured regarding the value of Q or/and $W_{f,d}$. Or, when $N_4=2$, the UE 116 is not expected to be configured with Q=1 and can be configured with Q=2 or the identity DD basis according to one or more examples described herein.

In one example, the set of supported values for $N_4$ includes $N_4=3$. In one example, when $N_4=3$, the $W_{f,d}$ is according to one or more examples described herein, implying the DD basis is a orthogonal DFT matrix $W_d$. In one example, only Q=1,2 is supported (or can be configured) when $N_4=3$. Or the UE 116 is expected to be configured with Q=1 or 2 when $N_4=3$ is configured. Or the UE 116 is not expected to be configured with Q=3 when $N_4=3$ is configured. In one example, only Q>1 (e.g., Q=2 or 3) is supported (or can be configured) when $N_4=3$. Or the UE 116 is expected to be configured with Q=2 or 3 when $N_4=3$ is configured. Or the UE 116 is not expected to be configured with Q=1 when $N_4=3$ is configured.

In one example, the set of supported values for $N_4$ includes $N_4=y$, where $y \geq 3$ (i.e, {3, 4, . . . }). In one example, when $N_4=y$, the $W_{f,d}$ is according to one or more examples described herein, implying the DD basis is an orthogonal DFT matrix $W_d$. In one example, only Q=1, . . . , y−1 is supported (or can be configured) when $N_4=y$. Or the UE 116 is expected to be configured with Q=1, 2, . . . or y−1 when $N_4=y$ is configured. Or the UE 116 is not expected to be configured with Q=y when $N_4=y$ is configured. In one example, only Q>1 (e.g., Q=2 or 3 or . . . ) is supported (or can be configured) when $N_4=y$. Or the UE 116 is expected to be configured with Q=2 or 3 or when $N_4=3$ is configured. Or the UE 116 is not expected to be configured with Q=1 when $N_4=y$ is configured.

In one example, the set of supported values for $N_4$ includes {1,2}. When $N_4=1$, the $W_{f,d}$ is according to one or more examples described herein. When $N_4=2$, the $W_{f,d}$ is according to one or more examples described herein.

In one example, the set of supported values for $N_4$ includes {1,3} and does not include 2. That is, $N_4=2$ is not supported. Or the UE 116 is not expected to be configured with $N_4=2$. When $N_4=1$, the $W_{f,d}$ is according to one or more examples described herein. When $N_4=3$, the $W_{f,d}$ is according to one or more examples described herein.

In one example, the set of supported values for $N_4$ includes S or is equal to S.

In one example, S={1,2}.
In one example, S={1,3}.
In one example, S={2,3}.

In one example, S={1,2,3}.
In one example, S={1,2,4}.
In one example, S={1,3,4}.
In one example, S={2,3,4}.
In one example, S={1,2,3,4}.
In one example, S={1,2,3,4,8}.
In one example, S={1,2,3,4,8,16}.
In one example, S={1,2,3,4,8,16,32}.
In one example, S={1,3,4,8}.
In one example, S={1,3,4,8,16}.
In one example, S={1,3,4,8,16,32}.
In one example, S={1,4,8}.
In one example, S={1,4,8,16}.
In one example, S={1,4,8,16,32}.

In one example, at least one of the following examples is used/configured regarding the value of Q.

In one example, the set of supported values for Q includes Q=1. When Q=1, the $W_{f,d}$ is according to one or more examples described herein. In particular, since I=1, $W_l = W_1 \tilde{W}_2 (W_f)^H$, i.e., there is no DD/TD basis, or it is replaced with a scalar value 1 or an all-one vector or an identity matrix. In this case, the PMI reporting can be according to legacy codebook (Rel. 16 enhanced Type II or Rel. 17 further enhanced Type II codebook). In one example, the number of TD/DD unit is 1. In one example, Q=1 corresponds to a wide-time reporting, i.e., the PMI (precoding matrix) is the same for all TD/DD units, or the number of PMI or precoding matrix in TD is 1. In one example, such PMI reporting is regardless of the $N_4$ values (whether 1 or >1).

In one example, the set of supported values for Q does not include Q=1 (i.e., only Q>1 is supported or can be configured). Or the UE 116 is not expected to be configured with Q=1. Or the UE 116 is expected to be configured with a value of Q>1 (e.g., Q=2 or 3 or ...).

In one example, the set of supported values for Q includes Q=2. When Q=2, there is DD/TD compression and the $W_{f,d}$ is according to one or more examples described herein. The value of $N_4$ is either ≥2 or ≥3. In one example, $N_4$=2 is not supported when Q=2, i.e., the UE 116 is not expected to be configured with Q=2 and $N_4$=2. That is, $N_4 \geq 3$ when Q=2.

In one example, the set of supported values for Q does not include Q=2. Or the UE 116 is not expected to be configured with Q=2. Or the UE 116 is expected to be configured with a value of Q≠2.

In one example, the set of supported values for Q includes Q=q where q≥3 (i.e, {3,4, ... }). When Q=q, there can be DD compression and the $W_{f,d}$ is according to one or more examples described herein, implying the DD basis is an orthogonal DFT matrix $W_d$. In one example, only Q=q=1, ..., y−1 is supported (or can be configured) when $N_4$=y. Or the UE 116 is expected to be configured with Q=q=1, 2, ... or y−1 when $N_4$=y is configured. Or the UE 116 is not expected to be configured with Q=y when $N_4$=y is configured. In one example, only Q=q=2, ..., y−1 is supported (or can be configured) when $N_4$=y. Or the UE 116 is expected to be configured with Q=q=2, ... or y−1 when $N_4$=y is configured. Or the UE 116 is not expected to be configured with Q=1 or y when $N_4$=y is configured.

In one example, the set of supported values for Q includes {1,2}. When Q=1, the $W_{f,d}$ is according to one or more examples described herein. When Q=2, the $W_{f,d}$ is according to one or more examples described herein.

In one example, the set of supported values for Q includes {1,3} and does not include 2. That is, Q=2 is not supported. Or the UE 116 is not expected to be configured with Q=2. When Q=1, the $W_{f,d}$ is according to one or more examples described herein. When Q=3, the $W_{f,d}$ is according to one or more examples described herein.

In one example, the set of supported values for Q includes T or is equal to T or is included in (or is a subset of) T.
In one example, T={1,2}.
In one example, T={1,3}.
In one example, T={2,3}.
In one example, T={1,2,3}.
In one example, T={1,2,4}.
In one example, T={1,3,4}.
In one example, T={2,3,4}.
In one example, T={1,2,3,4}.
In one example, T={2,3, ... , $N_4$−1}.

In one example, at least one of the following examples is used/configured regarding the value of Q.

In one example, Q=$\lceil qN_4 \rceil$ where q is a fraction (e.g., ¼, ½, ¾ etc.).
In one example, Q=$qN_4$ where q is a fraction (e.g., ¼, ½, ¾ etc.).
In one example, Q=$\lfloor qN_4 \rfloor$ where q is a fraction (e.g., ¼, ½, ¾ etc.).
In one example, Q=max(2, $\lceil qN_4 \rceil$) where q is a fraction (e.g., ¼, ½, ¾ etc.).
In one example, Q=max(2, $qN_4$) where q is a fraction (e.g., ¼, ½, ¾ etc.).
In one example, Q=max(2, $\lfloor qN_4 \rfloor$) where q is a fraction (e.g., ¼, ½, ¾ etc.).

In one example, $$Q = \left\lceil \frac{N_4}{s} \right\rceil$$

where s is an integer (e.g., 1, 2, 3 etc.).

In one example, $$Q = \frac{N_4}{s}$$

where s is an integer (e.g., 1, 2, 3 etc.).

In one example $$Q = \left\lfloor \frac{N_4}{s} \right\rfloor$$

where s is an integer (e.g., 1, 2, 3 etc.).

In one example, the value q is fixed, e.g., q=½. In one example, the value q is reported by the UE 116 (e.g., via UE capability information). In one example, the value q is configured (e.g., via higher layer RRC), e.g., from $$\left\{ \frac{1}{8}, \frac{1}{4}, \frac{1}{3}, \frac{1}{2}, \frac{3}{4} \right\}.$$

In one example, the value s is fixed, e.g., s=2. In one example, the value s is reported by the UE 116 (e.g., via UE capability information). In one example, the value s is configured (e.g., via higher layer RRC), e.g., from {2,3,4,8}.

In one example, the maximum value of Q is limited to a value v. In one example, the value v is fixed, e.g., v=4. In one example, the value v is reported by the UE 116 (e.g., via UE capability information). In this case, the value of Q min(v, w) where w is according to one of the following examples.

In one example, $w=\lceil qN_4 \rceil$ where q is a fraction (e.g., ¼, ½, ¾ etc.).

In one example, $w=qN_4$ where q is a fraction (e.g., ¼, ½, ¾ etc.).

In one example, $w=\lceil qN_4 \rceil$ where q is a fraction (e.g., ¼, ½, ¾ etc.).

In one example, $w=\max(2, \lceil qN_4 \rceil)$ where q is a fraction (e.g., ¼, ½, ¾ etc.).

In one example, $w=\max(2, qN_4)$ where q is a fraction (e.g., ¼, ½, ¾ etc.).

In one example, $w=\max(2, \lfloor qN_4 \rfloor)$ where q is a fraction (e.g., ¼, ½, ¾ etc.).

In one example, $$w = \left\lceil \frac{N_4}{s} \right\rceil$$

where s is an integer (e.g., 1, 2, 3 etc.).
In one example, $$w = \frac{N_4}{s}$$

where s is an integer (e.g., 1, 2, 3 etc.).
In one example, $$w = \left\lfloor \frac{N_4}{s} \right\rfloor$$

where s is an integer (e.g., 1, 2, 3 etc.).

In one embodiment, the precoders for v layers are then given by $$W^l_{\cdot,\cdot,t,u} = \frac{1}{\sqrt{N_1 N_2 \gamma_{t,u,l}}} \begin{bmatrix} \sum_{i=0}^{L-1} v_{m_1^{(i)},m_2^{(i)}} \sum_{f=0}^{M_v-1} \sum_{d=0}^{Q-1} y_{t,l}^{(f)} \phi_{u,l}^{(d)} x_{l,i,f,d} \\ \sum_{i=0}^{L-1} v_{m_1^{(i)},m_2^{(i)}} \sum_{f=0}^{M_v-1} \sum_{d=0}^{Q-1} y_{t,l}^{(f)} \phi_{u,l}^{(d)} x_{l,i+L,f,d} \end{bmatrix},$$

$l = 1, \ldots, v,$ $$\gamma_{t,u,l} = \sum_{i=0}^{2L-1} \left| \sum_{f=0}^{M_v-1} \sum_{d=0}^{Q-1} y_{t,l}^{(f)} \phi_{u,l}^{(d)} x_{l,i,f,d} \right|^2,$$

Where
$x_{l,i,f,d}$ is the coefficient (an element of $\tilde{W}_2$) associated with codebook indices (l, i, f, d), where i is a row index of $\tilde{W}_2$ and (f, d) determine the column index k of $\tilde{W}_2$. In one example, $$x_{l,i,f,d} = p^{(1)}_{l,\lfloor \frac{i}{L} \rfloor} p^{(2)}_{l,i,f,d} \varphi_{l,i,f,d}$$

similar to Rel. 16 enhanced Type II codebook (document and standard [8]).
$v_{m_1^{(i)},m_2^{(i)}}$ is a SD basis vector with index $m_1^{(i)}, m_2^{(i)}$.
$y_{t,l}^{(f)}$ is t-th entry of the FD basis vector with index f.
$\phi_{u,l}^{(d)}$ is u-th entry of the DD/TD basis vector with index d.
The rest of the details are the same as or are similar to Rel. 16 enhanced Type II codebook (document and standard [8]).

In another example, when $W_f = W_1 \tilde{W}_2 (W_f \otimes I)^H$, $\phi_{u,l}^{(d)} = 1$ if u=d, and $\phi_{u,l}^{(d)} = 0$ if u≠d. The DD/TD basis vector $h_{d,l} = [0 \ldots 1 \ldots 0]$ comprises a '1' at index u=d, and '0' at remaining index u≠d. The precoders at FD unit t and DD/TD unit u are given by $$W^l_{\cdot,\cdot,t,u} = \frac{1}{\sqrt{N_1 N_2 \gamma_{t,u,l}}} \begin{bmatrix} \sum_{i=0}^{L-1} v_{m_1^{(i)},m_2^{(i)}} \sum_{f=0}^{M_v-1} y_{t,l}^{(f)} x_{l,i,f,u} \\ \sum_{i=0}^{L-1} v_{m_1^{(i)},m_2^{(i)}} \sum_{f=0}^{M_v-1} y_{t,l}^{(f)} x_{l,i+L,f,u} \end{bmatrix}, l = 1, \ldots, v,$$

$$\gamma_{t,u,l} = \sum_{i=0}^{2L-1} \left| \sum_{f=0}^{M_v-1} y_{t,l}^{(f)} x_{l,i,f,u} \right|^2.$$

In one example, when $W_f = W_1 \tilde{W}_2 (W_f \otimes W_d)^H$, $W_d$ comprises the DD/TD basis vectors given by $h_{d,l} = [\phi_{0,l}^{(d)} \phi_{1,l}^{(d)} \ldots \phi_{N_4-1,l}^{(d)}]$, $d = 0, 1, \ldots, Q-1$. In one example, the DD/TD basis vectors are oversampled (or rotated) orthogonal DFT vectors with the oversampling (rotation) factor $O_4$, and $$\phi_{u,l}^{(d)} = e^{j \frac{2\pi u n_{4,l}^{(d)}}{O_4 N_4}}$$

and the Q DD/TD basis vectors are also identified by the rotation index $q_{4,l} \in \{0, 1, \ldots, O_4-1\}$. In one example, the DD/TD basis vectors are orthogonal DFT vectors with the oversampling (rotation) factor $O_4=1$, and $$\phi_{u,l}^{(d)} = e^{j \frac{2\pi u n_{4,l}^{(d)}}{N_4}}.$$

In another example, the same as one or more examples described herein except that the SD basis is replaced with a port selection (PS) basis, i.e., the 2L antenna ports vectors are selected from the $P_{CSIRS}$ CSIRS ports. The rest of the details are the same as in one or more examples described herein.

In another example, whether there is any selection in SD or not depends in the value of L. If $$L = \frac{P_{CSI-RS}}{2},$$

there is no requirement for any selection in SD (since all ports are selected), and when $L < P_{CSI-RS}/2$, the SD ports are selected (hence reported), where this selection is according to at least one or more examples described herein.

In another example, the SD basis is analogous to the $W_1$ component in Rel.15/16 Type II port selection codebook (document and standard [8]), wherein the $L_l$ antenna ports or column vectors of $A_l$ are selected by the index $$q_1 \in \left\{ 0, 1, \ldots, \left\lceil \frac{P_{CSI-RS}}{2d} \right\rceil - 1 \right\}$$

(this calls for $$\left\lceil \log_2\left\lceil \frac{P_{CSI-RS}}{2d}\right\rceil\right\rceil \text{ bits}\right),$$

where $$d \leq \min\left(\frac{P_{CSI-RS}}{2}, L_l\right).$$

In one example, $d \in \{1,2,3,4\}$. To select columns of $A_l$, the port selection vectors are used, For instance, $\alpha_i = v_m$, where the quantity $v_m$ is a $P_{CSI-RS}/2$-element column vector containing a value of 1 in element m mod $P_{CSI-RS}/2$ and zeros elsewhere (where the first element is element 0). The selection matrix is then given by $$W_1 = A_l = \begin{bmatrix} X & 0 \\ 0 & X \end{bmatrix} \text{ where } X = [v_{q_1 d} \; v_{q_1 d+1} \; \cdots \; v_{q_1 d + L_l - 1}].$$

The SD basis is selected either common (the same) for the two antenna polarizations or independently for each of the two antenna polarizations.

In another example, the SD basis selects $L_l$ antenna ports freely, i.e., the $L_l$ antenna ports per polarization or column vectors of $A_l$ are selected freely by the index $$q_1 \in \left\{0, 1, \ldots, \left(\frac{\frac{P_{CSI-RS}}{2}}{L_l}\right) - 1\right\}$$

(this calls $$\left\lceil \log_2\left(\frac{\frac{P_{CSI-RS}}{2}}{L_l}\right)\right\rceil \text{ bits}\right).$$

To select columns of $A_l$, the port selection vectors are used, For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0). Let $\{x_0, x_1, \ldots, x_{L_l-1}\}$ be indices of selection vectors selected by the index $q_1$. The port selection matrix is then given by $$W_1 = A_l = \begin{bmatrix} X & 0 \\ 0 & X \end{bmatrix} \text{ where } X = [v_{x_0} \; v_{x_1} \; \cdots \; v_{x_{L_l-1}}].$$

The SD basis is selected either common (the same) for the two antenna polarizations or independently for each of the two antenna polarizations.

In one example, the SD basis selects $L_l$ antenna ports freely from $P_{CSI-RS}$ ports, i.e., the $L_l$ antenna ports or column vectors of $A_l$ are selected freely by the index $$q_1 \in \left\{0, 1, \ldots, \binom{P_{CSI-RS}}{L_l} - 1\right\}$$

(this calls for $$\left\lceil \log_2\binom{P_{CSI-RS}}{L_l}\right\rceil \text{ bits}\right).$$

To select columns of $A_l$, the port selection vectors are used. For instance, $a_i = v_m$, where the quantity $v_m$ is a $P_{CSI-RS}$-element column vector containing a value of 1 in element (m mod $P_{CSI-RS}$) and zeros elsewhere (where the first element is element 0). Let $\{x_0, x_1, \ldots, x_{L_l-1}\}$ be indices of selection vectors selected by the index $q_1$. The port selection matrix is then given by $$W_1 = A_l = \begin{bmatrix} X & 0 \\ 0 & X \end{bmatrix} \text{ where } X = [v_{x_0} \; v_{x_1} \; \cdots \; v_{x_{L_l-1}}].$$

In another example, the SD basis selects $2L_l$ antenna ports freely from $P_{CSI-RS}$ ports, i.e., the $2L_l$ antenna ports or column vectors of $A_l$ are selected freely by the index $$q_1 \in \left\{0, 1, \ldots, \binom{P_{CSI-RS}}{2L_l} - 1\right\}$$

(this calls for $$\left\lceil \log_2\binom{P_{CSI-RS}}{2L_l}\right\rceil \text{ bits}\right).$$

To select columns of $A_l$, the port selection vectors are used. For instance, $a_i = v_m$, where the quantity $v_m$ is a $P_{CSI-RS}$-element column vector containing a value of 1 in element (m mod $P_{CSI-RS}$) and zeros elsewhere (where the first element is element 0). Let $\{x_0, x_1, \ldots, x_{2L_l-1}\}$ be indices of selection vectors selected by the index $q_1$. The port selection matrix is then given by $$W_1 = A_l = \begin{bmatrix} X & 0 \\ 0 & X \end{bmatrix}$$

where $X = [v_{x_0} \; v_{x_1} \; \cdots \; v_{x_{2L_l-1}}]$.

In another embodiment, the precoders for v layers are then given by $$W^l_{\ldots,t,u} = \frac{1}{\sqrt{N_1 N_2 \gamma_{t,u,l}}} \begin{bmatrix} \sum_{i=0}^{L-1} v_{m_1^{(i)}, m_2^{(i)}} \sum_{f=0}^{M_v - 1} \sum_{d=0}^{Q-1} y_{t,l}^{(f)} \phi_{u,l}^{(d)} x_{l,i,f,d} \\ \sum_{i=0}^{L-1} v_{m_1^{(i)}, m_2^{(i)}} \sum_{f=0}^{M_v - 1} \sum_{d=0}^{Q-1} y_{t,l}^{(f)} \phi_{u,l}^{(d)} x_{l,i+L,f,d} \end{bmatrix},$$

$$l = 1, \ldots, v,$$

$$\gamma_{t,u,l} = \sum_{i=0}^{2L-1} \left| \sum_{f=0}^{M_v - 1} \sum_{d=0}^{Q-1} y_{t,l}^{(f)} \phi_{u,l}^{(d)} x_{l,i,f,d} \right|^2,$$

Where
$x_{l,i,f,d}$ is the coefficient (an element of $\tilde{W}_2$) associated with codebook indices (l, i, f, d), where i is a row index of $\tilde{W}_2$ and (f, d) determine the column index k of $\tilde{W}_2$. In one example, $$x_{l,i,f,d} = p_{l,i\left\lfloor\frac{i}{L}\right\rfloor}^{(1)} p_{l,i,f,d}^{(2)} \varphi_{l,i,f,d}$$

similar to Rel. 16 enhanced Type II codebook (document and standard [8]).

$v_{m_1^{(i)}, m_2^{(i)}}$ is a SD basis vector with index $m_1^{(i)}, m_2^{(i)}$.

$y_{r,l}^{(f)}$ is t-th entry of the FD basis vector with index f.

$\phi_{u,l}^{(d)}$ is u-th entry of the DD/TD basis vector with index d.

The rest of the details are the same as or are similar to Rel. 16 enhanced Type II codebook (document and standard [8]).

The amplitude coefficient indicators, e.g., $i_{2,3,l}$ and $i_{2,4,l}$, indicate the values of amplitudes $p_{l,p}^{(1)}$ and $p_{l,i,f,d}^{(2)}$, respectively. In one example, they are given by $$i_{2,3,l}=[k_{l,0}^{(1)}, k_{l,1}^{(1)}]$$

$$i_{2,4,l}=[k_{l,0}^{(2)} \ldots k_{l,M_v-1}^{(2)}]$$

$$k_{l,f}^{(2)}=[k_{l,f,0}^{(2)} \ldots k_{l,f,Q-1}^{(2)}]$$

$$k_{l,f,d}^{(2)}=[k_{l,0,f,d}^{(2)} \ldots k_{l,2L-1,f,d}^{(2)}]$$

$$k_{l,p}^{(1)} \in \{1, \ldots, 15\}$$

$$k_{l,i,f,d}^{(2)} \in \{0, \ldots, 7\}$$

for $l=1, \ldots, v$.

In one example, they are given by $$i_{2,3,l}=[k_{l,0}^{(1)}, k_{l,1}^{(1)}]$$

$$i_{2,4,l}=[k_{l,0}^{(2)} \ldots k_{l,M_v-1}^{(2)}]$$

$$k_{l,f}^{(2)}=[k_{l,0,f}^{(2)} \ldots k_{l,2L-1,f}^{(2)}]$$

$$k_{l,i,f}^{(2)}=[k_{l,i,f,0}^{(2)} \ldots k_{l,i,f,Q-1}^{(2)}]$$

$$k_{l,p}^{(1)} \in \{1, \ldots, 15\}$$

$$k_{l,i,f,d}^{(2)} \in \{0, \ldots, 7\}$$

for $l=1, \ldots, v$.

The phase coefficient indicator, e.g., $i_{2,5,l}$ indicates the values of the phases $\varphi_{l,i,f,d}$. In one example, it is given by $$i_{2,5,l}=[c_{l,0} \ldots c_{l,M_v-1}]$$

$$c_{l,f}=[c_{l,f,0} \ldots c_{l,f,Q-1}]$$

$$c_{l,f,d}=[c_{l,0,f,d} \ldots c_{l,2L-1,f,d}]$$

$$c_{l,i,f,d} \in \{0, \ldots, 15\}$$

for $l=1, \ldots, v$.

In one example, it is given by $$i_{2,5,l}=[c_{l,0} \ldots c_{l,M_v-1}]$$

$$c_{l,f}=[c_{l,0,f} \ldots c_{l,2L-1,f}]$$

$$c_{l,i,f}=[c_{l,i,f,0} \ldots c_{l,i,f,Q-1}]$$

$$c_{l,i,f,d} \in \{0, \ldots, 15\}$$

for $l=1, \ldots, v$.

Ley $K_0$ be the maximum number of non-zero (NZ) coefficients for a layer. In one example, $K_0 = \lceil \beta 2LM_1 \rceil$. In one example, $K_0 = \lceil \beta 2LM_1 Q \rceil$. In one example, $\beta$ is the same as (is at least one of) in Rel.16/17 codebook (Table 1, Table 2). In one example, $\beta$ is $$\frac{x}{Q} \text{ or } \left\lfloor \frac{x}{Q} \right\rfloor \text{ or } \left\lceil \frac{x}{Q} \right\rceil$$

where x is the same as (or at least one of) in Rel.16/17 codebook. In one example, $K_0 = \lceil \mu\beta 2LM_1 Q \rceil$ or $\lceil \mu\beta 2LM_1 \rceil$ where $\beta$ is the same as (or at least one of) $\beta$ in Rel.16/17 codebook and $\mu$ is scaling such that $0 < \mu \le 1$.

The bitmap whose nonzero bits identify which coefficients in $i_{2,4,l}$ and $i_{2,5,l}$ are reported, is indicated by an indicator, e.g., $i_{1,7,l}$. In one example, $$i_{1,7,l}=[k_{l,0}^{(2)} \ldots k_{l,M_v-1}^{(3)}]$$

$$k_{l,f}^{(3)}=[k_{l,0,f}^{(3)} \ldots k_{l,2L-1,f}^{(3)}]$$

$$k_{l,i,f}^{(3)}=[k_{l,i,f,0}^{(3)} \ldots k_{l,i,f,Q-1}^{(3)}]$$

$$k_{l,i,f,d}^{(3)} \in \{0,1\}$$

for $l=1, \ldots, v$.

In one example, $$i_{1,7,l}=[k_{l,0}^{(3)} \ldots k_{l,M_v-1}^{(3)}]$$

$$k_{l,f}^{(3)}=[k_{l,f,0}^{(3)} \ldots k_{l,f,d}^{(3)}]$$

$$k_{l,f,d}^{(3)}=[k_{l,0,f,d}^{(3)} \ldots k_{l,2L-1,f,d}^{(3)}]$$

$$k_{l,i,f,d}^{(3)} \in \{0,1\}$$

for $l=1, \ldots, v$.

In one example, $K_l^{NZ} = \sum_{i=0}^{2L-1} \sum_{f=0}^{M_v-1} \sum_{d=0}^{Q-1} k_{l,i,f,d}^{(3)} \le K_0$ is the number of nonzero coefficients for layer $l=1, \ldots, v$. In one example, $K^{NZ} = \sum_{i=1}^{v} K_l^{NZ} \le T$ is the total number of nonzero coefficients, where T is an upper bound, which can be fixed (e.g., $2K_0$) or configured, or reported by the UE 116 (e.g., in UCI part 1 or via UE capability reporting).

The indices of $i_{2,4,l}, i_{2,5,l}$ and $i_{1,7,l}$ are associated to the $M_v$ codebook indices in $n_{3,l}$ and the Q codebook indices in $n_{4,l}$.

In one example, the bitmap(s) for indicating the locations of the NZCs (via $k_{l,i,f,d}^{(3)}$) is according to at least one of the following examples.

In one example, for each layer, there are Q different 2-dimensional bitmaps (one for each DD/TD basis vector), i.e., the size of the bitmap for each selected DD basis vector is $2LM_v$. The total payload (number of bits) for bitmap reporting is $2LM_v Q$ for each layer, hence $v2LM_v Q$ for v layers.

In one example, for each layer, there are Q different 2-dimensional bitmaps (one for each DD/TD basis vector), i.e., the size of the bitmap for each selected DD basis vector is $2LM_v$. In additional, each bitmap is further compressed using a lossless source-coding scheme. In one example, Huffman coding is used to as the lossless source-coding scheme.

In one example, for each layer, there is a single (one) 2-dimensional bitmap of size $2LM_v$ for indicating the location of the NZCs across SD and FD basis vectors, and another bitmap of size $M_v Q$ to report the association of each DD basis vector to each FD basis vector. The total payload (number of bits) for bitmap reporting is $2LM_v + M_v Q$ for each layer, hence $v(2LM_v + M_v Q)$ for v layers. Let Z denote the number of non-zeros (i.e., '1's) in the second bitmap (of size $M_v Q$). In one example, there is at least one restriction (or condition) associated with this example of bitmap reporting. At least one of the following examples is used/configured as the restriction (condition)

In one example, the min number of non-zeros (i.e., '1's) in the second bitmap (of size $M_v Q$) is $M_v$, i.e., $M_v \le Z$.

In one example, the max number of non-zeros (i.e., '1's) in the second bitmap (of size $M_vQ$) is $M_v$, i.e., $Z \leq M_v$.

In one example, the min number of non-zeros (i.e., '1's) in the second bitmap (of size $M_vQ$) is $T_1$, where $T_1$ is fixed, or configured or reported by the UE 116 (e.g., via UCI part 1, or UE capability reporting), i.e., $T_1 \leq Z$. In one example, $T_1 = \lceil \gamma_1 M_v Q \rceil$ where $\gamma_1$ is fraction between 0 and 1. In one example, $\gamma_1$ is configured from a set of values, e.g. {½,¾} or {½,1} or {½,¾,1}.

In one example, the max number of non-zeros (i.e., '1's) in the second bitmap (of size $M_vQ$) is $T_2$, where $T_2$ is fixed, or configured or reported by the UE 116 (e.g., via UCI part 1, or UE capability reporting), i.e., $Z \leq T_2$. In one example, $T_2 = \lceil \gamma_2 M_v Q \rceil$ where $\gamma_2$ is fraction between 0 and 1. In one example, $\gamma_2$ is configured from a set of values, e.g. {½,¾} or {½,1} or {½,¾,1}.

In one example, the min number of non-zeros (i.e. '1's) in the second bitmap (of size $M_vQ$) is $T_1$ and the max number of non-zeros (i.e. '1's) in the second bitmap (of size $M_vQ$) is $T_2$, i.e., $T_1 \leq Z \leq T_2$ where $T_1$ or/and $T_2$ is fixed, or configured or reported by the UE 116 (e.g. via UCI part 1, or UE capability reporting). In one example, $T_1 = \lceil \gamma_1 M_v Q \rceil$ where $\gamma_1$ is fraction between 0 and 1. In one example, $T_2 = \lceil \gamma_2 M_v Q \rceil$ where $\gamma_2$ is fraction between 0 and 1. Here, $\gamma_1 < \gamma_2$. In one example, $\gamma_1$ or/and $\gamma_2$ is configured from a set of values, e.g. {½,¾} or {½,1} or {½,¾,1}.

In one example, each FD basis vector is one-to-one associated with one of the Q DD/TD basis vector, i.e., $M_v = Z$.

In one example, each FD basis vector is associated with at least one of the Q DD/TD basis vector.

In one example, for each layer, there is a single (one) 2-dimensional bitmap of size $2LM_v$ for indicating the location of the NZCs across SD and FD basis vectors, and M v separate indicators, each $\lceil \log_2 Q \rceil$ bits (e.g. each 1-bit when Q=2) to report the one-to-one association of each DD basis vector to exactly one FD basis vector. The total payload (number of bits) for bitmap reporting is $2LM_v + M_v \lceil \log_2 Q \rceil$ for each layer, hence $v(2LM_v + M_v \lceil \log_2 Q \rceil)$ for v layers.

In one example, for each layer, there is a single (one) 2-dimensional bitmap of size $2LM_v$ for indicating the location of the NZCs across SD and FD basis vectors, and another bitmap of size $K_0'Q$ to report the association of each DD basis vector to each non-zero coefficients across SD and FD basis vectors, where $K_0'$ is the number of NZ coefficients across SD and FD basis vectors. In one example, $K_0' = \lceil \beta 2LM_1 \rceil$. The total payload (number of bits) for bitmap reporting is $2LM_v + K_0'Q$ for each layer, hence $v(2LM_v + K_0'Q)$ for v layers. Let Y denote the number of non-zeros (i.e., '1's) in the second bitmap (of size $K_0'Q$). In one example, there is at least one restriction (or condition) associated with this example of bitmap reporting. At least one of the following examples is used/configured as the restriction (condition)

In one example, the min number of non-zeros (i.e., '1's) in the second bitmap (of size $K_0'Q$) is $K_0'$, i.e., $K_0' \leq Y$.

In one example, the max number of non-zeros (i.e., '1's) in the second bitmap (of size $K_0'Q$) is $K_0'$, i.e., $Y \leq K_0'$.

In one example, the min number of non-zeros (i.e., '1's) in the second bitmap (of size $K_0'Q$) is $T_1$, where $T_1$ is fixed, or configured or reported by the UE 116 (e.g., via UCI part 1, or UE capability reporting), i.e., $T_1 \leq Y$. In one example, $T_1 = \lceil \gamma_1 K_0' Q \rceil$ where $\gamma_1$ is fraction between 0 and 1. In one example, $\gamma_1$ is configured from a set of values, e.g. {½,¾} or {½,1} or {½,¾,1}.

In one example, the max number of non-zeros (i.e., '1's) in the second bitmap (of size $K_0'Q$) is $T_2$, where $T_2$ is fixed, or configured or reported by the UE 116 (e.g., via UCI part 1, or UE capability reporting), i.e., $Y \leq T_2$. In one example, $T_2 = \lceil \gamma_2 K_0' Q \rceil$ where $\gamma_2$ is fraction between 0 and 1. In one example, $\gamma_2$ is configured from a set of values, e.g. {½,¾} or {½,1} or {½,¾,1}.

In one example, the min number of non-zeros (i.e. '1's) in the second bitmap (of size $K_0'Q$) is $T_1$ and the max number of non-zeros (i.e. '1's) in the second bitmap (of size $M_vQ$) is $T_2$, i.e., $T_1 \leq Y \leq T_2$ where $T_1$ or/and $T_2$ is fixed, or configured or reported by the UE 116 (e.g. via UCI part 1, or UE capability reporting). In one example, $T_1 = \lceil \gamma_1 K_0' Q \rceil$ where $\gamma_1$ is fraction between 0 and 1. In one example, $T_2 = \lceil \gamma_2 K_0' Q \rceil$ where $\gamma_2$ is fraction between 0 and 1. Here, $\gamma_1 < \gamma_2$. In one example, $\gamma_1$ or/and $\gamma_2$ is configured from a set of values, e.g. {½,¾} or {½,1} or {½,¾,1}.

In one example, each of the $K_0'$NZ coefficient is one-to-one associated with one of the Q DD/TD basis vector, i.e., $K_0' = Y$.

In one example, each of the $K_0'$NZ coefficient is associated with at least one of the Q DD/TD basis vector.

In one example, for each layer, there are two bitmaps, a first bitmap of size $M_vQ$ bits for selecting Z (FD, DD) basis vectors pairs from a total of $M_vQ$ pairs, and a second bitmap of size 2LZ bits for indicating the location of the NZCs across SD basis vectors, and Z (FD, DD) basis vector pairs. The total payload (number of bits) for bitmap reporting is $2LZ + M_vQ$ for each layer, hence $v(2LZ + M_vQ)$ for v layers.

Note that Z denote the number of non-zeros (i.e., '1's) in the first bitmap (of size $M_vQ$), hence essentially is equivalent to a joint selection of Z (FD, DD) basis vector pairs from a total of $M_vQ$ pairs. Also, when $Z = M_vQ$, the first bitmap has all '1's, hence not required (reported), i.e., we only have one bitmap of size $2LM_vQ$, implying it is the same as one or more examples described herein. At least one of the following examples is used/configured regarding the value of Z.

In one example, Z is fixed, e.g., $Z = M_v$ or $$\frac{2}{Q}.$$

In one example, Z depends on Q, e.g., $$Z = \frac{2}{Q}.$$

In one example, the min value of Z is fixed, e.g., $$M_v \leq Z \text{ or } \frac{2}{Q} \leq Z.$$

In one example, the min value of Z depends on Q, e.g., $$\frac{2}{Q} \leq Z.$$

In one example, the max value of Z is fixed, e.g., $Z = M_vQ$.
In one example, the max value of Z depends on Q, e.g., $Z = \min(2M_v, M_vQ)$.

In one example, the bitmap reporting depends on the Q value, i.e., according to one of the examples herein when Q=2 and another example when Q>2 (e.g., Q=3 or 4). For example:
- When Q=2, the bitmap reporting is according to one or more examples described herein, i.e., the total payload (number of bits) for bitmap reporting is $2LM_vQ$ for each layer (i.e., $2LM_v$ bit for each of the Q DD basis vectors). The details are as explained herein.
- When Q>2 (e.g. Q=3 or 4), the bitmap reporting is according to one or more examples described herein, i.e., a first bitmap of size $M_vQ$ bits for selecting Z (FD, DD) basis vectors pairs from a total of $M_vQ$ pairs, and a second bitmap of size 2LZ bits for indicating the location of the NZCs across SD basis vectors, and Z (FD, DD) basis vector pairs. The details are as explained herein.

Alternatively, the example herein is equivalent to another example in which there is a restriction on Z such that $2M_v \leq Z \leq QM_v$ (e.g., $Z=\gamma QM_v$, where $2 \leq \gamma \leq Q$).
- When Q=2, $\gamma=2$ and $Z=2M_v$, implying it is the same as one or more examples described herein (since the first bitmap is not reported), as explained herein.
- When Q>2 (e.g., Q=3 or 4), $2M_v \leq Z \leq QM_v$, hence the first bitmap may call for reporting.

In general, there can be a restriction on Z, i.e., $T_1 \leq Z \leq T_2$. where $T_1$ or/and $T_2$ is fixed or configured or reported by the UE 116 (e.g., via UCI part 1, or UE capability reporting). In one example, $T_1 = \lceil \gamma_1 M_v Q \rceil$ where $\gamma_1$ is fraction between 0 and 1. In one example, $T_2 = \lceil \gamma_2 M_v Q \rceil$ where $\gamma_2$ is fraction between 0 and 1. Here, $\gamma_1 < \gamma_2$. In one example, $\gamma_1$ or/and $\gamma_2$ is configured from a set of values, e.g. {½,¾} or {½,1} or {½,¾,1}. In one example, $\gamma_1$ is fixed, e.g., $$\gamma_1 = \frac{2}{Q}.$$

In one example, $\gamma_2$ is fixed, e.g., $\gamma_2=1$. When $$\gamma_1 = \frac{2}{Q}$$

and $\gamma_2=1$, then $T_1 \leq Z \leq T_2$ is equivalent to $2M_v \leq Z \leq QM_v$, as in one or more examples herein.

In one example, for each layer, for each DD basis d=0, ..., Q−1, the number of FD basis vector $S^{(d)}=M^{(d)} \leq M_v$ is reported such that their sum $\Sigma M^{(d)}=S$ (e.g. $S=M_v$ or $2M_v$). In one example, S is higher layer configured from a set of values (e.g. {$M_v$, $cM_v$}, where c can be one of 1, 1.25, 1.5) or fixed (e.g., to M r). Here, $M^{(d)}$ can be 0. In one example, $S^{(d)}>0$ (at least one FD basis is selected for each DD basis). In one example, since $M_v$ FD basis vectors can be assumed to be ordered in decreasing power (e.g. within a window of basis vectors), the payload $A = \lceil \log_2 M_v \rceil$ bits per q. For each d, when $M^{(d)}>0$, a bitmap of size $2LM^{(d)}$ is reported, i.e., the total size of the bitmap is $B=2L\Sigma M^{(d)}=2LS$. The total payload therefore is AQ+B.

In one example, the UE 116 selects $M^{(d)}=S^{(d)} \leq M_v$, d=0,1 from $M_v$ FD bases and is reported using a bitmap of length $M_vQ=2M_v$ bits (two bitmaps, each size $M_v$, for the two DD bases).

Note that, when Q=1 (or $N_4=1$), $M^{(0)}=M_v$, which is the same as legacy payload (i.e., Rel. 16/17 Type II codebooks). Also, when $S=2M_v$, When Q=2, $M^{(d)}=M_v$ for all d. Hence, there is no requirement for $M^{(d)}$ reporting.

When Q=3, $M^{(d)}$ calls for reporting.

In one example, the bitmap reporting depends on the Q value or/and can change (be different) across DD basis vectors, i.e., according to one of the examples herein when Q=2 or for the two DD basis vectors (when Q>2). For example, when Q=2, the bitmap reporting is according to one or more examples described herein, i.e., the total payload (number of bits) for bitmap reporting is $2LM_vQ$ for each layer (i.e., $2LM_v$ bit for each of the Q DD basis vectors). The details are as explained herein. When Q>2 (e.g. Q=3 or 4), for the two DD basis vectors (e.g. d=0,1), the bitmap reporting is the same as that for Q=2, and for the third (ore remaining) basis vector(s) (i.e., d=2, ... ), the NZC locations are a function of (derived from or depend on) those for the $1^{st}$ and $2^{nd}$ DD basis vectors. Hence, the bitmap for the third (ore remaining) basis vector(s) is/are not reported.

In one example, the NZC locations for d=2, ... ($3^{rd}$ or remaining basis vectors) are the same as the NZC locations for q=0 ($1^{st}$ basis vector) or d=1 ($2^{nd}$ basis vector).

In one example, the NZC locations for d=2, ... ($3^{rd}$ or remaining basis vectors) are the intersection (common) of the NZC locations for d=0 ($1^{st}$ basis vector) and d=1 ($2^{nd}$ basis vector). Or) equivalently, $k_{l,i,f,d}^{(3)}=k_{l,i,f,0}^{(3)} \times k_{l,i,f,1}^{(3)}$ for d=2, ....

In one example, the bitmap reporting depends on the Q value or/and can change (be different) across DD basis vectors, i.e., according to one of the examples described herein when Q=2 or for the two DD basis vectors (when Q>2). For example, when Q=2, the bitmap reporting is according to one or more examples described herein, i.e., the total payload (number of bits) for bitmap reporting is $2LM_vQ$ for each layer (i.e., $2LM_v$ bit for each of the Q DD basis vectors). The details are as explained herein. When Q>2 (e.g. Q=3 or 4), for the two DD basis vectors (e.g. d=0,1), the bitmap reporting is the same as that for Q=2, and for the third (ore remaining) basis vector(s) (i.e., d=2, ... ), the bitmap is extended (derived from) the 2 bitmaps, e.g. using a vector, i.e., $c_3=[c_1\ c_2]v$ where $$v = \begin{bmatrix} v_1 \\ v_2 \end{bmatrix},$$

i.e., $c_3=c_1v_1+c_2v_2$. In general, for d=2, ... , $c_d=[c_1\ c_2]v_d$ where $$v_d = \begin{bmatrix} v_{d,1} \\ v_{d,2} \end{bmatrix},$$

i.e., $c_d=c_1v_{d,1}+c_2v_{d,2}$. In one example, $0 \leq v_{d,i}$, $v_i \leq 1$ (i=1,2) such that $v_{d,1}+v_{d,2}=1$ or $v_1+v_2=1$.

In one example, the bitmap(s) for q=2, ... is/are not reported (they are derived as explained herein), but NZCs are reported.

In one example, both the bitmap(s) and coefficients for q=2, ... is/are not reported (they are derived as explained herein).

In one example, for each layer, there are two bitmaps, a first bitmap of size 2LQ bits for selecting Z (SD, DD) basis vectors pairs from a total of 2LQ pairs, and a second bitmap of size $M_vZ$ bits for indicating the location of the NZCs across FD basis vectors, and Z (SD, DD) basis vector pairs. The total payload (number of bits) for bitmap reporting is $M_vZ+2LQ$ for each layer, hence $v(M_vZ+2LQ)$ for v layers.

Note that Z denote the number of non-zeros (i.e., '1's) in the first bitmap (of size 2LQ). Hence, it is essentially equivalent to a joint selection of Z (SD, DD) basis vector pairs from a total of 2LQ pairs. Also, when Z=2LQ, the first bitmap has all '1's, hence not required (reported), i.e., we only have one bitmap of size $2LM_vQ$, implying it is the same as one or more examples described herein. At least one of the following examples is used/configured regarding the value of Z.

In one example, Z is fixed, e.g., Z=2L or $$\frac{2}{Q}.$$

In one example, Z depends on Q, e.g., $$Z = \frac{2}{Q}.$$

In one example, the min value of Z is fixed, e.g., 2L≤Z or $$\frac{2}{Q} \leq Z.$$

In one example, the min value of Z depends on Q, e.g., $$\frac{2}{Q} \leq Z.$$

In one example, the max value of Z is fixed, e.g., Z=2LQ.
In one example, the max value of Z depends on Q, e.g., Z=min(4L, 2LQ).

In one example, the bitmap reporting depends on the Q value, i.e., according to one or more examples described herein when Q=2 and another example when Q>2 (e.g., Q=3 or 4). For example:
  When Q=2, the bitmap reporting is according to one or more examples described herein, i.e., the total payload (number of bits) for bitmap reporting is $2LM_vQ$ for each layer (i.e., $2LM_v$ bit for each of the Q DD basis vectors). The details are as explained herein.
  When Q>2 (e.g. Q=3 or 4), the bitmap reporting is according to one or more examples described herein, i.e., a first bitmap of size 2LQ bits for selecting Z (SD, DD) basis vectors pairs from a total of 2LQ pairs, and a second bitmap of size $M_vZ$ bits for indicating the location of the NZCs across FD basis vectors, and Z (SD, DD) basis vector pairs. The details are as explained herein.

In another example, for each layer, there are two bitmaps, a first bitmap of size $2LM_v$ bits for selecting Z (SD, FD) basis vectors pairs from a total of $2LM_v$ pairs, and a second bitmap of size QZ bits for indicating the location of the NZCs across DD basis vectors, and Z (SD, FD) basis vector pairs. The total payload (number of bits) for bitmap reporting is $QZ+2LM_v$ for each layer, hence $v(QZ+2LM_v)$ for v layers.

Note that Z denote the number of non-zeros (i.e., '1's) in the first bitmap (of size $2LM_v$), hence essentially is equivalent to a joint selection of Z (SD, FD) basis vector pairs from a total of $2LM_v$ pairs. Also, when $Z=2LM_v$, the first bitmap has all '1's, hence not required (reported), i.e., we only have one bitmap of size $2LM_vQ$, implying it is the same one or more examples described herein. At least one of the following examples is used/configured regarding the value of Z.

In one example, Z is fixed, e.g., Z=2L or $$\frac{2}{Q}.$$

In one example, Z depends on Q, e.g., $$Z = \frac{2}{Q}.$$

In one example, the min value of Z is fixed, e.g., 2L≤Z or $$\frac{2}{Q} \leq Z.$$

In one example, the min value of Z depends on Q, e.g., $$\frac{2}{Q} \leq Z.$$

In one example, the max value of Z is fixed, e.g., Z=2LQ.
In one example, the max value of Z depends on Q, e.g., Z=min(4L, 2LQ).

In another example, the bitmap reporting depends on the Q value, i.e., according to one of the examples herein when Q=2 and another example when Q>2 (e.g., Q=3 or 4). For example:
  When Q=2, the bitmap reporting is according to one or more examples described herein, i.e., the total payload (number of bits) for bitmap reporting is $2LM_vQ$ for each layer (i.e., $2LM_v$ bit for each of the Q DD basis vectors). The details are as explained herein.
  When Q>2 (e.g. Q=3 or 4), the bitmap reporting is according to one or more examples described herein, i.e., a first bitmap of size $2LM_v$ bits for selecting Z (SD, FD) basis vectors pairs from a total of $2LM_v$ pairs, and a second bitmap of size QZ bits for indicating the location of the NZCs across DD basis vectors, and Z (SD, FD) basis vector pairs. The details are as explained herein.

In one embodiment, the size of the bitmap is $\mu\beta 2LM_1Q$ bits for a layer and the maximum number of non-zero (NZ) coefficients for a layer $K_0=\lceil \mu\beta 2LM_1Q \rceil$ or $\lceil \mu\beta 2LM_1 \rceil$, where $\beta$ is the same as (or at least one of) $\beta$ in Rel.16/17 codebook and $\mu=c$ is a scaling such that $0<c\leq 1$. Note that when $\mu=1$, then this is equivalent to one or more examples described herein.

Or, the size of the bitmap is $2LM_1Q$ bits for a layer and the maximum number of non-zero (NZ) coefficients for a layer $K_0=\lceil \mu\beta 2LM_1Q \rceil$ or $\lceil \mu\beta 2LM_1 \rceil$, where $\beta$ is the same as (or at least one of) $\beta$ in Rel.16/17 codebook and $\mu=c$ is a scaling such that $0<c\leq 1$. Note that when $\mu=1$, then this is equivalent to one or more examples described herein.

In a variation, the size of the bitmap is $\mu 2LM_1Q$ or $\mu 2LM_1Q$ bits for a layer and the maximum number of non-zero (NZ) coefficients for a layer $K_0 = \lceil \mu\beta 2LM_1Q \rceil$ or $\lceil \mu\beta 2LM_1 \rceil$, where $\beta$ is the same as (or at least one of) $\beta$ in Rel.16/17 codebook and $\mu=c$ is a scaling such that $0<c\leq 1$. Note that when $\mu=1$, then this is equivalent to one or more examples described herein.

In one example, when Q=1 or $N_4=1$, then $\mu=1$, implying that the size of the bitmap is $2LM_1$ or $2LM_1Q$ bits for a layer and the maximum number of non-zero (NZ) coefficients for a layer $K_0 = \lceil \beta 2LM_1 \rceil$ or $K_0 = \lceil \beta 2LM_1Q \rceil$.

In one example, when Q>1 (e.g. Q=2) or $N_4>1$, then $\mu=1$ or $\mu=c<1$, implying that the size of the bitmap is $\mu 2LM_1Q$ bits for a layer and the maximum number of non-zero (NZ) coefficients for a layer $K_0 = \lceil \beta 2LM_1Q \rceil$.

In one example, c is fixed, e.g., to c=½. In one example, c is configured (e.g., via RRC) or/and MAC CE or/and DCI, explicitly via a dedicated parameter/field/codepoint or implicitly via another parameter/field/codepoint. In one example, the value of c is reported by the UE 116, e.g., via the UE 116 capability reporting, or via the CSI part 1 (or UCI part 1) of the two-part (CSI or) UCI that carries the CSI. When via reported via the CSI, it can report explicitly via a dedicated parameter/field/codepoint or implicitly via another parameter/field/codepoint.

In one example, if a first condition (C1) is met/satisfied, c=1, else if a second condition (C2) is met/satisfied, c=x<1, else (C3) c=y<x.

In one example, $$(y, x, 1) = \left(\frac{1}{4}, \frac{1}{2}, 1\right), \text{ or } \left(\frac{1}{2}, \frac{3}{4}, 1\right), \text{ or, } \left(\frac{3}{4}, \frac{7}{8}, 1\right).$$

In one example, $$(y, x, 1) = \left(\frac{1}{Q}, \frac{2}{Q}, \ldots, 1\right), Q > 2.$$

In one example, (y, x, 1) can be configured.

In one example, the conditions C1, C2, and C3 are according to at least one of the following examples.

In one example, they are determined based on higher layer parameter paramCombination-Doppler-r18 (let us denote it as C) that configures (L, $p_v$, $\beta$) (similar to Rel.15 enhanced Type II codebook). When C takes a value from {1, 2 ..., N}, the condition C1 can correspond to $C \in [1 \ldots i]$ or $C \leq i$ and C2 can correspond to $C \in [i+1 \ldots j]$ or $i < C \leq j$ or $i+1 \leq C \leq j$, and the C3 can correspond to $C \in [j+1 \ldots N]$ or $j < C \leq N$ or $j+1 \leq C \leq N$. In one example, N=6,7, or 8 and (i,j)=(2,4), (2,5), (2,6), (3,4), (3,5), (3,6), (4,5), or (4,6).

In one example, they are determined based on $2LM_v$ (let us denote it as $D=2LM_v$). The condition C1 can correspond to $D \in [v_1 \ldots v_2]$ or $D \leq v_2$ and C2 can correspond to $D \in [v_2+1 \ldots v_3]$ or $v_2 < D \leq v_3$ or $v_2+1 \leq D \leq v_3$, and the C3 can correspond to $D \in [v_3+1 \ldots V]$ or $v_3+1 < D \leq V$ or $v_3+1 \leq D \leq V$. In one example, $v_i$ is the value of $D=2LM_v$ determined based on paramCombination-Doppler-r18 C=i, and $(v_2, v_3)$=(2,4), (2,5), (2,6), (3,4), (3,5), (3,6), (4,5), or (4,6).

In one example, they are determined based on $\beta$. The condition C1 can correspond to $\beta \in [v_1 \ldots v_2]$ or $\beta \leq v_2$ and C2 can correspond to $\beta \in [v_2+1 \ldots v_3]$ or $v_2 < \beta \leq v_3$ or $v_2+\beta \leq v_3$, and the C3 can correspond to $\beta \in [v_3+1 \ldots V]$ or $v_3+1 < \beta \leq V$ or $v_3+1 \leq \beta \leq V$. In one example, $v_i$ is the value of $\beta$ determined based on paramCombination-Doppler-r18 C=i, and $(v_2, v_3)$=(2,4), (2,5), (2,6), (3,4), (3,5), (3,6), (4,5), or (4,6).

In one example, they are determined based on $2LM_v\beta$ (let us denote it as $D=2LM_v\beta$). The condition C1 can correspond to $D \in [v_1 \ldots v_2]$ or $D \leq v_2$ and C2 can correspond to $D \in [v_2+1 \ldots v_3]$ or $v_2 < D \leq v_3$ or $v_2+1 \leq D \leq v_3$, and the C3 can correspond to $D \in [v_3+1 \ldots V]$ or $v_3+1 < D \leq V$ or $v_3+1 \leq D \leq V$. In one example, $v_i$ is the value of $D=2LM_v\beta$ determined based on paramCombination-Doppler-r18 C=i, and $(v_2, v_3)$=(2,4), (2,5), (2,6), (3,4), (3,5), (3,6), (4,5), or (4,6).

In one example, they are determined based on $2Lp_v\beta$ (let us denote it as $D=2Lp_v\beta$). The condition C1 can correspond to $D \in [v_1 \ldots v_2]$ or $D \leq v_2$ and C2 can correspond to $D \in [v_2+1 \ldots v_3]$ or $v_2 < D \leq v_3$ or $v_2+1 \leq D \leq v_3$, and the C3 can correspond to $D \in [v_3+1 \ldots V]$ or $v_3+1 < D \leq V$ or $v_3+1 \leq D \leq V$. In one example, $v_i$ is the value of $D=2Lp_v\beta$ determined based on paramCombination-Doppler-r18 C=i, and $(v_2, v_3)$=(2,4), (2,5), (2,6), (3,4), (3,5), (3,6), (4,5), or (4,6).

In one example, they are determined based on rank (v). The condition C1 can correspond to $v \in [v_1 \ldots v_2]$ or $v \leq v_2$ and C2 can correspond to $v \in [v_2+1 \ldots v_3]$ or $v_2 < v \leq v_3$ or $v_2+1 \leq v \leq v_3$, and the C3 can correspond to $v \in [v_3+1 \ldots V]$ or $v_3+1 < v \leq V$ or $v_3+1 \leq v \leq V$. In one example, $v_i$ is the value of v determined based on RI-restriction-Doppler-r18, and $(v_2, v_3)$=(2,3), (1,2), (1,3).

In one example, if a first condition (C1) is met/satisfied, c=1, else (C2), c=x<1.

In one example, $$(x, 1) = \left(\frac{1}{2}, 1\right), \text{ or } \left(\frac{3}{4}, 1\right), \text{ or, } \left(\frac{7}{8}, 1\right).$$

In one example, $$(x, 1) = \left(\frac{2}{Q}, \ldots, 1\right),$$

Q=2.

In one example, (x, 1) can be configured.

In one example, the conditions C1 and C2 are according to at least one of the following examples.

In one example, they are determined based on higher layer parameter paramCombination-Doppler-r18 (let us denote it as C) that configures (L, $p_v$, $\beta$) (similar to Rel.15 enhanced Type II codebook). When C takes a value from {1,2 ..., N}, the condition C1 can correspond to $C \in [1 \ldots i]$ or $C \leq i$ and C2 can correspond to $C \in [i+1 \ldots N]$ or $i < C \leq N$ or $i+1 \leq C \leq N$. In one example, N=6, 7, or 8 and i=2, 3, 4, 5, or 6.

In one example, they are determined based on $2LM_v$ (let us denote it as $D=2LM_v$). The condition C1 can correspond to $D \in [v_1 \ldots v_2]$ or $D \leq v_2$ and C2 can correspond to $D \in [v_2+1 \ldots V]$ or $v_2+1 < D \leq V$ or $v_2+1 \leq D \leq V$. In one example, $v_i$ is the value of $D=2LM_v$ determined based on paramCombination-Doppler-r18 C=i, and $v_2$=2, 3, 4, 5, 6, or 7.

In one example, they are determined based on $\beta$. The condition C1 can correspond to $\beta \in [v_1 \ldots v_2]$ or $\beta \leq v_2$ and C2 can correspond to $\beta \in [v_2+1 \ldots V]$ or $v_2+1 < \beta \leq V$ or $v_2+1 \leq \beta \leq V$. In one example, $v_i$ is the value of $\beta$ determined based on paramCombination-Doppler-r18 C=i, and $v_2$=2, 3, 4, 5, 6, or 7.

In one example, they are determined based on $2LM_v\beta$ (let us denote it as $D=2LM_v\beta$). The condition C1 can correspond to $D \in [v_1 \ldots v_2]$ or $D \leq v_2$ and C2 can correspond to $D \in [v_2+1 \ldots V]$ or $v_2+1 < D \leq V$ or $v_2+1 \leq D \leq V$. In one example, $v_i$ is the value of $D=2LM_v\beta$ determined based on paramCombination-Doppler-r18 C=i, and $v_2$=2, 3, 4, 5, 6, or 7.

In one example, they are determined based on $2Lp_v\beta$ (let us denote it as $D=2Lp_v\beta$). The condition C1 can correspond to $D \in [v_1 \ldots v_2]$ or $D \leq v_2$ and C2 can correspond to $D \in [v_2+1 \ldots V]$ or $v_2+1 < D \leq V$ or $v_2+1 \leq D \leq V$. In one example, $v_i$ is the value of $D=2Lp_v\beta$ determined based on paramCombination-Doppler-r18 C=i, and $v_2$=2, 3, 4, 5, 6, or 7.

In one example, they are determined based on rank (v). The condition C1 can correspond to $v \in [v_1 \ldots v_2]$ or $v \leq v_2$ and C2 can correspond to $v \in [v_2+1 \ldots V]$ or $v_2+1 < v < V$ or $v_2+1 \leq v \leq V$. In one example, $v_i$ is the value of v determined based on RI-restriction-Doppler-r18, and $v_2$=2, 3 or 4.

In one example, they are determined based on $N_3$. The condition C1 can correspond to $N_3 \leq x$, and the C2 can correspond to $N_3 > x$. In one example, x=19.

In one example, they are determined based on R. The condition C1 can correspond to R=1, and the C2 can correspond to R=2. The parameter R is configured with the higher-layer parameter numberOfPMI-Subbands-PerCQI-Subband.

A few examples of the value of c or e are shown in Table 3.

TABLE 3

| paramCombination-Doppler-r18 | L | $p_v$ $v \in \{1,2\}$ | $p_v$ $v \in \{3,4\}$ | $\beta$ | c | or | e | c | or | e | c | or | e |
|---|---|---|---|---|---|---|---|---|---|---|---|---|---|
| 1 | 2 | ¼ | ⅛ | ¼ | 1 | | | 1 | | | 1 | | |
| 2 | 2 | ¼ | ⅛ | ½ | 1 | | | 1 | | | 1 | | |
| 3 | 4 | ¼ | ⅛ | ¼ | 1 | | | 1 | | | 2 | | |
| 4 | 4 | ¼ | ⅛ | ½ | 2 | | | 1 | | | 2 | | |
| 5 | 4 | ¼ | ¼ | ¾ | 2 | | | 2 | | | 2 | | |
| 6 | 4 | ½ | ¼ | ½ | 2 | | | 2 | | | 2 | | |
| 7 | 6 | ¼ | — | ½ | 2 | | | 2 | | | 2 | | |
| 8 | 6 | ¼ | — | ¾ | 2 | | | 2 | | | 2 | | |

In one embodiment, the number of FD basis vectors $$M_v = \left\lceil \frac{ep_v N_3}{R} \right\rceil,$$

where $p_v$ is the same as (or at least one of) $p_v$ in Rel.16/17 codebook and e is a scaling such that $0 < e \leq 1$.

In one example, e is fixed, e.g., to e=½. In one example, e is configured (e.g., via RRC) or/and MAC CE or/and DCI, explicitly via a dedicated parameter/field/codepoint or implicitly via another parameter/field/codepoint. In one example, the value of e is reported by the UE 116, e.g., via the UE 116 capability reporting, or via the CSI part 1 (or UCI part 1) of the two-part (CSI or) UCI that carries the CSI. When via reported via the CSI, it can report explicitly via a dedicated parameter/field/codepoint or implicitly via another parameter/field/codepoint.

In one example, if a first condition (E1) is met/satisfied, e=1, else if a second condition (E2) is met/satisfied, e=x<1, else (E3) e=y<x.

In one example, $$(y, x, 1) = \left(\frac{1}{4}, \frac{1}{2}, 1\right), \text{ or } \left(\frac{1}{2}, \frac{3}{4}, 1\right), \text{ or, } \left(\frac{3}{4}, \frac{7}{8}, 1\right).$$

In one example, $$(y, x, 1) = \left(\frac{1}{Q}, \frac{2}{Q}, \ldots, 1\right), Q > 2.$$

In one example, (y, x, 1) can be configured.

In one example, the conditions E1, E2, and E3 are according to at least one of the following examples.

In one example, they are determined based on higher layer parameter paramCombination-Doppler-r18 (let us denote it as C) that configures (L, $p_v$, $\beta$) (similar to Rel.15 enhanced Type II codebook). When C takes a value from $\{1,2 \ldots, N\}$, the condition E1 can correspond to $C \in [1 \ldots i]$ or $C \leq i$ and E2 can correspond to $C \in [i+1 \ldots j]$ or $i < C \leq j$ or $i+1 \leq C \leq j$, and the E3 can correspond to $C \in [j+1 \ldots N]$ or $j < C \leq N$ or $j+1 \leq C \leq N$. In one example, N=6, 7, or 8 and (i,j)=(2,4), (2,5), (3,4), (3,5), (3,6), (4,5), or (4,6).

In one example, they are determined based on $2LM_v$ (let us denote it as $D=2LM_v$). The condition E1 can correspond to $D \in [v_1 \ldots v_2]$ or $D \leq v_2$ and E2 can correspond to $D \in [v_2+1 \ldots v_3]$ or $v_2 < D \leq v_3$ or $v_2+1 \leq D \leq v_3$, and the E3 can correspond to $D \in [v_3+1 \ldots V]$ or $v_3+1 < D \leq V$ or $v_3+1 \leq D \leq V$. In one example, $v_i$ is the value of $D=2LM_v$ determined based on paramCombination-Doppler-r18 C=i, and $(v_2, v_3)$=(2,4), (2,5), (2,6), (3,4), (3,5), (3,6), (4,5), or (4,6).

In one example, they are determined based on $\beta$. The condition E1 can correspond to $\beta \in [v_1 \ldots v_2]$ or $\beta \leq v_2$ and E2 can correspond to $\beta \in [v_2+1 \ldots v_3]$ or $v_2 < \beta \leq v_3$ or $v_2+1 \leq \beta \leq v_3$, and the E3 can correspond to $\beta \in [v_3+1 \ldots V]$ or $v_3+1 < \beta \leq V$ or $v_3+1 \leq \beta \leq V$. In one example, $v_i$ is the value of $\beta$ determined based on paramCombination-Doppler-r18 C=i, and $(v_2, v_3)$=(2, 4), (2,5), (2,6), (3,4), (3,5), (3,6), (4,5), or (4,6).

In one example, they are determined based on $2LM_v\beta$ (let us denote it as $D=2LM_v\beta$). The condition E1 can correspond to $D \in [v_1 \ldots v_2]$ or $D \leq v_2$ and E2 can correspond to $D \in [v_2+1 \ldots v_3]$ or $v_2 < D \leq v_3$ or $v_2+1 \leq D \leq v_3$, and the E3 can correspond to $D \in [v_3+1 \ldots V]$ or $v_3+1 < D \leq V$ or $v_3+1 \leq D \leq V$. In one example, $v_i$ is the value of $D=2LM_v\beta$ determined based on paramCombination-Doppler-r18 C=i, and $(v_2, v_3)$= (2,4), (2,5), (2,6), (3,4), (3,5), (3,6), (4,5), or (4,6).

In one example, they are determined based on $2Lp_v\beta$ (let us denote it as $D=2Lp_v\beta$). The condition E1 can correspond to $D\in[v_1 \ldots v_2]$ or $D\leq v_2$ and E2 can correspond to $D\in[v_2+1 \ldots v_3]$ or $v_2<D\leq v_3$ or $v_2+1\leq D\leq v_3$, and the E3 can correspond to $D\in[v_3+1 \ldots V]$ or $v_3+1<D\leq V$ or $v_3+1\leq D\leq V$. In one example, $v_i$ is the value of $D=2Lp_v\beta$ determined based on paramCombination-Doppler-r18 C=i, and $(v_2, v_3)$=(2,4), (2,5), (2,6), (3,4), (3,5), (3,6), (4,5), or (4,6).

In one example, they are determined based on rank (v). The condition E1 can correspond to $v\in[v_1 \ldots v_2]$ or $v\leq v_2$ and E2 can correspond to $v\in[v_2+1 \ldots v_3]$ or $v_2<v\leq v_3$ or $v_2+1\leq v\leq v_3$, and the E3 can correspond to $v\in[v_3+1 \ldots V]$ or $v_3+1<v\leq V$ or $v_3+1\leq v\leq V$. In one example, $v_i$ is the value of v determined based on RI-restriction-Doppler-r18, and $(v_2, v_3)$=(2,3), (1,2), (1,3).

In one example, if a first condition (E1) is met/satisfied, e=1, else (E2), e=x<1.

In one example, $$(x, 1) = \left(\frac{1}{2}, 1\right), \text{ or } \left(\frac{3}{4}, 1\right), \text{ or, } \left(\frac{7}{8}, 1\right).$$

In one example, $$(x, 1) = \left(\frac{2}{Q}, \ldots, 1\right), Q = 2.$$

In one example, (x, 1) can be configured.

In one example, the conditions E1 and E2 are according to at least one of the following examples.

In one example, they are determined based on higher layer parameter paramCombination-Doppler-r18 (let us denote it as C) that configures (L, $p_v$, $\beta$) (similar to Rel.15 enhanced Type II codebook). When C takes a value from {1, 2 ..., N}, the condition E1 can correspond to $C\in[1 \ldots i]$ or $C\leq i$ and E2 can correspond to $C\in[i+1 \ldots N]$ or $i<C\leq N$ or $i+1\leq C\leq N$. In one example, N=6, 7, or 8 and i=2, 3, 4, 5, or 6.

In one example, they are determined based on $2LM_v$ (let us denote it as $D=2LM_v$). The condition E1 can correspond to $D\in[v_1 \ldots v_2]$ or $D\leq v_2$ and E2 can correspond to $D\in[v_2+1 \ldots V]$ or $v_2+1<D\leq V$ or $v_2+1\leq D\leq V$. In one example, $v_i$ is the value of $D=2LM_v$ determined based on paramCombination-Doppler-r18 C=i, and $v_2$=2, 3, 4, 5, 6, or 7.

In one example, they are determined based on $\beta$. The condition E1 can correspond to $\beta\in[v_1 \ldots v_2]$ or $\beta\leq v_2$ and E2 can correspond to $\beta\in[v_2+1 \ldots V]$ or $v_2+1<\beta\leq V$ or $v_2+1\leq\beta\leq V$. In one example, $v_i$ is the value of $\beta$ determined based on paramCombination-Doppler-r18 C=i, and $v_2$=2, 3, 4, 5, 6, or 7.

In one example, they are determined based on $2LM_v\beta$ (let us denote it as $D=2LM_v\beta$). The condition E1 can correspond to $D\in[v_1 \ldots v_2]$ or $D\leq v_2$ and E2 can correspond to $D\in[v_2+1 \ldots V]$ or $v_2+1<D\leq V$ or $v_2+1\leq D\leq V$. In one example, $v_i$ is the value of $D=2LM_v\beta$ determined based on paramCombination-Doppler-r18 C=i, and $v_2$=2, 3, 4, 5, 6, or 7.

In one example, they are determined based on $2Lp_v\beta$ (let us denote it as $D=2Lp_v\beta$). The condition E1 can correspond to $D\in[v_1 \ldots v_2]$ or $D\leq v_2$ and E2 can correspond to $D\in[v_2+1 \ldots V]$ or $v_2+1<D\leq V$ or $v_2+1\leq D\leq V$. In one example, $v_i$ is the value of $D=2Lp_v\beta$ determined based on paramCombination-Doppler-r18 C=i, and $v_2$=2, 3, 4, 5, 6, or 7.

In one example, they are determined based on rank (v). The condition E1 can correspond to $v\in[v_1 \ldots v_2]$ or $v\leq v_2$ and E2 can correspond to $v\in[v_2+1 \ldots V]$ or $v_2+1<v\leq V$ or $v_2+1\leq v\leq V$. In one example, $v_i$ is the value of v determined based on RI-restriction-Doppler-r18, and $v_2$=2, 3 or 4.

In one example, they are determined based on $N_3$. The condition E1 can correspond to $N_3\leq x$, and the E2 can correspond to $N_3>x$. In one example, x=19.

In one example, they are determined based on R. The condition E1 can correspond to R=1, and the E2 can correspond to R=2. The parameter R is configured with the higher-layer parameter numberOfPMI-Subbands-PerCQI-Subband.

In one embodiment, both of the following are present:

the size of the bitmap is $\mu\beta 2LM_1Q$ or $\mu 2LM_1Q$ or $2LM_1Q$ bits for a layer and the maximum number of non-zero (NZ) coefficients for a layer $K_0=\lceil\mu\beta 2LM_1Q\rceil$ or $\lceil\mu\beta 2LM_1\rceil$, where $\beta$ is the same as (or at least one of) $\beta$ in Rel.16/17 codebook and $\mu$=c is a scaling such that $0<c\leq 1$, and the number of FD basis vectors $$M_v = \left\lceil\frac{ep_v N_3}{R}\right\rceil,$$

where $p_v$ is the same as (or at least one of) $p_v$ in Rel.16/17 codebook and e is a scaling such that $0<e\leq 1$.

The value of c and e can be determined/configured/reported according to at least one of the examples described herein. Likewise, the value of c and e can be determined based on at least one of the conditions (such as C1, C2, C3, and E1, E2, E3) described herein.

In one embodiment the bitmap design and the size of the bitmap (to indicate/report the location/indices of the NZ coefficients) is determined based on a condition (F1). When the condition is met/satisfied, the bitmap is based on a first scheme (S1), else (if the condition is not met, denoted as F2), the bitmap is according to a second scheme (S2).

In one example, the first scheme (S1) corresponds to one bitmap, according to one or more examples described herein, i.e., $2LM_1Q$ bits for a layer (according to one or more examples described herein) or $\mu\beta 2LM_1Q$ or $\mu 2LM_1Q$ or $2LM_1Q$ bits for a layer according to one or more embodiments described herein. The details are as described herein.

In one example, the second scheme (S2) corresponds to at least one or a combination of the following examples.

In one example, it corresponds to two bitmaps, according to one or more examples described herein. For example, when the second scheme is according to one or more examples described herein, for each layer, there are two bitmaps, a first bitmap of size $M_vQ$ bits for selecting Z (FD, DD) basis vectors pairs from a total of $M_vQ$ pairs, and a second bitmap of size 2LZ bits for indicating the location of the NZCs across SD basis vectors, and Z (FD, DD) basis vector pairs. The total payload (number of bits) for bitmap reporting is $2LZ+M_vQ$ for each layer, hence $v(2LZ+M_vQ)$ for v layers. The details are as described herein.

In one example, it corresponds to two bitmaps, according to one or more examples described herein. For example, when the second scheme is according to one or more examples described herein, for each layer, there are two bitmaps, a first bitmap selects $M_{(d)}=S^{(d)} \leq M_v$, d=0,1 from $M_v$ FD bases and is reported using a bitmap of length $M_v Q=2M_v$ bits (two bitmaps, each size $M_v$, for the two DD bases), where $\Sigma_{d=0}^{1} M^{(d)} = \Sigma_{d=0}^{1} S^{(d)} = S$. Here, $S^{(d)} = M^{(d)}$ is the number of selected FD bases for DD basis d determined by the UE 116.

- In one example, the second bitmap of size 2LZ bits for indicating the location of the NZCs across SD basis vectors, and Z (FD, DD) basis vector pairs. The total payload (number of bits) for bitmap reporting is $2LZ+M_v Q$ for each layer, hence $v(2LZ+M_v Q)$ for v layers. The details are as described herein.
- In one example, for d-th DD component, the second bitmap of size $2LS^{(d)}=2LM^{(d)}$ bits for indicating the location of the NZCs across SD basis vectors, and $M^{(d)}$ FD basis vectors (associated with d-th DD basis).

The total payload (number of bits) for bitmap reporting is $2LZ+M_v Q$ for each layer, hence $v(2LZ+M_v Q)$ for v layers. The details are as described herein.

In one example, S is higher layer configured from a set of values (e.g. $\{M_v, cM_v\}$, where c can be one of 1, 1.25, 1.5) or fixed (e.g., to $M_v$). In one example, $S^{(d)} > 0$ (at least one FD basis is selected for each DD basis). In one example, $S^{(d)}$ can be zero (implying the UE 116 may not select/report any FD basis for a DD basis).

In one example, it corresponds to a (non-rectangular or distance-based or metric-based) bitmap that includes bits associated with the set of (SD, FF, DD) indices $\{(s_1, f_1, t_1)\}$ with $d(s_1, f_1, t_1) \leq D$, where D is a threshold, and details as explained herein.

In a variation of this embodiment, when Q=1, the bitmap is same as legacy, i.e., $2LM_1$ bits for a layer according to one or more examples described herein, and when Q=2, the bitmap is according to one or more schemes described herein. Or when Q=2, the bitmap is according to one or more schemes described herein based on the condition (F) being met, and according to one or more schemes described herein, otherwise, as explained herein.

In one example of one or more schemes described herein, the following scheme is used/configured. For each layer, there are two bitmaps, a first bitmap selects $M^{(d)}=S^{(d)} \leq M_v$, d=0,1 from $M_v$ FD bases and is reported using a bitmap of length $M_v Q=2M_v$ bits (two bitmaps, each size $M_v$, for the two DD bases), where $\Sigma_{d=0}^{1} M^{(d)} = \Sigma_{d=0}^{1} S^{(d)} = S$. Here, $S^{(d)} = M^{(d)}$ is the number of selected FD bases for DD basis d determined by the UE 116.

- In one example, the second bitmap of size 2LS bits for indicating the location of the NZCs across SD basis vectors, and Z=S (FD, DD) basis vector pairs is based on a distance metric to only include the (coefficients) bits around the strongest coefficient (indicated via the sidelink control information (SCI)) selected from $LS^{(d)}$ bits per DD index d, and per polarization (where a first polarization corresponds to a group of antenna ports $\{0, 1, \ldots P/2-1\}$ and a second polarization to $\{P/2, P/2+1, \ldots P-1\}$, and P is the number of CSI-RS ports). The total payload (number of bits) for bitmap reporting is $M_v Q+X$ for each layer, hence $v(M_v Q+X)$ for v layers, where X is size of the second bitmap. The details about the distance metric are provided herein.
- In one example, for d-th DD component, the second bitmap of size $2LS^{(d)}=2LM^{(d)}$ bits for indicating the location of the NZCs across SD basis vectors, and $M^{(d)}$ FD basis vectors (associated with d-th DD basis) is based on a distance metric to only include the (coefficients) bits around the strongest coefficient (indicated via the SCI) selected from $LS^{(d)}$ and per polarization (where a first polarization corresponds to a group of antenna ports $\{0, 1, \ldots P/2-1\}$ and a second polarization to $\{P/2, P/2+1, \ldots P-1\}$, and P is the number of CSI-RS ports). The total payload (number of bits) for bitmap reporting is $M_v Q+X$ for each layer, hence $v(M_v Q+X)$ for v layers, where X is size of the second bitmap. The details about the distance metric are provided herein.

In one example, one or more schemes described herein are UE-optional, i.e., only when the UE 116 reports via capability reporting that it can support this scheme, the network (NW) 130 can be configured the bitmap reporting according to this scheme. The UE 116 capability can be an existing capability (e.g., UE capability on the support for optional parameter combinations, or/and UE capability on the support of R=2 or/and, UE capability on the support rank 3-4) or a separate/dedicated capability. There may be additional restrictions or conditions that are essential, e.g., the scheme is used/configured only in high overhead regime (i.e., for parameter combination(s) with $2LM_v > thr$, where thr is a threshold).

The details and a few examples of the distance-based metric are provided herein.

Let and $s_0$, $f_0$ and $t_0$ denotes a reference SD basis index, a reference FD basis index, and a reference DD basis index. In one example, the reference basis indices are associated with a strongest coefficient (e.g., indicated via a SCI).

In one example, $d(s_1, f_1, t_1)$ is a distance-based metric. For example, in SD, a SD distance metric: $d_{SD}=\min(|s_1-s_0|, L-|s_1-s_0|)$ or $d_{SD}=\min(|s_1-s_0|, 2L-|s_1-s_0|)$. Likewise, in FD, a FD distance metric: $d_{FD}=\min(|f_1-f_0|, M_v-|f_1-f_0|)$, and in DD, a DD distance metric: $d_{DD}=\min(|t_1-t_0|, Q-|t_1-t_0|)$.

In one example, $d(s_1, f_1, t_1)$ is a distance-based metric according to at least one of the following examples.

- In one example, $d(s_1, f_1, t_1)=d_{SD}+d_{FD}+d_{DD}$.
- In one example, $d(s_1, f_1, t_1)=d(f_1, t_1)=d_{FD}+d_{DD}$.
- In one example, $d(s_1, f_1, t_1)=d(s_1, f_1)=d_{SD}+d_{FD}$.
- In one example, $d(s_1, f_1, t_1)=d(s_1, t_1)=d_{SD}+d_{DD}$.
- In one example, $d((s_1, f_1, t_1)=d(s_1)=d_{SD}$.
- In one example, $d(s_1, f_1, t_1)=d(f_1)=d_{FD}$.
- In one example, $d(s_1, f_1, t_1)=d(t_1)=d_{DD}$.

For the scheme based on a combination of one or more schemes described herein, one of the following examples can be used.

In one example, for each polarization, the second level bitmap contains bits included in a set of SD basis and selected S basis pairs $\{(s, r)\}$, satisfying $d_{SD}+d_{FD} \leq D$. In one example, $d_{FD}=\min(r, S-r)$ $d_{SD}=\min|s_1-s_0|, L-|s_1-s_0|)$. Here, $s_1 \in \{0, \ldots, L-1\}$, $r \in \{0, \ldots, S-1\}$, $s_0 \in \{0, \ldots, L-1\}$ is the SD basis indicated by SCI, and the two polarizations have same set of $\{(s, r)\}$ in the bitmap.

In one example, the mapping of index $r \in \{0, \ldots, S-1\}$ to FD and DD indices is given by $r=M_v d+f$ or $Qf+d$, where $f=\{0, \ldots, M_v-1\}$ and $q=\{0,1\}$.

In one example, the value of S is fixed or configured, as explained herein, the value of D can be fixed or higher layer configured. If fixed, D can be $$\frac{V_{max}}{2} \text{ or } \left\lfloor \frac{V_{max}}{2} \right\rfloor \text{ or } \left\lceil \frac{V_{max}}{2} \right\rceil,$$

where $V_{max}$ is the max value of the distance, as described herein.

In one example, for each polarization, the second level bitmap contains bits included in a set of SD basis and selected $S^{(d)}$ basis pairs $\{(s, r)\}$, satisfying $d_{SD}+d_{FD} \leq D$. In one example, $d_{FD}=\min(r, S^{(d)}-r)$ and $d_{SD}=\min|s_1-s_0|, L-|s_1-s_0|)$. Here, $s_1 \in \{0, \ldots, L-1\}$, $r \in \{0, \ldots, S^{(d)}-1\}$, $s_0 \in \{0, \ldots, L-1\}$ is the SD basis indicated by SCI, and the two polarizations have same set of $\{(s, r)\}$ in the bitmap. In one example, the value of S is fixed or configured, as explained herein, the value of D can be fixed or higher layer configured. If fixed, D can be $$\frac{V_{max}}{2} \text{ or } \left\lfloor \frac{V_{max}}{2} \right\rfloor \text{ or } \left\lceil \frac{V_{max}}{2} \right\rceil,$$

where $V_{max}$ is the max value of the distance, as described herein.

In one example, $d_{SD}=|s_1-s_0|$. In one example, $d_{SD}=s_1-s_0$.

In one example, $d_{SD}=s_1-\delta_{SD}$. In one example, $d_{SD}=s_1-s_0-\delta_{SD}$. In one example, $d_{SD}=(s_1-\delta_{SD}) \mod L$. Here, $$\delta_{SD} = s_1 - \frac{L}{2} \text{ or } \delta_{SD} = \max\left(0, s_1 - \frac{L}{2}\right)$$

or $\delta_{SD}=\max(0, 2s_1-L)$.

In one example, $D_{SD}$ is a size $L \times 1$ vector comprising $d_{SD}(s_1)$ at the $s_1$-th element. Then, when $s_0>1$, $D_{SD}$ calls to be circularly shifted by $s_0$. That is, $D_{SD}=P^{s_0}D_{SD}$ where P is a shift matrix $$P = \begin{bmatrix} 0 & 1 & 0 & 0 \\ 0 & 0 & 1 & 0 \\ 0 & 0 & 0 & 1 \\ 1 & 0 & 0 & 0 \end{bmatrix}$$

(for L=4).

In one example, $d_{FD}=|f_1-f_0|$. In one example, $d_{FD}=f_1-f_0$. In one example, $d_{FD}=f_1$.

In one example, $d_{FD}=f_1-\delta_{FD}$. In one example, $d_{FD}=f_1-f_0-\delta_{FD}$. In one example, $d_{FD}=(f_1-\delta_{FD}) \mod M_v$. Here, $\delta_{FD}=f_1-M_v$ or $\delta_{FD}=\max(0, f_1-M_v)$ or $$\delta_{FD} = \max(0, 2f_1 - M_v) \text{ or } f_1 - \frac{M_v}{2} \text{ or } f_1 - \left\lfloor \frac{M_v}{2} \right\rfloor \text{ or }$$

$$\max\left(0, f_1 - \frac{M_v}{2}\right) \text{ or } \max\left(0, f_1 - \left\lfloor \frac{M_v}{2} \right\rfloor\right).$$

In one example, $D_{FD}$ is a size $M_v \times 1$ vector comprising $d_{FD}(f_1)$ at the $f_1$-th element. Then, when $f_0>1$, $D_{FD}$ calls to be circularly shifted by $f_0$. That is, $D_{FD}=P^{f_0}D_{FD}$ where P is a shift matrix $$P = \begin{bmatrix} 0 & 1 & 0 & 0 \\ 0 & 0 & 1 & 0 \\ 0 & 0 & 0 & 0 \\ 1 & 0 & 0 & 1 \end{bmatrix}$$

(for $M_v$=4).

In one example, $d_{FD}=|r-f_0|$. In one example, $d_{FD}=r-f_0$. In one example, $d_{FD}=r$.

In one example, $d_{FD}=r_1-\delta_{FD}$. In one example, $d_{FD}=r_1-f_0-\delta_{FD}$. In one example, $d_{FD}=(r-\delta_{FD}) \mod S$. Here, $\delta_{FD}=r_1-S$ or $\delta_{FD}=\max(0, r-S)$ or $$\delta_{FD} = \max(0, 2r - S) \text{ or } r - \frac{S}{2} \text{ or } r - \left\lfloor \frac{S}{2} \right\rfloor \text{ or }$$

$$\max\left(0, r - \frac{S}{2}\right) \text{ or } \max\left(0, r - \left\lfloor \frac{S}{2} \right\rfloor\right).$$

In one example, $D_{FD}$ is a size $S \times 1$ vector comprising $d_{FD}(r)$ at the r-th element. Then, when $f_0>1$, $D_{FD}$ calls to be circularly shifted by $f_0$. That is, $D_{FD}=P^{f_0}D_{FD}$ where P is a shift matrix $$P = \begin{bmatrix} 0 & 1 & 0 & 0 \\ 0 & 0 & 1 & 0 \\ 0 & 0 & 0 & 0 \\ 1 & 0 & 0 & 1 \end{bmatrix}$$

(for S=4).

In one example, $d_{FD}=r_1-\delta_{FD}$. In one example, $d_{FD}=r_1-f_0-\delta_{FD}$. In one example, $d_{FD}=(r-\delta_{FD}) \mod M^{(d)}$. Here, $\delta_{FD}=r_1-M^{(d)}$ or $\delta_{FD}=\max(0, r-M^{(d)})$ or $$\delta_{FD} = \max\left(0, 2r - M^{(d)}\right) \text{ or } r - \frac{M^{(d)}}{2} \text{ or }$$

$$r - \left\lfloor \frac{M^{(d)}}{2} \right\rfloor \text{ or } \max\left(0, r - \frac{M^{(d)}}{2}\right) \text{ or } \max\left(0, r - \left\lfloor \frac{M^{(d)}}{2} \right\rfloor\right).$$

In one example, $D_{FD}$ is a size $M^{(d)} \times 1$ vector comprising $d_{FD}(r)$ at the r-th element. Then, when $f_0>1$, $D_{FD}$ calls to be circularly shifted by $f_0$. That is, $D_{FD}=P^{f_0}D_{FD}$ where P is a shift matrix $$P = \begin{bmatrix} 0 & 1 & 0 & 0 \\ 0 & 0 & 1 & 0 \\ 0 & 0 & 0 & 0 \\ 1 & 0 & 0 & 1 \end{bmatrix}$$

(for $M^{(d)}$=4).

In one example, $d(s_1, f_1, t_1)=d(s_1, f_1)=d_{SD}+d_{FD}=s_1+f_1-\delta_{SD}-\delta_{FD}$. In one example, $d(s_1, f_1, t_1)=d(s_1, f_1)=d_{SD}+d_{FD}=s_1+f_1-s_0-f_0-\delta_{SD}-\delta_{FD}$. In one example, $d_{SD}+d_{FD}=(s_1-\delta_{SD}) \mod L+(f_1-\delta_{FD}) \mod M_v$. Here, $\delta_{SD}$ and $\delta_{FD}$ are according to one of the examples herein.

In one example, $D_{SD+FD}$ is a size $L \times M_v$ matrix comprising $d_{SD}+d_{FD}$ at the $(s_1, f_1)$-th element. Then, when $s_0>1$, rows of $D_{SD,FD}$ calls to be circularly shifted by $s_0$. That is, $D_{SD+FD}=P^{s_0}D_{SD+FD}$ where P is a shift matrix $$P = \begin{bmatrix} 0 & 1 & 0 & 0 \\ 0 & 0 & 1 & 0 \\ 0 & 0 & 0 & 0 \\ 1 & 0 & 0 & 1 \end{bmatrix}$$

(for L=4).

In one example, $d(s_1, f_1, t_1)=d(s_1, r)=d_{SD}+d_{FD}=s_1+r-\delta_{SD}-\delta_{FD}$. In one example, $d(s_1, f_1, t_1)=d(s_1, r)=d_{SD}+d_{FD}=s_1+r-s_0-f_0-\delta_{SD}-\delta_{FD}$. In one example, $d_{SD}+d_{FD}=(s_1-\delta_{SD}) \mod$ $L+(r-\delta_{FD})$ mod T (where T=S or $M^{(d)}$). Here, $\delta_{SD}$ and $\delta_{FD}$ are according to one of the examples herein.

In one example, $D_{SD+FD}$ is a size L×Y matrix comprising $d_{SD}+d_{FD}$ at the $(s_1,r)$-th element. Then, when $s_0>1$, rows of $D_{SD,FD}$ calls to be circularly shifted by $s_0$. That is, $D_{SD+FD}=P^{s_0}D_{SD+FD}$ where P is a shift matrix $$P = \begin{bmatrix} 0 & 1 & 0 & 0 \\ 0 & 0 & 1 & 0 \\ 0 & 0 & 0 & 0 \\ 1 & 0 & 0 & 1 \end{bmatrix}$$

(for L=4).

In one example, $d(s_1, f_1)=F(s_1, f_1)=s_1+f_1-2\delta_s-2\delta_f$. Then, $d(s_1, f_1) \leq D$ implies $s_1+f_1 \leq D+2\delta_s+2\delta_f$.

In one example, $d(s_1, f_1)=F(s_1, f_1)=s_1+f_1-\delta_s-\delta_f$. Then, $d(s_1, f_1) \leq D$ implies $s_1+f_1 \leq D+\delta_s+\delta_f$.

$s_1+f_1 \leq D$ if $s_1 \leq L/2$ and $$f_1 \leq \frac{M_v}{2} \text{ or } \left\lfloor \frac{M_v}{2} \right\rfloor.$$

$(L-s_1)+f_1 \leq D$ if $$s_1 > \frac{L}{2} \text{ and } f_1 \leq \frac{M_v}{2} \text{ or } \left\lfloor \frac{M_v}{2} \right\rfloor.$$

$s_1+(M_v-f_1) \leq D$ if $$s_1 \leq \frac{L}{2} \text{ and } f_1 > \frac{M_v}{2} \text{ or } \left\lfloor \frac{M_v}{2} \right\rfloor.$$

$(L-s_1)+(M_v-f_1) \leq D$ if $$s_1 > \frac{L}{2} \text{ and } f_1 > \frac{M_v}{2} \text{ or } \left\lfloor \frac{M_v}{2} \right\rfloor.$$

In one example, $d(s_1, r)=F(s_1, r)=s_1+r-2\delta_s-2\delta_f$. Then, $d(s_1, r) \leq D$ implies $s_1+r \leq D+2\delta_s+2\delta_f$.

In one example, $d(s_1, r)=F(s_1, r)=s_1+r-\delta_s-\delta_f$. Then, $d(s_1, r) \leq D$ implies $s_1+r \leq D+\delta_s+\delta_f$.

$s_1+r \leq D$ if $$s_1 \leq \frac{L}{2} \text{ and } r \leq \frac{T}{2} \text{ or } \left\lfloor \frac{T}{2} \right\rfloor,$$

where T=S or $M^{(d)}$.
$(L-s_1)+r \leq D$ if $$s_1 > \frac{L}{2} \text{ and } r \leq \frac{T}{2} \text{ or } \left\lfloor \frac{T}{2} \right\rfloor.$$

$s_1+(S-r) \leq D$ if $$s_1 \leq \frac{L}{2} \text{ and } r > \frac{T}{2} \text{ or } \left\lfloor \frac{T}{2} \right\rfloor.$$

$(L-s_1)+(S-r) \leq D$ if $$s_1 > \frac{L}{2} \text{ and } r > \frac{T}{2} \text{ or } \left\lfloor \frac{T}{2} \right\rfloor.$$

Figure 18:
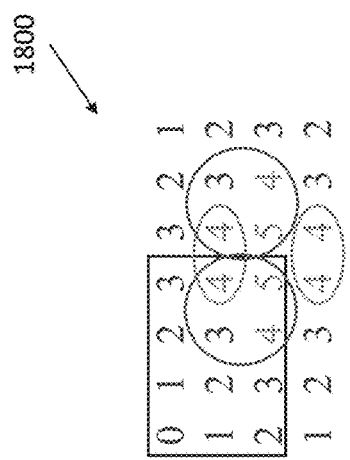
FIG. 18 illustrates an example of distance values according to embodiments of the present disclosure.

FIG. 18 illustrates an example of distance values 1800 according to embodiments of the present disclosure. For example, distance values 1800 can be implemented by the BS 102 of FIG. 1. This example is for illustration only and other embodiments can be used without departing from the scope of the present disclosure.

In one example, the distance values are the same (common) for the coefficients corresponding to each of the two polarizations (polarization 0: $s_1=0, 1, \ldots, L-1$, and polarization 1: $s_1=L, L+1, \ldots, 2L-1$) and each of the DD basis indices (e.g., $t_1=0, \ldots, Q-1$). Hence, the bitmap shape according to the Scheme 2 is the same for each of 2 polarizations and Q DD indices. For each layer, the final bitmap is the aggregate (concatenation) of these 2Q identical shapes.

For example, with reference to FIG. 18, when L=4, M, =7, and D=3, assuming $s_0=0$, the $d(s_1, f_1)$ values are as shown. For the values in rectangle (when $$\left(\text{when } s_1 \leq \frac{L}{2} \text{ and } f_1 \leq \frac{M_v}{2}\right),$$

we have $s+f \leq D=3$. The bitmap size reduction is by X1=3 (3 values 4, 4, and 5 shown in red within the rectangle). For the rest $$\left(s_1 > \frac{L}{2} \text{ or } f_1 > \frac{M_v}{2}\right),$$

the distance values can be obtained based on the values in the rectangle, e.g. by mirror image, shown by two ovals (due to modulo-shift or window operation in the distance metric), hence the bitmap size reduction is by X2 (remaining red values), i.e., X2=3 (green oval)+2 (red oval)=5. The total bitmap size reduction is by X=X1+X2=8. Hence the bitmap size=—X=28−8=20. When $s_0>0$, we perform cyclic shift as explained herein.

In one example, for each polarization and each DD basis index, the bitmap size is $cLM_v$ or $cLM^{(d)}$ where $0<c\leq1$. When c=1, there is no bitmap size reduction. When c<1 (e.g., ½), the bitmap size reduces by 1−c. In one example, $$c = \frac{X}{LM},$$

where X is the number of distance values large than the threshold D, where the distance is given by $d(s_1, f_1)=F(s_1, f_1)$ as explained herein. In one example, c is configured, e.g., via RRC or MAC CE or DCI, e.g., from {1,1/2}. In one example, c depends on the value of Q or $N_4$, e.g., Table 4. For example, c=½.

TABLE 4

| Q | $N_4$ | SD indices | q = 0 | q = 1 |
|---|---|---|---|---|
| 1 | 1 | Polarization r = 0 ($s_1 = 0, 1, \ldots, L-1$)<br>Polarization r = 1 ($s_1 = L, L+1, \ldots, 2L-1$) | LM<br>LM | |

TABLE 4-continued

| Q | $N_4$ | SD indices | q = 0 | q = 1 |
|---|---|---|---|---|
| 2 | >1 | Polarization r = 0 ($s_1$ = 0, 1, . . . , L − 1) | cLM | cLM |
|   |   | Polarization r = 1 ($s_1$ = L, L + 1, . . . , 2L − 1) | cLM | cLM |

In one example, for each DD basis index, the bitmap size is $c2LM_v$ or $c2LM^{(d)}$ where $0<c\leq 1$. When c=1, there is no bitmap size reduction. When c<1 (e.g., ½), the bitmap size reduces by 1−c. In one example, $$c = \frac{X}{2LM},$$

where X is the number of distance values large than the threshold D, where the distance is given by $d(s_1, f_1) = F(s_1, f_1)$ as explained herein. In one example, c is configured, e.g., via RRC or MAC CE or DCI, e.g., from {1,1/2}.

In one example, for each polarization, the bitmap size is $cLM_vQ$ or $cLM^{(d)}Q$ where $0<c\leq 1$. When c=1, there is no bitmap size reduction. When c<1 (e.g., ½), the bitmap size reduces by 1−c. In one example, $$c = \frac{X}{LM_vQ},$$

where X is the number of distance values large than the threshold D, where the distance is given by $d(s_1, f_1) = F(s_1, f_1)$ as explained herein. In one example, c is configured, e.g., via RRC or MAC CE or DCI, e.g., from {1,1/2}.

In one example, the bitmap size is $c2LM_vQ$ or $c2LM^{(d)}Q$ where $0<c\leq 1$. When c=1, there is no bitmap size reduction. When c<1 (e.g., ½), the bitmap size reduces by 1−c. In one example, $$c = \frac{X}{2LM_vQ},$$

where X is the number of distance values large than the threshold D, where the distance is given by $d(s_1, f_1) = F(s_1, f_1)$ as explained herein. In one example, c is configured, e.g., via RRC or MAC CE or DCI, e.g., from {1,1/2}.

In one example, the bitmap size cF=μF, where F=f(L, $M_v$,Q) is a function of (L, $M_v$, Q), e.g., $LM_1$ or $2LM_1$ or $LM_1Q$ or $2LM_1Q$. Then, the relation between c and D can be as follows:

$$cF = F - g(D) = \left(1 - \frac{g(D)}{F}\right)F$$

implying that $$c = 1 - \frac{g(D)}{F},$$

where g(D)=X is the number of distance values large than the threshold D, where the distance is given by $d(s_1, f_1) = F(s_1, f_1)$ as explained herein.

In one example, $$g(D) = \sum_{x=0}^{\min\left(D, \frac{L}{2}\right)} \min(M_v, 2D - 2x + 1) + \sum_{x=1}^{\min\left(D, \frac{L}{2} - 1\right)} \min(M_v, 2D - 2x + 1).$$

In one example, $g(D) = Y^2 + A$ where $$A = \begin{cases} Y^2 & L > 2, M_v = \text{odd} \\ (Y-1)^2 & L > 2, M_v = \text{even} \end{cases} \text{ and } A = \begin{cases} Y & L = 2, M_v = \text{odd} \\ 0 & L = 2, M_v = \text{even} \end{cases}.$$

$g(D) = 2Y^2$ when L>2 and $M_v$ is an odd number.
$g(D) = Y^2 + (Y-1)^2 = 2Y^2 - 2Y + 1$ when L>2 and $M_v$ is an even number.
$g(D) = Y^2 + Y$ when L=2 and $M_v$ is an odd number.
$g(D) = Y^2$ when L=2 and $M_v$ is an even number.

In one example, $Y = V_{max} - D$ or $\max(0, V_{max} - D)$, where, $$V_{max} = \frac{L}{2} + \left\lceil \frac{M_v}{2} \right\rceil \text{ or } = \frac{L}{2} + \left\lfloor \frac{M_v}{2} \right\rfloor \text{ or } \frac{L}{2} + \frac{M_v}{2} = \frac{L + M_v}{2}.$$

In one example, $2Y = V_{max} - 2D$ or $\max(0, V_{max} - 2D)$, where $V_{max} = L + M_v$ or $L + M_v - 1$.

In one example, $$Y = \frac{V_{max} - 2D}{2} \text{ or } \max\left(0, \frac{V_{max} - 2D}{2}\right),$$

where $V_{max} = L + M_v$ or $L + M_v - 1$.

In one example, $$Y = \left\lceil \frac{V_{max} - 2D}{2} \right\rceil \text{ or } \max\left(0, \left\lceil \frac{V_{max} - 2D}{2} \right\rceil\right),$$

where $V_{max} = L + M_v$ or $L + M_v - 1$.

In one example, $$Y = \left\lfloor \frac{V_{max} - 2D}{2} \right\rfloor \text{ or } \max\left(0, \left\lfloor \frac{V_{max} - 2D}{2} \right\rfloor\right),$$

where $V_{max} = L + M_v$ or $L + M_v - 1$.

In one example, when L>2 (e.g., L=4 or 6), $g(D) = Y^2 + B$ where $B = (Y - ((M_v + 1) \bmod 2))^2$ or $(Y - 1 + (M_v \bmod 2))^2$. And when L=2, $g(D) = Y^2 + C$ where $C = Y \times (M_v \bmod 2)$.

In one example, $g(D) = Y^2 + pB + (1-p)C$, where $B = (Y - ((M_v + 1) \bmod 2))^2$ or $(Y - 1 + (M_v \bmod 2))^2$ and $C = Y \times (M_v \bmod 2)$, and $$p = \frac{L}{2} - 1 \text{ or } p = \min\left(1, \frac{L}{2} - 1\right).$$

In one example, $$g(D) = Y^2 + \frac{q}{2}B + \left(1 - \frac{q}{2}\right)C,$$

where $B=(Y-((M_v+1) \bmod 2))^2$ or $(Y-1+(M_v \bmod 2))^2$ and $C=Y\times(M_v \bmod 2)$, and $q=L-2$ or $q=\min(2,L-2)$.

In one example, $g(D)=\Sigma_{i=1}^{4}X_i$, where $$X_1 = \frac{y(y+1)}{2}$$

where $y=x_1-D$ or $\max(0, x_1-D)$ and $$x_1 = \frac{L}{2} + \left\lfloor \frac{M-v}{2} \right\rfloor.$$

$$X_2 = \frac{z(z+1)}{2}$$

where $z=x_2-D$ or $\max(0, x_2-D)$ and $$x_2 = \frac{L}{2} + \left\lceil \frac{M_v}{2} \right\rceil - 1 \text{ or } \frac{L}{2} + M_v - \left\lfloor \frac{M_v}{2} \right\rfloor - 1.$$

When $M_v$ is an odd number, $z=y$; and when $M_v$ is an even number $z=y-1$. That is, $z=y-((M_v+1) \bmod 2)$ or $y-1+(M_v \bmod 2)$.

When $L=2$, $X_3=X_4=0$.
When $L>2$, (e.g., 4 or 6), $$X_3 = \frac{w(w+1)}{2} = \frac{y(y+1)}{2}$$

where $w=x_3-D$ or $\max(0, x_3-D)$ and $x_3=y-1$ and $y$ as defined herein.
When $L>2$, (e.g., 4 or 6), $$X_4 = \frac{v(v+1)}{2} = \frac{z(z+1)}{2}$$

where $v=x_4-D$ or $\max(0, x_4-D)$ and $x_4=z-1$ and $z$ as defined herein.
When $L=2$, $$g(D) = \frac{y(y+1)}{2} + \frac{z(z+1)}{2} =$$
$$\frac{(y+(M_v \bmod 2))(y+1-(M_v \bmod 2))}{2} + \frac{z(z+1)}{2} = (y+(M_v \bmod 2))y.$$

When $L>2$, (e.g. 4 or 6), $$g(D) = \frac{y(y+1)}{2} + \frac{z(z+1)}{2} + \frac{y(y-1)}{2} + \frac{z(z-1)}{2} = y^2 + z^2 = y^2 +$$
$$(y-((M_v+1) \bmod 2))^2 = y^2 + (y-1+(M_v \bmod 2))^2.$$

When $T=M^{(d)}$ or $S$, then $M_v$ in examples herein can be replaced with T.

In one example.

$$g(D) = \sum_{x=0}^{\min(D,\frac{L}{2})} \min(T, 2D-2x+1) +$$
$$\sum_{x=1}^{\min(D,\frac{L}{2}-1)} \min(T, 2D-2x+1).$$

In one example, $g(D)=Y^2+A$ where $$A = \begin{cases} Y^2 & L>2, T=\text{odd} \\ (Y-1)^2 & L>2, T=\text{even} \end{cases} \text{ and } A = \begin{cases} Y & L=2, T=\text{odd} \\ 0 & L=2, T=\text{even} \end{cases}.$$

$g(D)=2Y^2$ when $L>2$ and $T$ is an odd number.
$g(D)=Y^2+(Y-1)^2=2Y^2-2Y+1$ when $L>2$ and $T$ is an even number.
$g(D)=Y^2+Y$ when $L=2$ and $T$ is an odd number.
$g(D)=Y^2$ when $L=2$ and $T$ is an even number.
In one example, $Y=V_{max}-D$ or $\max(0, V_{max}-2D)$, where $$V_{max} = \frac{L}{2} + \left\lceil \frac{T}{2} \right\rceil \text{ or } = \frac{L}{2} + \left\lfloor \frac{T}{2} \right\rfloor \text{ or } \frac{L}{2} + \frac{T}{2} = \frac{L+T}{2}.$$

In one example, $2Y=V_{max}-2D$ or $\max(0, V_{max}-2)$, where $V_{max}=L+T$ or $L+T-1$.
In one example, $$Y = \frac{V_{max}-2D}{2} \text{ or } \max\left(0, \frac{V_{max}-2D}{2}\right),$$

where $V_{max}=L+T$ or $L+T-1$.
In one example, $$Y = \left\lceil \frac{V_{max}-2D}{2} \right\rceil \text{ or } \max\left(0, \left\lceil \frac{V_{max}-2D}{2} \right\rceil\right),$$

where $V_{max}=L+T$ or $L+T-1$.
In one example, $$Y = \left\lfloor \frac{V_{max}-2D}{2} \right\rfloor \text{ or } \max\left(0, \left\lfloor \frac{V_{max}-2D}{2} \right\rfloor\right),$$

where $V_{max}=L+T$ or $L+T-1$.
In one example, when $L>2$ (e.g., $L=4$ or 6), $g(D)=Y^2+B$ where $B=(Y-((T+1) \bmod 2))^2$ or $(Y-1+(T \bmod 2))^2$. And when $L=2$, $g(D)=Y^2+C$ where $C=Y\times(T \bmod 2)$.
In one example, $g(D)=Y^2+pB+(1-p)C$, where $B=(Y-((T+1) \bmod 2))^2$ or $(Y-1+(T \bmod 2))^2$ and $C=Y\times(T \bmod 2)$, and $$p = \frac{L}{2}-1 \text{ or } p = \min\left(1, \frac{L}{2}-1\right).$$

In one example, $$g(D) = Y^2 + \frac{q}{2}B + \left(1-\frac{q}{2}\right)C,$$

where $B=(Y-((T+1) \bmod 2))^2$ or $(Y-1+(T \bmod 2))^2$ and $C=Y\times(T \bmod 2)$, and $q=L-2$ or $q=\min(2, L-2)$.

In one example, $g(D)=\sum_{i=1}^{4} X_i$, where $$X_1 = \frac{y(y+1)}{2}$$

where $y=x_1-D$ or $\max(0, x_1-D)$ and $$x_1 = \frac{L}{2} + \left\lfloor \frac{T}{2} \right\rfloor.$$

$$X_2 = \frac{z(z+1)}{2}$$

where $z=x_2-D$ or $\max(0, x_2-D)$ and $$x_2 = \frac{L}{2} + \left\lceil \frac{T}{2} \right\rceil - 1 \text{ or } \frac{L}{2} + T - \left\lfloor \frac{T}{2} \right\rfloor - 1.$$

When T is an odd number, $z=y$; and when T is an even number $z=y-1$. That is, $z=y-((T+1) \bmod 2)$ or $y-1+(T \bmod 2)$.

When $L=2$, $X_3=X_4=0$.
When $L>2$, (e.g., 4 or 6), $$X_3 = \frac{w(w+1)}{2} = \frac{y(y-1)}{2}$$

where $w=x_3-D$ or $\max(0, x_3-D)$ and $x_3=y-1$ and y as defined herein.

When $L>2$, (e.g., 4 or 6), $$X_4 = \frac{v(v+1)}{2} = \frac{z(z-1)}{2}$$

where $v=x_4-D$ or $\max(0, x_4-D)$ and $x_4=z-1$ and z as defined herein.

When $L=2$, $$g(D) = \frac{y(y+1)}{2} + \frac{z(z+1)}{2} = \frac{(y+(T \bmod 2))(y+1-(T \bmod 2))}{2} + \frac{z(z+1)}{2} = (y+(T \bmod 2))y.$$

When $L>2$, (e.g. 4 or 6), $$g(D) = \frac{y(y+1)}{2} + \frac{z(z+1)}{2} + \frac{y(y-1)}{2} + \frac{z(z-1)}{2} = y^2 + z^2 = y^2 + (y-((T+1) \bmod 2))^2 = y^2 + (y-1+(T \bmod 2))^2.$$

The size of the bitmap is $\mu 2LM_1Q$ bits for a layer and the maximum number of non-zero (NZ) coefficients for a layer $K_0 = \lceil \mu\beta 2LM_1Q \rceil$ or $\lceil \mu\beta 2LM_1 \rceil$, where $\beta$ is the same as (or at least one of) $\beta$ in Rel.16/17 codebook and $\mu=c$ is a scaling such that $0<c\leq 1$.

When $N_4=1$ or $Q=1$: $\mu=1$, i.e., bitmap is $2LM_1$ bits and $K_0 = \lceil \beta 2LM_1 \rceil$.

When $N_4>1$ or $Q>1$ (e.g., $Q=2$), the condition $F_1$ is met: the Scheme 1 is used and $\mu=1$.

In one example, bitmap is $2LM_1Q$ bits and $K_0 = \lceil \beta 2LM_1Q \rceil$.
In one example, bitmap is $2LM_1$ bits and $K_0 = \lceil \beta 2LM_1 \rceil$.
In one example, bitmap is $2LM_1Q$ bits and $K_0 = \lceil \beta 2LM_1 \rceil$.
In one example, bitmap is $2LM_1$ bits and $K_0 = \lceil \beta 2LM_1Q \rceil$.

When $N_4>1$ or $Q>1$ (e.g., $Q=2$), the condition $F_2$ is met: the Scheme 2 is used and $\mu<1$.

In one example, bitmap is $\mu 2LM_1Q$ bits and $K_0 = \lceil \mu\beta 2LM_1Q \rceil$.
In one example, bitmap is $\mu 2LM_1$ bits and $K_0 = \lceil \mu\beta 2LM_1 \rceil$.
In one example, bitmap is $\mu 2LM_1Q$ bits and $K_0 = \lceil \mu\beta 2LM_1 \rceil$.
In one example, bitmap is $\mu 2LM_1$ bits and $K_0 = \lceil \mu\beta 2LM_1Q \rceil$.

In one example, the coefficient with index tuple $(l, s_1, f_1, q)$ is associated with a priority value $Pri(l, s_1, f_1, q)$ with $l=1,2,\ldots,v$, $s_1=0,1,\ldots,Z-1$ ($Z=L$ or $2L$), $f_1=0,1,\ldots,M_v-1$ and $q=0,1,\ldots,Q-1$. The element with the highest priority has the lowest associated value $Pri(l, s_1, f_1, q)$. The bitmap size reduction is achieved by omitting (dropping) coefficients that have the highest priority values. Let the bitmap size (aggregated across layers) be $cvZM_vQ$ where $0<c\leq 1$. When $c=1$, there is no bitmap size reduction. When $c<1$ (e.g., ½), the bitmap size reduces by $1-c$. In one example, $$c = \frac{X}{vZM_vQ},$$

where $X=g(D)$ is the number of distance values large than the threshold D, where the distance is given by $d(s_1, f_1)=F(s_1, f_1)$ as explained herein. In one example, c is configured, e.g., via RRC or MAC CE or DCI, e.g., for $\{1,1/2\}$. In one example, c depends on the value of Q or $N_4$, e.g., Table 4. For example, $c=\frac{1}{2}$.

In one example, the priority rule can be as follows: (DD→Layer→SD→FD)

$$Pri(l,s_1,f_1,q) = v \cdot Q \cdot (d(s_1,f_1)) + Q \cdot l + q$$

In one example, $d(s_1, f_1) = 2 \cdot L \cdot \pi(f_1) + s_1$ with $\pi(\bullet)$ is a permutation function.

In one example, $\pi(f)=f$ (e.g., no permutation).
In one example, $\pi(f) = \min(2 \cdot n_{3,l}^{(f)}, 2 \cdot (N_3 - n_{3,l}^{(f)}) - 1)$, where $n_{3,l}^{(f)}$ is defined in Clause 5.2.2.2.5 of [9].
In one example, $d(s_1, f_1) = L \cdot \pi(f_1) + s_1$, where $$\pi(f_1) = \frac{f_1 - \delta_{SD} - \delta_{FD}}{L},$$

$s_1 = l_0 \in \{0, 1, \ldots, L-1\}$, $\delta_{SD}=\max(0, 2s_1-L)$ and $\delta_{FD}=\max(0, 2f_1-M_v)$.

In one example, for each polarization $r \in \{0,1\}$, $d(s_1, f_1) = L \cdot \pi(f_1) + s_{1,r}$, where $$\pi(f_1) = \frac{f_1 - \delta_{SD} - \delta_{FD}}{L},$$

$s_{1,r}=l_0 \in \{0, 1, \ldots, L-1\}$, $\delta_{SD}=\max(0, 2s_{1,r}-L)$ and $\delta_{FD}=\max(0, 2f_1-M_v)$.

Polarization $r=0$ ($s_{1,0}=0, 1, \ldots, L-1$ maps to $s_1=0, 1, \ldots, L-1$).

Polarization $r=1$ ($s_{1,1}=0, 1, \ldots, L-1$ maps to $s_1=L, L+1, \ldots, 2L-1$), $s_{1,1}=s_1-L$.

In one example, $d(s_1, f_1)=2L\cdot\pi(f_1)+s_1$, where $$\pi(f_1) = \frac{f_1 - \delta_{SD} - \delta_{FD}}{2L},$$

$s_1=l_0 \in \{0, 1, \ldots, 2L-1\}$, $\delta_{SD}=\max(0, s_1-L)$ and $\delta_{FD}=\max(0, 2f_1-M_v)$.

In one example, $d(s_1, f_1, t_1)$ is a ratio-based metric. For example, in SD, a SD ratio metric:

$$d_{SD} = \frac{|s_1 - s_0|}{L}.$$

Likewise, in FD, a FD ratio metric:

$$d_{FD} = \frac{|f_1 - f_0|}{M_v},$$

and in DD, a DD ratio metric:

$$d_{DD} = \frac{|t_1 - t_0|}{Q}.$$

In one example, $d(s_1, f_1, t_1)$ is a distance-based metric according to at least one of the following examples.

In one example, $d(s_1, f_1, t_1)=d_{SD}d_{FD}d_{DD}$.
In one example, $d(s_1, f_1, t_1)=d(f_1, t_1)=d_{FD}d_{DD}$.
In one example, $d(s_1, f_1, t_1)=d(s_1, f_1)=d_{SD}d_{FD}$.
In one example, $d(s_1, f_1, t_1)=d(s_1, t_1)=d_{SD}d_{DD}$.
In one example, $d(s_1, f_1, t_1)=d(s_1)=d_{SD}$.
In one example, $d(s_1, f_1, t_1)=d(f_1)=d_{FD}$.
In one example, $d(s_1, f_1, t_1)=d(t_1)=d_{DD}$.

In one example, the coefficients associated with the same SD, FD, or DD indices as that for the SCI are included in the bitmap. Let $X=|s_1-s_0||f_1-f_0||t_1-t_0|$. Then if $X\neq 0$, $x=1$, else $x=0$. Then, $d_{SD}=d_{SD}x$, $d_{FD}=d_{FD}x$, and $d_{DD}=d_{DD}x$.

In one example, threshold D is determined according to at least one of the following examples.

In one example, threshold D can be configured by gNB.
In one example, threshold D can be fixed, e.g. $D=\lceil sV_{max}\rceil$ or $\lfloor sV_{max}\rfloor$ or $$\left\lfloor\frac{M_v}{2}\right\rfloor \text{ or } \frac{L}{2} \text{ or } \left\lceil\frac{M_v}{2}\right\rceil,$$

where $V_{max}$ is the max value of the distance metric and s is a fixed fraction (e.g. ½, or ¾). In one example, $$V_{max} = \max_{(s_1, f_1)} d(s_1, f_1)$$

and $d(s_1, f_1)$ is according to one of the examples in the present disclosure. In one example, $$V_{max} = \frac{L}{2} + \left\lfloor\frac{M_v}{2}\right\rfloor.$$

In one example, $$V_{max} = \frac{L}{2} + \left\lceil\frac{M_v}{2}\right\rceil.$$

In one example, $$V_{max} = \frac{L}{2} + \frac{M_v}{2} = \frac{L + M_v}{2}.$$

In one example, threshold D can be fixed, e.g., $D=\lceil sV_{max}\rceil$ or $\lfloor sV_{max}\rfloor$ or $\lfloor T \rfloor$ or $$\frac{L}{2} \text{ or } \left\lceil\frac{T}{2}\right\rceil,$$

where $V_{max}$ is the max value of the distance metric and s is a fixed fraction (e.g., ½, or ¾). In one example, $$V_{max} = \max_{(s_1, r)} d(s_1, r_1)$$

and $d(s_1, r)$ is according to one of the examples in the present disclosure. In one example, $$V_{max} = \frac{L}{2} + \left\lfloor\frac{T}{2}\right\rfloor.$$

In one example, $$V_{max} = \frac{L}{2} + \left\lceil\frac{T}{2}\right\rceil.$$

In one example, $$V_{max} = \frac{L}{2} + \frac{T}{2} = \frac{L + T}{2}.$$

In one example, threshold D can be reported (e.g., via UCI part 1 of the two part UCI).

In one example, threshold D depends on a parameter.
In one example, threshold D depends on the param-Combination-Doppler-r18 C.
In one example, threshold D depends on the parameter $p_v$ for rank 1-2 or rank 3-4.
In one example, threshold D depends on the $p_{v\in\{3,4\}}=a\times p_{v\in\{1,2\}}$ where $a=½$.
In one example, threshold D depends on the parameters L or/and $M_v$, e.g., $$D = t\left(\frac{L}{2} + \left\lfloor\frac{M_v}{2}\right\rfloor\right), \text{ or } t\left(\frac{L}{2} + \left\lceil\frac{M_v}{2}\right\rceil\right) \text{ or } t\left(\frac{L + M_v}{2}\right),$$

where t is fixed (e.g. ½ or ¾).

In one example, threshold D depends on the parameters L or/and T, e.g., $$D = t\left(\frac{L}{2} + \left\lfloor\frac{T}{2}\right\rfloor\right), \text{ or } t\left(\frac{L}{2} + \left\lceil\frac{T}{2}\right\rceil\right) \text{ or } t\left(\frac{L+T}{2}\right),$$

where t is fixed (e.g., ½ or ¾).

In one example, the conditions F1 and F2 are according to at least one of the following examples.

In one example, they are determined based on higher layer parameter paramCombination-Doppler-r18 (let us denote it as C) that configures (L, $p_v$, β) (similar to Rel.15 enhanced Type II codebook). When F1 takes a value from {1, 2 ..., N}, the condition can correspond to C∈[1 ... i] or C≤i and F2 can correspond to C∈[i+1 ... N] or i<C≤N or i+1≤C≤N. In one example, N=6, 7, or 8 and i=2, 3, 4, 5, or 6.

In one example, they are determined based on $2LM_v$ (let us denote it as $D=2LM_v$). The condition F1 can correspond to D∈[$v_1$ ... $v_2$] or D≤$v_2$ and F2 can correspond to D∈[$v_2$+1 ... V] or $v_2$+1<D≤V or $v_2$+1≤D≤V. In one example, $v_i$ is the value of $D=2LM_v$ determined based on paramCombination-Doppler-r18 C=i, and $v_2$=2, 3, 4, 5, 6, or 7.

In one example, they are determined based on β. The condition F1 can correspond to β∈[$v_1$ ... $v_2$] or β≤$v_2$ and F2 can correspond to β∈[$v_2$+1 ... V] or $v_2$+1<β≤V or $v_2$+1≤β≤V. In one example, $v_i$ is the value of β determined based on paramCombination-Doppler-r18 C=i, and $v_2$=2, 3, 4, 5, 6, or 7.

In one example, they are determined based on $2LM_v\beta$ (let us denote it as $D=2LM_v\beta$). The condition F1 can correspond to D∈[$v_1$ ... $v_2$] or D≤$v_2$ and F2 can correspond to D∈[$v_2$+1 ... V] or $v_2$+1<D≤V or $v_2$+1≤D≤V. In one example, $v_i$ is the value of $D=2LM_v\beta$ determined based on paramCombination-Doppler-r18 C=i, and $v_2$=2, 3, 4, 5, 6, or 7.

In one example, they are determined based on $2Lp_v\beta$ (let us denote it as $D=2Lp_v\beta$). The condition F1 can correspond to D∈[$v_1$ ... $v_2$] or D≤$v_2$ and F2 can correspond to D∈[$v_2$+1 ... V] or $v_2$+1<D≤V or $v_2$+1≤D≤V. In one example, $v_i$ is the value of $D=2Lp_v\beta$ determined based on paramCombination-Doppler-r18 C=i, and $v_2$=2, 3, 4, 5, 6, or 7.

In one example, they are determined based on rank (v). The condition F1 can correspond to v∈[$v_1$ ... $v_2$] or v≤$v_2$ and F2 can correspond to v∈[$v_2$+1 ... V] or $v_2$+1<v≤V or $v_2$+1≤v≤V. In one example, $v_i$ is the value of v determined based on RI-restriction-Doppler-r18, and $v_2$=2, 3 or 4.

In one example, they are determined based on $N_3$. The condition F1 can correspond to $N_3$≤x, and the F2 can correspond to $N_3$>x. In one example, x=19.

In one example, they are determined based on R. The condition F1 can correspond to R=1, and the F2 can correspond to R=2. The parameter R is configured with the higher-layer parameter numberOfPMI-Subbands-PerCQI-Subband.

Three examples of the bitmap design based in the examples in the present disclosure are shown in Table 5.

TABLE 5

| paramCombination-Doppler-r18 | L | $p_v$ $v \in \{1,2\}$ | $p_v$ $v \in \{3,4\}$ | β | #NZC for 2 layers: $\frac{2K_0}{N_{SB}} \sim 4Lp_v\beta$ $v \in \{1,2\}$ | #NZC for 2 layers: $\frac{2K_0}{N_{SB}} \sim 4Lp_v\beta$ $v \in \{3,4\}$ | Ex1: Doppler: Q = 2, Scheme1 #NZC for 2 layers: $\frac{2K_0}{N_{SB}} \sim 4Lp_v\beta Q$ $v \in \{1,2\}$ | Ex1: Doppler: Q = 2, Scheme1 #NZC for 2 layers: $\frac{2K_0}{N_{SB}} \sim 4Lp_v\beta Q$ $v \in \{3,4\}$ | Ex2: Doppler: Q = 2, Scheme1 with cβ #NZC for 2 layers: $\frac{2K_0}{N_{SB}} \sim 4Lp_v\beta Q$ $v \in \{1,2\}$ | Ex2: Doppler: Q = 2, Scheme1 with cβ #NZC for 2 layers: $\frac{2K_0}{N_{SB}} \sim 4Lp_v\beta Q$ $v \in \{3,4\}$ | Ex3: Doppler: Q = 2, Scheme1 (cβ) + Scheme2 Threshold t = 4 $v \in \{1,2\}$ | Ex3: Doppler: Q = 2, Scheme1 (cβ) + Scheme2 Threshold t = 4 $v \in \{3,4\}$ |
|---|---|---|---|---|---|---|---|---|---|---|---|---|
| 1 | 2 | ¼ | ⅛ | ¼ | ½ | ¼ | 1 | ½ | c = 1 | c = 1 | c = 1 | c = 1 |
| 2 | 2 | ¼ | ⅛ | ½ | 1 | ½ | 2 | 1 | c = 1 | c = 1 | c = 1 | c = 1 |
| 3 | 4 | ¼ | ⅛ | ¼ | 1 | ½ | 2 | 1 | c = 1 | c = 1 | c = 1 | c = 1 |
| 4 | 4 | ¼ | ⅛ | ½ | 2 | 1 | 4 | 2 | c = 1 | c = 1 | c = 1 | c = 1 |
| 5 | 4 | ¼ | ¼ | ¾ | 3 | 3 | 6 | 6 | $c = \frac{1}{2}$ | $c = \frac{1}{2}$ | Scheme2 | Scheme2 |
| 6 | 4 | ½ | ¼ | ½ | 4 (threshold) | 2 | 8 | 4 | $c = \frac{1}{2}$ | c = 1 | Scheme2 | c = 1 |
| 7 | 6 | ¼ | — | ½ | 3 | | 6 | | $c = \frac{1}{2}$ | | Scheme2 | |
| 8 | 6 | ¼ | — | ¾ | 9/2 = 4.5 | | 9 | | $c = \frac{1}{2}$ | | Scheme2 | |

In one embodiment, the parameter ($p_v$), in Rel. 16 Type II codebook, that determines the number of FD basis vectors is replaced with $ep_v$ or $\lceil eM_v \rceil$, where $$M_v = \left\lceil p_v \frac{N_3}{R} \right\rceil,$$

and 0<e≤1. In one example, when Q=1, e=1. In one example, when Q>1 (e.g., Q=2), e can be 1 or less than 1, as described herein. As described in document and standard

[8], $M_v$ vectors, $[y_{0,l}^{(f)}, y_{1,l}^{(g)}, \ldots, y_{N_3-1,l}^{(f)}]^T$, $f=0, 1, \ldots, M_v-1$, are identified by $M_{initial}$ (for $N_3>19$) and $n_{3,l}$ (l=1, \ldots, v) where $$M_{initial} \in \{-2M_v+1, -2M_v+2, \ldots, 0\}$$

$$n_{3,l} = [n_{3,l}^{(0)}, \ldots, n_{3,l}^{(M_v-1)}]$$

$$n_{3,l}^{(f)} \in \{0, 1, \ldots, N_3-1\}$$

which are indicated by means of the indices $i_{1,5}$ (for $N_3>19$) and $i_{1,6,l}$ (for $M_v>1$ and l=1, \ldots, v), where $$i_{1,5} \in \{0, 1, \ldots, 2M_v - 1\}$$

$$i_{1,6,l} \in \begin{cases} \left\{0, 1, \ldots, \binom{N_3-1}{M_v-1}-1\right\} & N_3 \leq 19 \\ \left\{0, 1, \ldots, \binom{W-1}{M_v-1}-1\right\} & N_3 > 19 \end{cases}$$

Here, W is the FD basis window size, and $M_{initial}$ is the starting index of the window. In one example, $W=2M_v$.

Figure 19:
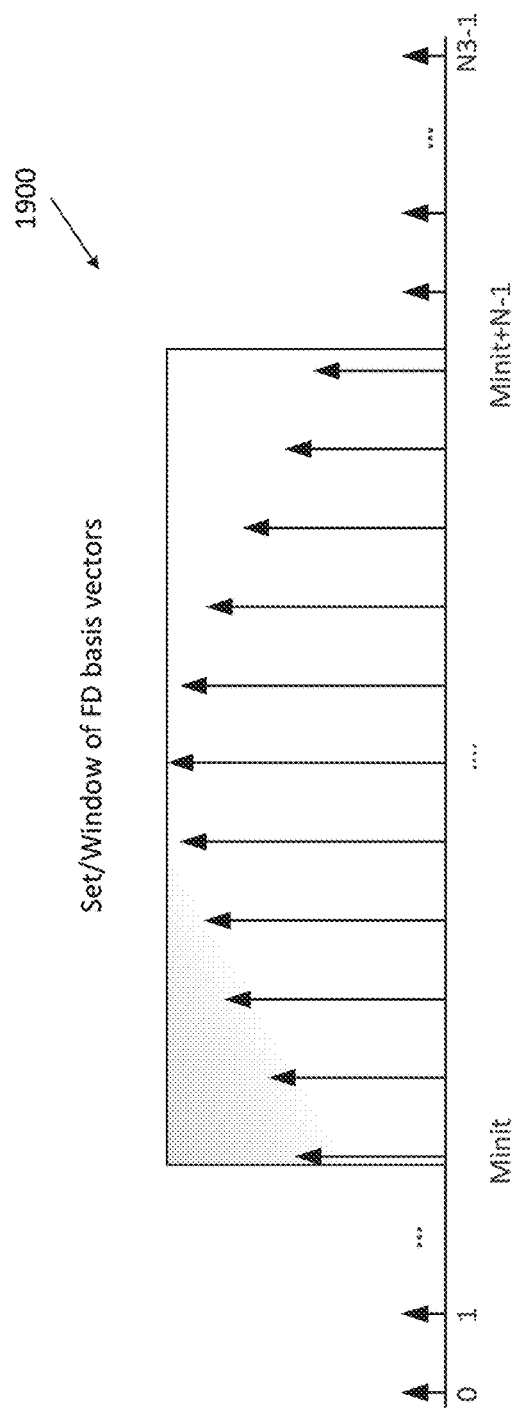
FIG. 19 illustrates a diagram of window-based frequency domain (FD) basis vector selection according to embodiments of the present disclosure.

FIG. 19 illustrates a diagram 1900 of window-based FD basis vector selection according to embodiments of the present disclosure. For example, diagram 1900 of window-based FD basis vector selection can be utilized by the UE 116 of FIG. 1. This example is for illustration only and other embodiments can be used without departing from the scope of the present disclosure.

A UE can be configured to report $M_v$ FD basis vectors from a set/window of W FD basis vectors, where the set/window is a subset of a total of $N_3$ basis vectors. The indices of the FD basis vectors in the set/window are given by $\text{mod}(M_{init}+n, N_3)$, $n=0, 1, \ldots, W-1$, which comprises W adjacent FD basis indices with modulo-shift by $N_3$, where $M_{init}$ is the starting index of the window. Note that the window-based basis set/matrix $W_f$ is completely parameterized by $M_{init}$ and N. At least one of the following examples can be used/configured to determine $W_f$.

In one example, both $M_{init}$ and W are fixed.
In one example, both $M_{init}$ and W are configured to the UE 116 (via RRC or/and MAC CE or/and DCI).
In one example, both $M_{init}$ and W are reported by the UE 116.
In one example, $M_{init}$ is fixed and W is configured to the UE 116 (via RRC or/and MAC CE or/and DCI).
In one example, $M_{init}$ is fixed and W is reported by the UE 116.
In one example, $M_{init}$ is configured to the UE 116 (via RRC or/and MAC CE or/and DCI) and W is fixed.
In one example, $M_{init}$ is configured to the UE 116 (via RRC or/and MAC CE or/and DCI) and W is reported by the UE 116.
In one example, $M_{init}$ is reported by the UE 116 and W is fixed.
In one example, $M_{init}$ is reported by the UE 116 and W is configured to the UE 116 (via RRC or/and MAC CE or/and DCI).
In one example, FD basis window size $W=2eM_v$ or $eM_v$ or $$\frac{2eM_v}{Q} \text{ or } \frac{eM_v}{Q}.$$

In one example, $$M_v = \left\lceil ep_v \frac{N_3}{R} \right\rceil \text{ or } \left\lceil p_v \frac{N_3}{R} \right\rceil.$$

In one example, $$M_v = \left\lceil ep_v \frac{N_3}{R} \right\rceil \text{ or } \left\lceil p_v \frac{N_3}{R} \right\rceil$$

for Q>1 (e.g. 2), and $$M_v = \left\lceil p_v \frac{N_3}{R} \right\rceil$$

for Q=1.

Let $f_l^* \in \{0, 1, \ldots, M_v-1\}$ be the FD index of the strongest coefficient of layer l. In one example, FD vector indices are remapped with respect to $n_{3,l}^{(f_l^*)}$ as $n_{3,l}^{(f)} = (n_{3,l}^{(f)} - n_{3,l}^{(f_l^*)}) \mod N_3$, such that $n_{3,l}^{(f_l^*)} = 0$, after remapping. The index f is remapped with respect to $f_l^*$ as $f = (f - f_l^*) \mod M_v$, such that the index of the strongest coefficient is $f_l^* = 0$ (l=1, \ldots, v), after remapping.

In one example, the FD basis vectors are reported according to at least one of the following examples.

In one example, e=1, and the FD basis is reported for each layer $M_v$ from $N_3$ basis vectors, hence $i_{1,5}$ is not reported and $i_{1,6,l}$ is reported.
In one example, e=1, and the FD basis window of size $W>M_v$, hence both $i_{1,5}$ and $i_{1,6,l}$ are reported.
In one example, e=z<1 (e.g., z=½), the FD basis window size ($M_v$).
  In one example, the FD basis window of size $W=M_v$, hence only $i_{1,5}$ is reported (i.e., FD basis is common/same for all layers).
  In one example, the FD basis window of size $W>M_v$, hence both $i_{1,5}$ and $i_{1,6,l}$ are reported.
In one example, for $N_3 \leq x$, FD basis vectors are reported according to example, and for $N_3 > x$, the FD basis vectors are reported according to one or more examples described herein.
In one example, for $N_3 \leq x$, FD basis vectors are reported according to example, and for $N_3 > x$, the FD basis vectors are reported according to one or more examples described herein.
In one example, for $N_3 \leq x$, FD basis vectors are reported according to example, and for $N_3 > x$, the FD basis vectors are reported according to one or more examples described herein.
In one example, for $N_3 \leq x$, FD basis vectors are reported according to example, and for $N_3 > x$, the FD basis vectors are reported according to one or more examples described herein.
In one example, for $N_3 \leq x$, FD basis vectors are reported according to example, and for $N_3 > x$, the FD basis vectors are reported according to one or more examples described herein
In one example, for $N_3 \leq x$, FD basis vectors are reported according to example (A3-1), and for $N_3 > x$, the FD basis vectors are reported according to one or more examples described herein
In one example, for paramCombination-Doppler-r18≤s, FD basis vectors are reported according to example, and for paramCombination-Doppler-r18>s, FD basis vectors are reported according to one or more examples described herein. In one example, s is fixed (e.g., 3, 4, 5, or 5), or configured via RRC.

In one example, x=19 or 19e or $\lceil 19e \rceil$ or $\lfloor 19e \rfloor$. In one example, $$x = \frac{19}{Q} \text{ or } \left\lceil \frac{19}{Q} \right\rceil \text{ or } \left\lfloor \frac{19}{Q} \right\rfloor.$$

In one example, $$x = \frac{19e}{Q} \text{ or } \left\lceil \frac{19e}{Q} \right\rceil \text{ or } \left\lfloor \frac{19e}{Q} \right\rfloor.$$

In one example, e is fixed to 1 for Q=1. In one example, for Q=2, e is fixed (e.g., 1 or ½ or 1/Q), or configured via RRC.

For $N_3 > x$, $M_{initial}$ is identified by $i_{1,5}$.

For all values of $N_3$, $n_{3,l}{}^{(0)}=0$ for l=1, . . . , v. If $M_v > 1$, the nonzero elements of $n_{3,l}$, identified by $n_{3,l}{}^{(1)}$, . . . , $n_{3,l}{}^{(M_v-1)}$, are found from $i_{1,6,l}$ (l=1, . . . , v), for $N_3 \leq x$, and from $i_{1,6,l}$ (l=1, . . . , v) and $M_{initial}$, for $N_3 > x$, using C(x, y) as defined in Table 5.2.2.2.5-4 and the algorithm:

---

$s_0 = 0$
for f = 1, ... , $M_v$ − 1
    Find the largest x* ∈ {$M_v$ − 1 − f, ... , $N_3$ − 1 − f} in Table 5.2.2.2.5-4 such that
    $i_{1,6,l} - s_{f-1} \geq C(x^*, M_v - f)$
    $e_f = C(x^*, M_v - f)$
    $s_f = s_{f-1} + e_f$
    if $N_3 \leq x$
        $n_{3,l}{}^{(f)} = N_3 - 1 - x^*$
    else
        $n_l{}^{(f)} = W - 1 - x^*$
        if $n_l{}^{(f)} \leq M_{initial} + W - 1$
            $n_{3,l}{}^{(f)} = n_l{}^{(f)}$
        else
            $n_{3,l}{}^{(f)} = n_l{}^{(f)} + (N_3 - W)$
        end if
end if

---

When $n_{3,l}$ and $M_{initial}$ are known, $i_{1,5}$ and $i_{1,6,l}$ (l=1, . . . , v) are found as follows:

If $N_3 \leq x$, $i_{1,5}=0$ and is not reported. If $M_v=1$, $i_{1,6,l}=0$, for l=1, . . . , v, and is not reported. If $M_v > 1$, $i_{1,6,l}=\sum_{f=1}^{M_v-1} C(N_3-1-n_{3,l}{}^{(f)}, M_v-f)$, where C(x,y) is given in Table 5.2.2.2.5-4 and where the indices f=1, . . . , $M_v$−1 are assigned such that $n_{3,l}{}^{(f)}$ increases as f increases.

If $N_3 > x$, $M_{initial}$ is indicated by $i_{1,5}$, which is reported and given by $$i_{1,5} = \begin{cases} M_{initial} & M_{initial} = 0 \\ M_{initial} + W & M_{initial} < 0 \end{cases}$$

In only the nonzero indices $n_{3,l}{}^{(f)} \in \text{IntS}$, where IntS={($M_{initial}+$i) mod $N_3$, i=0, 1, . . . , W−1}, are reported, where the indices f=1, . . . , $M_v$−1 are assigned such that $n_{3,l}{}^{(f)}$ increases as f increases. Let $$n_l{}^{(f)} = \begin{cases} n_{3,l}{}^{(f)} & n_{3,l}{}^{(f)} \leq M_{initial} + W - 1 \\ n_{3,l}{}^{(f)} - (N_3 - W) & n_{3,l}{}^{(f)} > M_{initial} + N_3 - 1 \end{cases},$$

then $i_{1,6,l}=\sum_{f=1}^{M_v-1} C(W-1-n_l{}^{(f)}, M_v-f)$, where C(x, y) is given in Table 5.2.2.2.5-4.

Let $K_0$ be the maximum number of non-zero (NZ) coefficients for a layer. In one example, $K_0 = \lceil \beta 2LM_1 \rceil$. In one example, $K_0 = \lceil \beta 2LM_1Q \rceil$. In one example, β is the same as (is at least one of) in Rel.16/17 codebook (Table 6, Table 7). In one example, β is $$\frac{x}{Q} \text{ or } \left\lfloor \frac{x}{Q} \right\rfloor \text{ or } \left\lceil \frac{x}{Q} \right\rceil$$

where x is me same as (or at least one of) in Rel.16/17 codebook. In one example, $K_0 = \lceil c\beta 2LM_1Q \rceil$ or $\lceil c\beta 2LM_1 \rceil$ where β is the same as (or at least one of) β in Rel.16/17 codebook and c is a scaling such that 0<c≤1.

In one example, c is fixed, e.g., to c=½. In one example, c is configured (e.g., via RRC) or/and MAC CE or/and DCI, explicitly via a dedicated parameter/field/codepoint or implicitly via another parameter/field/codepoint. In one example, the value of c is reported by the UE 116, e.g., via the UE 116 capability reporting, or via the CSI part 1 (or UCI part 1) of the two-part (CSI or) UCI that carries the CSI. When via reported via the CSI, it can be reported explicitly via a dedicated parameter/field/codepoint or implicitly via another parameter/field/codepoint.

In another embodiment, the supported parameter combinations (L, $p_v$, β) for the Type II Doppler codebook based on the Rel.16 based extension include (i) a subset $S_1$ of parameter combinations from the legacy Rel. 16 parameter combinations, and (ii) either no additional parameter combination ($S_2$ is empty), or another subset $S_2$ of parameter combinations that are new (not supported in legacy Rel.16 parameter combinations). In one example, S is empty, i.e., there is no additional parameter combinations supported. In one example, $S_1$ includes indices {1, . . . , 7}, {1, . . . , 6}, or {1, . . . , 5}, or {1, . . . 4} or {2, . . . , 8}, {3, . . . , 8}, or {4, . . . , 8}, or {5, . . . 8}. In one example, the supported parameter combinations can be for (a) $N_4=1$ or/and Q=1, or (a) $N_4 > 1$ (e.g., 2, 4, 8, 16) or/and Q>1 (e.g., 2), or (c) both (a) and (b).

In one example, $S_1$ includes 6 parameter combinations from legacy Rel. 16 table, e.g. paramCombination-r16=1-6 or 3-8, or $S_1$ includes each of the 8 parameter combinations from legacy Rel. 16 table, e.g. paramCombination-r16, and $S_2$ replaces, or adds, 2 parameter combinations from legacy Rel. 16 table, e.g. paramCombination-r16=7-8 or 1-2, with two of the 20 new combinations shown in Table 8. Two examples are shown. In Ex1, either legacy β value is used or a new β value (different from legacy, and lower than legacy) is introduced. In Ex2, a new $\beta = c\beta_{R16}$, where $\beta_{R16}$ is the legacy value and c<1 is a scaling.

In one example, the two new combinations are (N1, N2).
In one example, the two new combinations are (N1, N3).
In one example, the two new combinations are (N1, N4).
In one example, the two new combinations are (N1, N5).
In one example, the two new combinations are (N1, N6).
In one example, the two new combinations are (N1, N7).
In one example, the two new combinations are (N1, N8).
In one example, the two new combinations are (N1, N9).
In one example, the two new combinations are (N1, N10).
In one example, the two new combinations are (N1, N11).
In one example, the two new combinations are (N1, N12).
In one example, the two new combinations are (N2, N3).
In one example, the two new combinations are (N2, N4).
In one example, the two new combinations are (N2, N5).
In one example, the two new combinations are (N2, N6).
In one example, the two new combinations are (N2, N7).

In one example, the two new combinations are (N2, N8).
In one example, the two new combinations are (N2, N9).
In one example, the two new combinations are (N2, N10).
In one example, the two new combinations are (N2, N11).
In one example, the two new combinations are (N2, N12).
In one example, the two new combinations are (N3, N4).
In one example, the two new combinations are (N3, N5).
In one example, the two new combinations are (N3, N6).
In one example, the two new combinations are (N3, N7).
In one example, the two new combinations are (N3, N8).
In one example, the two new combinations are (N3, N9).
In one example, the two new combinations are (N3, N10).
In one example, the two new combinations are (N3, N11).
In one example, the two new combinations are (N3, N12).
In one example, the two new combinations are (N4, N5).
In one example, the two new combinations are (N4, N6).
In one example, the two new combinations are (N4, N7).
In one example, the two new combinations are (N4, N8).
In one example, the two new combinations are (N4, N9).
In one example, the two new combinations are (N4, N10).
In one example, the two new combinations are (N4, N11).
In one example, the two new combinations are (N4, N12).
In one example, the two new combinations are (N5, N6).
In one example, the two new combinations are (N5, N7).
In one example, the two new combinations are (N5, N8).
In one example, the two new combinations are (N5, N9).
In one example, the two new combinations are (N5, N10).
In one example, the two new combinations are (N5, N11).
In one example, the two new combinations are (N5, N12).
In one example, the two new combinations are (N6, N7).
In one example, the two new combinations are (N6, N8).
In one example, the two new combinations are (N6, N9).
In one example, the two new combinations are (N6, N10).
In one example, the two new combinations are (N6, N11).
In one example, the two new combinations are (N6, N12).
In one example, the two new combinations are (N7, N8).
In one example, the two new combinations are (N7, N9).
In one example, the two new combinations are (N7, N10).
In one example, the two new combinations are (N7, N11).
In one example, the two new combinations are (N7, N12).
In one example, the two new combinations are (N8, N9).
In one example, the two new combinations are (N8, N10).
In one example, the two new combinations are (N8, N11).
In one example, the two new combinations are (N8, N12).
In one example, the two new combinations are (N9, N10).
In one example, the two new combinations are (N9, N11).
In one example, the two new combinations are (N9, N12).
In one example, the two new combinations are (N10, N11).
In one example, the two new combinations are (N10, N12).
In one example, the two new combinations are (N11, N12).

In one example, the two new combinations are (Nx, Ny), where x is one of 11, ... 20 and y is one of 12 ... 20.

TABLE 8

| New combinations | L | $p_v$ $v \in \{1, 2\}$ | $p_v$ $v \in \{3, 4\}$ | Ex1: β | Ex2 $β_{R16}$ | Ex2 c |
|---|---|---|---|---|---|---|
| N1 | 2 | ¼ | ⅛ | ⅛ | ¼ | ½ |
| N2 | 2 | ¼ | ⅛ | ⅜ | ½ | ¾ |
| N3 | 4 | ¼ | ⅛ | ⅛ | ¼ | ½ |
| N4 | 4 | ¼ | ⅛ | ⅜ | ½ | ¾ |
| N5 | 4 | ¼ | ¼ | ¼ | ¾ | ⅓ |
| N6 | 4 | ¼ | ¼ | ⅜ | ¾ | ½ |
| N7 | 4 | ¼ | ¼ | ½ | ¾ | ⅔ |
| N8 | 4 | ½ | ¼ | ¼ | ½ | ½ |
| N9 | 4 | ½ | ¼ | ⅜ | ½ | ¾ |
| N10 | 6 | ¼ | — | ⅛ | ½ | ¼ |
| N11 | 6 | ¼ | — | ¼ | ½ | ½ |
| N12 | 6 | ¼ | — | ⅜ | ½ | ¾ |
| N13 | 2 | ⅛ | 1/16 | ⅛ | | |
| N14 | 2 | ⅛ | 1/16 | ½ | | |
| N15 | 2 | ⅛ | 1/16 | ¼ | | |
| N16 | 4 | ⅛ | 1/16 | ¼ | | |
| N17 | 4 | ½ | ¼ | ¼ | | |
| N18 | 4 | ½ | ¼ | ¾ | | |
| N19 | 6 | ⅛ | — | ⅛ | | |
| N20 | 6 | ½ | — | ¾ | | |

An example of the supported parameter combinations when two new parameter combinations (N1, N2) replace paramCombination-r16=7,8 is shown in Table 9.

TABLE 9

| paramCombination-Doppler-r18 | L | $p_v$ $v \in \{1, 2\}$ | $p_v$ $v \in \{3, 4\}$ | Ex1: β | Ex2 $β_{R16}$ | Ex2 c |
|---|---|---|---|---|---|---|
| 1 (N1) | 2 | ¼ | ⅛ | ⅛ | ¼ | ½ |
| 2 | 2 | ¼ | ⅛ | ¼ | ¼ | 1 |
| 3 | 2 | ¼ | ⅛ | ½ | ½ | 1 |
| 4 (N3) | 4 | ¼ | ⅛ | ⅛ | ¼ | ½ |
| 5 | 4 | ¼ | ⅛ | ¼ | ¼ | 1 |
| 6 | 4 | ¼ | ⅛ | ½ | ½ | 1 |
| 7 | 4 | ¼ | ¼ | ¾ | ¾ | 1 |
| 8 | 4 | ½ | ¼ | ½ | ½ | 1 |

In one example, $S_1$ includes 7 parameter combinations from legacy Rel. 16 table, e.g. paramCombination-r16=1-7, or $S_1$ includes each of the 8 parameter combinations from legacy Rel. 16 table, e.g. paramCombination-r16, and $S_2$ replaces, or adds, 1 parameter combination from legacy Rel. 16 table, e.g. paramCombination-r16=8 or 1, with one of the 20 new combinations shown in Table 8. Two examples are shown. In Ex1, either legacy β value is used or a new β value (different from legacy, and lower than legacy) is introduced. In Ex2, a new $β=cβ_{R16}$, where $β_{R16}$ is the legacy value and c<1 is a scaling.

In one example, the one new combination is N1.
In one example, the one new combination is N2.
In one example, the one new combination is N3.
In one example, the one new combination is N4.
In one example, the one new combination is N5.
In one example, the one new combination is N6.

In one example, the one new combination is N7.
In one example, the one new combination is N8.
In one example, the one new combination is N9.
In one example, the one new combination is N10.
In one example, the one new combination is N11.
In one example, the one new combination is N12.
In one example, the one new combination is Nx, where x is one of 13, ... , 20.

In one example, $S_1$ includes 5 parameter combinations from legacy Rel. 16 table, e.g. paramCombination-r16=1-5 or 4-8, or $S_1$ includes each of the 8 parameter combinations from legacy Rel. 16 table, e.g. paramCombination-r16, and $S_2$ replaces, or adds, 3 parameter combination from legacy Rel. 16 table, e.g. paramCombination-r16=6-8 or 1,2,3, with three of the 20 new combinations shown in Table 8. Two examples are shown. In Ex1, either legacy β value is used or a new β value (different from legacy, and lower than legacy) is introduced. In Ex2, a new $β=cβ_{R16}$, where $β_{R16}$ is the legacy value and c<1 is a scaling.

In one example, the three new combinations are (N1, Nx, Ny), where (x, y) is at least one pair from the set of pairs {(i, j): i≠j, i,j∈{2,3, ... , 20}.
In one example, the three new combinations are (N2, Nx, Ny), where (x, y) is at least one pair from the set of pairs {(i, j): i≠j, i,j∈{3, ... , 20}.
In one example, the three new combinations are (N3, Nx, Ny), where (x, y) is at least one pair from the set of pairs {(i, j): i≠j, i,j∈{4, ... , 20}.
In one example, the three new combinations are (N4, Nx, Ny), where (x, y) is at least one pair from the set of pairs {(i, j): i≠j, i,j∈{5, ... , 20}.
In one example, the three new combinations are (N5, Nx, Ny), where (x, y) is at least one pair from the set of pairs {(i, j): i≠j, i,j∈{6, ... , 20}.
In one example, the three new combinations are (N6, Nx, Ny), where (x, y) is at least one pair from the set of pairs {(i, j): i≠j, i,j∈{7, ... , 20}.
In one example, the three new combinations are (N7, Nx, Ny), where (x, y) is at least one pair from the set of pairs {(i, j): i≠j, i,j∈{8, ... , 20}.
In one example, the three new combinations are (N8, Nx, Ny), where (x, y) is at least one pair from the set of pairs {(i, j): i≠j, i,j∈{9, ... , 20}.
In one example, the three new combinations are (N9, Nx, Ny), where (x, y) is at least one pair from the set of pairs {(i, j): i≠j, i,j∈{10, ... , 20}.
In one example, the three new combinations are (N10, Nx, Ny), where (x, y) is at least one pair from the set of pairs {(i, j): i≠j, i,j∈{11, ... , 20}.
In one example, the three new combinations are (N11, Nx, Ny), where (x, y) is at least one pair from the set of pairs {(i, j): i≠j, i,j∈{12, ... , 20}.
In one example, the three new combinations are (N12, Nx, Ny), where (x, y) is at least one pair from the set of pairs {(i, j): i≠j, i,j∈{13, ... , 20}.
In one example, the three new combinations are (N13, Nx, Ny), where (x, y) is at least one pair from the set of pairs {(i, j): i≠j, i,j∈{14, ... , 20}.
In one example, the three new combinations are (N14, Nx, Ny), where (x, y) is at least one pair from the set of pairs {(i, j): i≠j, i,j∈{15, ... , 20}.
In one example, the three new combinations are (N15, Nx, Ny), where (x, y) is at least one pair from the set of pairs {(i, j): i≠j, i,j∈{16, ... , 20}.
In one example, the three new combinations are (N16, Nx, Ny), where (x, y) is at least one pair from the set of pairs {(i, j): i≠j, i,j∈{17, ... , 20}.
In one example, the three new combinations are (N18, N19, N20).

In one example, $S_1$ includes 4 parameter combinations from legacy Rel. 16 table, e.g. paramCombination-r16=1-4 or 5-8, or $S_1$ includes each of the 8 parameter combinations from legacy Rel. 16 table, e.g. paramCombination-r16, and $S_2$ replaces, or adds, 4 parameter combination from legacy Rel. 16 table, e.g. paramCombination-r16=5-8 or 1-4, with three of the 12 new combinations shown in Table 8. Two examples are shown. In Ex1, either legacy β value is used or a new β value (different from legacy, and lower than legacy) is introduced. In Ex2, a new $β=cβ_{R16}$, where $β_{R16}$ is the legacy value and c<1 is a scaling.

In one example, the four new combinations are (N1, Nx, Ny, Nz), where (x, y, z) is at least one triple from the set of triples {(i, j, k): i≠j≠k, i,j,k∈{2,3, ... , 20}.
In one example, the four new combinations are (N2, Nx, Ny, Nz), where (x, y, z) is at least one triple from the set of triples {(i, j, k): i≠j≠k, i,j,k∈{3, ... , 20}.
In one example, the four new combinations are (N3, Nx, Ny, Nz), where (x, y, z) is at least one triple from the set of triples {(i,j,k): i≠j≠k, i,j,k∈{4, ... , 20}.
In one example, the four new combinations are (N4, Nx, Ny, Nz), where (x, y, z) is at least one triple from the set of triples {(i, j, k): i≠j≠k, i,j,k∈{5, ... , 20}.
In one example, the four new combinations are (N5, Nx, Ny, Nz), where (x, y, z) is at least one triple from the set of triples {(i, j, k):i≠j≠k, i,j,k∈{6, ... , 20}.
In one example, the four new combinations are (N6, Nx, Ny, Nz), where (x, y, z) is at least one triple from the set of triples {(i, j, k): i≠j≠k, i,j,k∈{7, ... , 20}.
In one example, the four new combinations are (N7, Nx, Ny, Nz), where (x, y, z) is at least one triple from the set of triples {(i, j, k): i≠j≠k, i,j,k∈{8, ... , 20}.
In one example, the four new combinations are (N8, Nx, Ny, Nz), where (x, y, z) is at least one triple from the set of triples {(i,j,k):i≠j≠k, i,j,k∈{9, ... , 20}.
In one example, the four new combinations are (N9, Nx, Ny, Nz), where (x, y, z) is at least one triple from the set of triples {(i, j, k): i≠j≠k, i,j,k∈{10, ... , 20}.
In one example, the four new combinations are (N10, Nx, Ny, Nz), where (x, y, z) is at least one triple from the set of triples {(i, j, k): i≠j≠k, i,j,k∈{11, ... , 20}.
In one example, the four new combinations are (N11, Nx, Ny, Nz), where (x, y, z) is at least one triple from the set of triples {(i, j, k):i≠j≠k, i,j,k∈{12, ... , 20}.
In one example, the four new combinations are (N12, Nx, Ny, Nz), where (x, y, z) is at least one triple from the set of triples {(i, j, k): i≠j≠k, i,j,k∈{13, ... , 20}.
In one example, the four new combinations are (N13, Nx, Ny, Nz), where (x, y, z) is at least one triple from the set of triples {(i, j, k): i≠j≠k, i,j,k∈{14, ... , 20}.
In one example, the four new combinations are (N14, Nx, Ny, Nz), where (x, y, z) is at least one triple from the set of triples {(i,j,k):i≠j≠k, i,j,k∈{15, ... , 20}.
In one example, the four new combinations are (N15, Nx, Ny, Nz), where (x, y, z) is at least one triple from the set of triples {(i, j, k): i≠j≠k, i,j,k∈{16, ... , 20}.
In one example, the four new combinations are (N16, Nx, Ny, Nz), where (x, y, z) is at least one triple from the set of triples {(i, j, k): i≠j≠k, i,j,k∈{17, ... , 20}.
In one example, the four new combinations are (N17, N18, N19, N20).

TABLE 10

| | paramCombination-Doppler-r18 | L | $p_v$ $v \in \{1, 2\}$ | $p_v$ $v \in \{3, 4\}$ | β |
|---|---|---|---|---|---|
| Legacy (Rel. 16) | C1 | 2 | 1/4 | 1/8 | 1/4 |
| | C2 | 2 | 1/4 | 1/8 | 1/2 |
| | C3 | 4 | 1/4 | 1/8 | 1/4 |
| | C4 | 4 | 1/4 | 1/8 | 1/2 |
| | C5 | 4 | 1/4 | 1/4 | 3/4 |
| | C6 | 4 | 1/2 | 1/4 | 1/2 |
| | C7 | 6 | 1/4 | — | 1/2 |
| | C8 | 6 | 1/4 | — | 3/4 |
| New | N13 | 2 | 1/8 | 1/16 | 1/8 |
| | N14 | 2 | 1/8 | 1/16 | 1/2 |
| | N15 | 2 | 1/8 | 1/16 | 1/4 |
| | N16 | 4 | 1/8 | 1/16 | 1/4 |
| | N5 | 4 | 1/4 | 1/4 | 1/4 |
| | N7 | 4 | 1/4 | 1/4 | 1/2 |
| | N17 | 4 | 1/2 | 1/4 | 1/4 |
| | N18 | 4 | 1/2 | 1/4 | 3/4 |
| | N19 | 6 | 1/8 | | 1/8 |
| | N20 | 6 | 1/2 | | 3/4 |

In one example, the UE 116 is configured with a Type II Doppler codebook, e.g. via higher layer parameter codebookConfig set to 'typeII-Doppler-r18', for a CSI reporting, wherein the parameter (L, $p_v$, β) is configured via a parameter paramCombination-Doppler-r18, which takes a value from a table that includes each of the of or a subset of the combinations shown in Table 10.

In one example, the table includes each of the combinations (C1-C8 from legacy Rel.16 Type II codebook, and N3-N16,N5,N7,N17-N20 new combinations).

In one example, the table includes a subset (S) of each of the combinations (C1-C8 from legacy Rel.16 Type II codebook, and N3-N16,N5,N7,N17-N20 new combinations).

In one example, the subset (S) includes each of the of or a subset of legacy combinations (C1-C8). In one example, the subset is common (hence one subset) regardless of $N_4$ or/and Q values. In one example, the subset can be different (hence, two subsets) depending on $N_4$ or/and Q values. For example, when $N_4$=1, the subset S=$T_1$ and when $N_4$>1 (e.g., 2, 4, 8), the subset S=$T_2$ where $T_1 \neq T_2$. Or, when Q=1, the subset S=$T_1$ and when Q>1 (e.g., 2), the subset S=$T_2$ where $T_1 \neq T_2$. For example, when $N_4$=1 or/and Q=1, the subset S=$T_1$ and when $N_4$>1 (e.g. 2, 4, 8) or/and Q>1 (e.g. 2), the subset S=$T_2$ where $T_1 \neq T_2$.

In one example, the subset (S) includes each of or a subset of new combinations (N3-N16,N5,N7,N17-N20). In one example, the subset is common (hence one subset) regardless of $N_4$ or/and Q values. In one example, the subset can be different (hence, two subsets) depending on $N_4$ or/and Q values. For example, when $N_4$=1, the subset S=$T_1$ and when $N_4$>1 (e.g., 2, 4, 8), the subset S=$T_2$ where $T_1 \neq T_2$. Or, when Q=1, the subset S=$T_1$ and when Q>1 (e.g., 2), the subset S=$T_2$ where $T_1 \neq T_2$. For example, when $N_4$=1 or/and Q=1, the subset S=$T_1$ and when $N_4$>1 (e.g. 2, 4, 8) or/and Q>1 (e.g. 2), the subset S=$T_2$ where $T_1 \neq T_2$.

In one example, the subset (S) includes each of or a subset ($S_1$) of legacy combinations (C1-C8) and a subset ($S_2$) of new combinations (N3-N16,N5,N7,N17-N20). In one example, the subset is common (hence one subset) regardless of $N_4$ or/and Q values. In one example, the subset can be different (hence, two subsets) depending on $N_4$ or/and Q values. For example, when $N_4$=1, the subset S=$T_1$ and when $N_4$>1 (e.g., 2, 4, 8), the subset S=$T_2$ where $T_1 \neq T_2$. Or, when Q=1, the subset S=$T_1$ and when Q>1 (e.g., 2), the subset S=$T_2$ where $T_1 \neq T_2$. For example, when $N_4$=1 or/and Q=1, the subset S=$T_1$ and when $N_4$>1 (e.g. 2, 4, 8) or/and Q>1 (e.g. 2), the subset S=$T_2$ where $T_1 \neq T_2$.

In one example, the at least 2 new combinations e.g., (N5,N7) replaces, 2 legacy combination, e.g. (C4,C5), as shown in Table 11, i.e., total number of supported combinations is 8, or replaces one legacy combination (e.g. C4), i.e., total number of supported combinations is 7 (e.g. C1-C3,C5-C8)+2 (e.g. N5,N7)=9, as shown in Table 12.

In one example, not any of the other new combinations shown in the tables is supported (hence not included).

In one example, 1 of the other new combinations shown in the tables is included in the table of supported combinations (hence can be configured), either without replacing any combination from "Legacy (Rel.16)+2 new combinations" or with replacing 1 combination from "Legacy (Rel.16)+2 new combinations".

In one example, the 1 new combination is N13. In one example, if 1 new combination replaces one legacy combination, then it replaces C1 or C2 or C3.

In one example, the 1 new combination is N14. In one example, if 1 new combination replaces one legacy combination, then it replaces C1 or C2 or C3.

In one example, the 1 new combination is N15. In one example, if 1 new combination replaces one legacy combination, then it replaces C1 or C2 or C3.

In one example, the 1 new combination is N16. In one example, if 1 new combination replaces one legacy combination, then it replaces C1 or C2 or C3.

In one example, the 1 new combination is N17.

In one example, the 1 new combination is N18.

In one example, the 1 new combination is N19.

In one example, the 1 new combination is N20.

In one example, 2 of the other new combinations shown in the table are supported (hence can be configured), either without replacing any combination from "Legacy (Rel.16)+2 new combinations" or with replacing 2 combinations from "Legacy (Rel.16)+2 new combinations".

In one example, the 2 new combinations are (N13, N14). In one example, if 2 new combinations replace 2 legacy combinations, then they replace (C1,C2) or (C2,C3) or (C1,C3).

In one example, the 2 new combinations are (N13, N15). In one example, if 2 new combinations replace 2 legacy combinations, then they replace (C1,C2) or (C2,C3) or (C1,C3).

In one example, the 2 new combinations are (N13, N16). In one example, if 2 new combinations replace 2 legacy combinations, then they replace (C1,C2) or (C2,C3) or (C1,C3).

In one example, the 2 new combinations are (N13, N17).

In one example, the 2 new combinations are (N13, N18).

In one example, the 2 new combinations are (N13, N19).

In one example, the 2 new combinations are (N13, N20).

In one example, the 2 new combinations are (N14, N15). In one example, if 2 new combinations replace 2 legacy combinations, then they replace (C1,C2) or (C2,C3) or (C1,C3).

In one example, the 2 new combinations are (N14, N16). In one example, if 2 new combinations replace 2 legacy combinations, then they replace (C1,C2) or (C2,C3) or (C1,C3).
In one example, the 2 new combinations are (N14, N17).
In one example, the 2 new combinations are (N14, N18).
In one example, the 2 new combinations are (N14, N19).
In one example, the 2 new combinations are (N14, N20).
In one example, the 2 new combinations are (N15, N16). In one example, if 2 new combinations replace 2 legacy combinations, then they replace (C1,C2) or (C2,C3) or (C1,C3).
In one example, the 2 new combinations are (N15, N17).
In one example, the 2 new combinations are (N15, N18).
In one example, the 2 new combinations are (N15, N19).
In one example, the 2 new combinations are (N15, N20).
In one example, the 2 new combinations are (N16, N17).
In one example, the 2 new combinations are (N16, N18).
In one example, the 2 new combinations are (N16, N19).
In one example, the 2 new combinations are (N16, N20).
In one example, the 2 new combinations are (N17, N18).
In one example, the 2 new combinations are (N17, N19).
In one example, the 2 new combinations are (N17, N20).
In one example, the 2 new combinations are (N18, N19).
In one example, the 2 new combinations are (N18, N20).
In one example, the 2 new combinations are (N19, N20).

TABLE 11

|  | paramCombination-Doppler-r18 | L | $p_v$ $v \in \{1,2\}$ | $p_v$ $v \in \{3,4\}$ | β |
|---|---|---|---|---|---|
| Legacy (Rel. 16) + 2 new combinations | C1 | 2 | 1/4 | 1/8 | 1/4 |
|  | C2 | 2 | 1/4 | 1/8 | 1/2 |
|  | C3 | 4 | 1/4 | 1/8 | 1/4 |
|  | N5 | 4 | 1/4 | 1/4 | 1/4 |
|  | N7 | 4 | 1/4 | 1/4 | 1/2 |
|  | C6 | 4 | 1/2 | 1/4 | 1/2 |
|  | C7 | 6 | 1/4 | — | 1/2 |
|  | C8 | 6 | 1/4 | — | 3/4 |
| Other new combinations | N13 | 2 | 1/8 | 1/16 | 1/8 |
|  | N14 | 2 | 1/8 | 1/16 | 1/2 |
|  | N15 | 2 | 1/8 | 1/16 | 1/4 |
|  | N16 | 4 | 1/8 | 1/16 | 1/4 |
|  | N17 | 4 | 1/2 | 1/4 | 1/4 |
|  | N18 | 4 | 1/2 | 1/4 | 3/4 |
|  | N19 | 6 | 1/8 |  | 1/8 |
|  | N20 | 6 | 1/2 |  | 3/4 |

TABLE 12

|  | paramCombination-Doppler-r18 | L | $p_v$ $v \in \{1,2\}$ | $p_v$ $v \in \{3,4\}$ | β |
|---|---|---|---|---|---|
| Legacy (Rel. 16) + 2 new combinations | C1 | 2 | 1/4 | 1/8 | 1/4 |
|  | C2 | 2 | 1/4 | 1/8 | 1/2 |
|  | C3 | 4 | 1/4 | 1/8 | 1/4 |
|  | N5 | 4 | 1/4 | 1/4 | 1/4 |
|  | N7 | 4 | 1/4 | 1/4 | 1/2 |
|  | C5 | 4 | 1/4 | 1/4 | 3/4 |
|  | C6 | 4 | 1/2 | 1/4 | 1/2 |
|  | C7 | 6 | 1/4 | — | 1/2 |
|  | C8 | 6 | 1/4 | — | 3/4 |
| Other new combinations | N13 | 2 | 1/8 | 1/16 | 1/8 |
|  | N14 | 2 | 1/8 | 1/16 | 1/2 |
|  | N15 | 2 | 1/8 | 1/16 | 1/4 |
|  | N16 | 4 | 1/8 | 1/16 | 1/4 |
|  | N17 | 4 | 1/2 | 1/4 | 1/4 |
|  | N18 | 4 | 1/2 | 1/4 | 3/4 |
|  | N19 | 6 | 1/8 |  | 1/8 |
|  | N20 | 6 | 1/2 |  | 3/4 |

In one example, the at least 4 new combinations e.g., (N14,N15,N5,N7) replaces, 2 legacy combination, e.g. (C2-C5), as shown in Table 13, i.e., total number of supported combinations is 8, or replaces 3 legacy combination (e.g. C2,3,4), i.e., total number of supported combinations is 7 (e.g. C1,C5-C8)+4=9, as shown in Table 14.
In one example, not any of the other new combinations shown in the table is supported (hence not included).
In one example, 1 of the other new combinations shown in the table is included in the table of supported combinations (hence can be configured), either without replacing any combination from "Legacy (Rel.16)+2 new combinations" or with replacing 1 combination from "Legacy (Rel.16)+2 new combinations".
In one example, the 1 new combination is N13.
In one example, the 1 new combination is N16.
In one example, the 1 new combination is N17.
In one example, the 1 new combination is N18.
In one example, the 1 new combination is N19.
In one example, the 1 new combination is N20.
In one example, 2 of the other new combinations shown in the table are supported (hence can be configured), either without replacing any combination from "Legacy (Rel.16)+2 new combinations" or with replacing 2 combinations from "Legacy (Rel.16)+2 new combinations".
In one example, the 2 new combinations are (N13, N16).
In one example, the 2 new combinations are (N13, N17).
In one example, the 2 new combinations are (N13, N18).
In one example, the 2 new combinations are (N13, N19).
In one example, the 2 new combinations are (N13, N20).
In one example, the 2 new combinations are (N16, N17).
In one example, the 2 new combinations are (N16, N18).
In one example, the 2 new combinations are (N16, N19).
In one example, the 2 new combinations are (N16, N20).
In one example, the 2 new combinations are (N17, N18).

In one example, the 2 new combinations are (N17, N19).

In one example, the 2 new combinations are (N17, N20).

In one example, the 2 new combinations are (N18, N19).

In one example, the 2 new combinations are (N18, N20).

In one example, the 2 new combinations are (N19, N20).

TABLE 13

| paramCombination-Doppler-r18 | | L | $v \in \{1, 2\}$ $p_v$ | $v \in \{3, 4\}$ $p_v$ | β |
|---|---|---|---|---|---|
| Legacy (Rel. 16) + 4 new combinations | C1 | 2 | 1/4 | 1/8 | 1/4 |
| | N14 | 2 | 1/8 | 1/16 | 1/2 |
| | N15 | 2 | 1/8 | 1/16 | 1/4 |
| | N5 | 4 | 1/4 | 1/4 | 1/4 |
| | N7 | 4 | 1/4 | 1/4 | 1/2 |
| | C6 | 4 | 1/2 | 1/4 | 1/2 |
| | C7 | 6 | 1/4 | — | 1/2 |
| | C8 | 6 | 1/4 | — | 3/4 |
| Other new combinations | N13 | 2 | 1/8 | 1/16 | 1/8 |
| | N16 | 4 | 1/8 | 1/16 | 1/4 |
| | N17 | 4 | 1/2 | 1/4 | 1/4 |
| | N18 | 4 | 1/2 | 1/4 | 3/4 |
| | N19 | 6 | 1/8 | | 1/8 |
| | N20 | 6 | 1/2 | | 3/4 |

TABLE 14

| paramCombination-Doppler-r18 | | L | $v \in \{1, 2\}$ $p_v$ | $v \in \{3, 4\}$ $p_v$ | β |
|---|---|---|---|---|---|
| Legacy (Rel. 16) + 4 new combinations | C1 | 2 | 1/4 | 1/8 | 1/4 |
| | N14 | 2 | 1/8 | 1/16 | 1/2 |
| | N15 | 2 | 1/8 | 1/16 | 1/4 |
| | N5 | 4 | 1/4 | 1/4 | 1/4 |
| | N7 | 4 | 1/4 | 1/4 | 1/2 |
| | C5 | 4 | 1/4 | 1/4 | 3/4 |
| | C6 | 4 | 1/2 | 1/4 | 1/2 |
| | C7 | 6 | 1/4 | — | 1/2 |
| | C8 | 6 | 1/4 | — | 3/4 |
| Other new combinations | N13 | 2 | 1/8 | 1/16 | 1/8 |
| | N16 | 4 | 1/8 | 1/16 | 1/4 |
| | N17 | 4 | 1/2 | 1/4 | 1/4 |
| | N18 | 4 | 1/2 | 1/4 | 3/4 |
| | N19 | 6 | 1/8 | | 1/8 |
| | N20 | 6 | 1/2 | | 3/4 |

In one example, the at least 4 new combinations e.g., (N14,N15,N5,N7) replaces, 2 legacy combination, e.g. (C2-C5), as shown in Table 15.

In one example, not any of the other new combinations shown in the table is supported (hence not included).

In one example, 1 of the other new combinations shown in the table is included in the table of supported combinations (hence can be configured), either without replacing any combination from "Legacy (Rel.16)+2 new combinations" or with replacing 1 combination from "Legacy (Rel.16)+2 new combinations".

In one example, the 1 new combination is N13.

In one example, the 1 new combination is N16.

In one example, the 1 new combination is N17.

In one example, the 1 new combination is N20.

In one example, 2 of the other new combinations shown in the table are supported (hence can be configured), either without replacing any combination from "Legacy (Rel.16)+2 new combinations" or with replacing 2 combinations from "Legacy (Rel.16)+2 new combinations".

In one example, the 2 new combinations are (N13, N16).

In one example, the 2 new combinations are (N13, N17).

In one example, the 2 new combinations are (N13, N20).

In one example, the 2 new combinations are (N16, N17).

In one example, the 2 new combinations are (N16, N20).

In one example, the 2 new combinations are (N17, N20).

TABLE 15

| paramCombination-Doppler-r18 | | L | $v \in \{1, 2\}$ $p_v$ | $v \in \{3, 4\}$ $p_v$ | β |
|---|---|---|---|---|---|
| Legacy (Rel. 16) + 4 new combinations | C1 | 2 | 1/4 | 1/8 | 1/4 |
| | N14 | 2 | 1/8 | 1/16 | 1/2 |
| | N15 | 2 | 1/8 | 1/16 | 1/4 |
| | N5 | 4 | 1/4 | 1/4 | 1/4 |
| | N7 | 4 | 1/4 | 1/4 | 1/2 |
| | C6 | 4 | 1/2 | 1/4 | 1/2 |
| | C7 | 6 | 1/4 | — | 1/2 |
| | C8 | 6 | 1/4 | — | 3/4 |
| Other new combinations | N13 | 2 | 1/8 | 1/16 | 1/8 |
| | N16 | 4 | 1/8 | 1/16 | 1/4 |
| | N17 | 4 | 1/2 | 1/4 | 1/4 |
| | N20 | 6 | 1/2 | | 3/4 |

In one example, the at least 4 new combinations e.g., (N14,N15,N5,N7) replaces, 2 legacy combination, e.g. (C2-C5) and C1 replaced with N1 or N4, or N8 or N10.

In one example, the combinations are as shown in Table 16.

In one example, not any of the other new combinations shown in the table is supported (hence not included).

In one example, 1 of the other new combinations shown in the table is included in the table of supported combinations (hence can be configured), either without replacing any combination from "Legacy (Rel.16)+2 new combinations" or with replacing 1 combination from "Legacy (Rel.16)+2 new combinations".

In one example, the 1 new combination is N16.

In one example, the 1 new combination is N17.

In one example, the 1 new combination is N20.

In one example, 2 of the other new combinations shown in the table are supported (hence can be configured), either without replacing any combination from "Legacy (Rel.16)+2 new combinations" or with replacing 2 combinations from "Legacy (Rel.16)+2 new combinations".

In one example, the 2 new combinations are (N16, N17).

In one example, the 2 new combinations are (N16, N20).

In one example, the 2 new combinations are (N17, N20).

TABLE 16

| paramCombination-Doppler-r18 | | L | $p_v$ $v \in \{1, 2\}$ | $v \in \{3, 4\}$ | β |
|---|---|---|---|---|---|
| Legacy (Rel. 16) + 4 new combinations | N13 | 2 | 1/8 | 1/16 | 1/8 |
| | N14 | 2 | 1/8 | 1/16 | 1/2 |
| | N15 | 2 | 1/8 | 1/16 | 1/4 |
| | N5 | 4 | 1/4 | 1/4 | 1/4 |
| | N7 | 4 | 1/4 | 1/4 | 1/2 |
| | C6 | 4 | 1/2 | 1/4 | 1/2 |
| | C7 | 6 | 1/4 | — | 1/2 |
| | C8 | 6 | 1/4 | — | 3/4 |
| Other new combinations | N16 | 4 | 1/8 | 1/16 | 1/4 |
| | N17 | 4 | 1/2 | 1/4 | 1/4 |
| | N20 | 6 | 1/2 | | 3/4 |

In one example, the combinations are as shown in Table 17.

In one example, not any of the other new combinations shown in the table is supported (hence not included).

In one example, 1 of the other new combinations shown in the table is included in the table of supported combinations (hence can be configured), either without replacing any combination from "Legacy (Rel.16)+2 new combinations" or with replacing 1 combination from "Legacy (Rel.16)+2 new combinations".

In one example, the 1 new combination is N13.

In one example, the 1 new combination is N17.

In one example, the 1 new combination is N20.

In one example, 2 of the other new combinations shown in the table are supported (hence can be configured), either without replacing any combination from "Legacy (Rel.16)+2 new combinations" or with replacing 2 combinations from "Legacy (Rel.16)+2 new combinations".

In one example, the 2 new combinations are (N13, N17).

In one example, the 2 new combinations are (N13, N20).

In one example, the 2 new combinations are (N17, N20).

TABLE 17

| paramCombination-Doppler-r18 | | L | $p_v$ $v \in \{1, 2\}$ | $v \in \{3, 4\}$ | β |
|---|---|---|---|---|---|
| Legacy (Rel. 16) + 4 new combinations | N16 | 4 | 1/8 | 1/16 | 1/4 |
| | N14 | 2 | 1/8 | 1/16 | 1/2 |
| | N15 | 2 | 1/8 | 1/16 | 1/4 |
| | N5 | 4 | 1/4 | 1/4 | 1/4 |
| | N7 | 4 | 1/4 | 1/4 | 1/2 |
| | C6 | 4 | 1/2 | 1/4 | 1/2 |
| | C7 | 6 | 1/4 | — | 1/2 |
| | C8 | 6 | 1/4 | — | 3/4 |
| Other new combinations | N13 | 2 | 1/8 | 1/16 | 1/8 |
| | N17 | 4 | 1/2 | 1/4 | 1/4 |
| | N20 | 6 | 1/2 | | 3/4 |

In one example, the combinations are as shown in Table 18.

In one example, not any of the other new combinations shown in the table is supported (hence not included).

In one example, 1 of the other new combinations shown in the table is included in the table of supported combinations (hence can be configured), either without replacing any combination from "Legacy (Rel.16)+2 new combinations" or with replacing 1 combination from "Legacy (Rel.16)+2 new combinations".

In one example, the 1 new combination is N13.

In one example, the 1 new combination is N16.

In one example, the 1 new combination is N20.

In one example, 2 of the other new combinations shown in the table are supported (hence can be configured), either without replacing any combination from "Legacy (Rel.16)+2 new combinations" or with replacing 2 combinations from "Legacy (Rel.16)+2 new combinations".

In one example, the 2 new combinations are (N13, N16).

In one example, the 2 new combinations are (N13, N20).

In one example, the 2 new combinations are (N16, N20).

TABLE 18

| paramCombination-Doppler-r18 | | L | $p_v$ $v \in \{1, 2\}$ | $v \in \{3, 4\}$ | β |
|---|---|---|---|---|---|
| Legacy (Rel. 16) + 4 new combinations | N17 | 4 | 1/2 | 1/4 | 1/4 |
| | N14 | 2 | 1/8 | 1/16 | 1/2 |
| | N15 | 2 | 1/8 | 1/16 | 1/4 |
| | N5 | 4 | 1/4 | 1/4 | 1/4 |
| | N7 | 4 | 1/4 | 1/4 | 1/2 |
| | C6 | 4 | 1/2 | 1/4 | 1/2 |
| | C7 | 6 | 1/4 | — | 1/2 |
| | C8 | 6 | 1/4 | — | 3/4 |
| Other new combinations | N13 | 2 | 1/8 | 1/16 | 1/8 |
| | N16 | 4 | 1/8 | 1/16 | 1/4 |
| | N20 | 6 | 1/2 | | 3/4 |

In one example, the combinations are as shown in Table 19.

In one example, not any of the other new combinations shown in the table is supported (hence not included).

In one example, 1 of the other new combinations shown in the table is included in the table of supported combinations (hence can be configured), either without replacing any combination from "Legacy (Rel.16)+2 new combinations" or with replacing 1 combination from "Legacy (Rel.16)+2 new combinations".

In one example, the 1 new combination is N13.

In one example, the 1 new combination is N16.

In one example, the 1 new combination is N18.

In one example, 2 of the other new combinations shown in the table are supported (hence can be configured), either without replacing any combination from "Legacy (Rel.16)+2 new combinations" or with replacing 2 combinations from "Legacy (Rel.16)+2 new combinations".

In one example, the 2 new combinations are (N13, N16).

In one example, the 2 new combinations are (N13, N17).

In one example, the 2 new combinations are (N16, N18).

TABLE 19

| | paramCombination-Doppler-r18 | L | $v \in \{1, 2\}$ | $v \in \{3, 4\}$ | β |
|---|---|---|---|---|---|
| Legacy (Rel. 16) + 4 new combinations | N20 | 6 | ½ | | ¾ |
| | N14 | 2 | ⅛ | ¹⁄₁₆ | ½ |
| | N15 | 2 | ⅛ | ¹⁄₁₆ | ¼ |
| | N5 | 4 | ¼ | ¼ | ¼ |
| | N7 | 4 | ¼ | ¼ | ½ |
| | C6 | 4 | ½ | ¼ | ½ |
| | C7 | 6 | ¼ | — | ½ |
| | C8 | 6 | ¼ | — | ¾ |
| Other new combinations | N13 | 2 | ⅛ | ¹⁄₁₆ | ⅛ |
| | N16 | 4 | ⅛ | ¹⁄₁₆ | ¼ |
| | N17 | 4 | ½ | ¼ | ¼ |

In one example, the combinations are as shown in Table 12.

In one example, not any of the other new combinations shown in the table is supported (hence not included).

In one example, 1 of the other new combinations shown in the table is included in the table of supported combinations (hence can be configured), either without replacing any combination from "Legacy (Rel.16)+2 new combinations" or with replacing 1 combination from "Legacy (Rel.16)+2 new combinations".

In one example, the 1 new combination is N14.

In one example, the 1 new combination is N15.

In one example, the 1 new combination is N16.

In one example, 2 of the other new combinations shown in the table are supported (hence can be configured), either without replacing any combination from "Legacy (Rel.16)+2 new combinations" or with replacing 2 combinations from "Legacy (Rel.16)+2 new combinations".

In one example, the 2 new combinations are (N14, N15).

In one example, the 2 new combinations are (N14, N16).

In one example, the 2 new combinations are (N15, N16).

In one example, each of the 3 of the other new combinations shown in the table are supported (hence can be configured), either without replacing any combination from "Legacy (Rel.16)+2 new combinations" or with replacing 3 combinations from "Legacy (Rel.16)+2 new combinations".

According to some of the examples herein, the table supported parameter combinations can be each of or a subset of combinations shown in Table 21 through Table 24.

TABLE 20

| | paramCombination-Doppler-r18 | L | $v \in \{1, 2\}$ | $v \in \{3, 4\}$ | β |
|---|---|---|---|---|---|
| Legacy (Rel. 16) + 2 new combinations | C1 | 2 | ¼ | ⅛ | ¼ |
| | C2 | 2 | ¼ | ⅛ | ½ |
| | C3 | 4 | ¼ | ⅛ | ¼ |
| | N5 | 4 | ¼ | ¼ | ¼ |
| | N7 | 4 | ¼ | ¼ | ½ |
| | C5 | 4 | ¼ | ¼ | ¾ |
| | C6 | 4 | ½ | ¼ | ½ |
| | C7 | 6 | ¼ | — | ½ |
| | C8 | 6 | ¼ | — | ¾ |

TABLE 20-continued

| | paramCombination-Doppler-r18 | L | $v \in \{1, 2\}$ | $v \in \{3, 4\}$ | β |
|---|---|---|---|---|---|
| Other new combinations | N14 | 2 | ⅛ | ¹⁄₁₆ | ½ |
| | N15 | 2 | ⅛ | ¹⁄₁₆ | ¼ |
| | N16 | 4 | ⅛ | ¹⁄₁₆ | ¼ |

TABLE 21

| | paramCombination-Doppler-r18 | L | $v \in \{1, 2\}$ | $v \in \{3, 4\}$ | β |
|---|---|---|---|---|---|
| Legacy (Rel. 16) + 2 new combinations | N15 | 2 | ⅛ | ¹⁄₁₆ | ¼ |
| | C2 | 2 | ¼ | ⅛ | ½ |
| | C3 | 4 | ¼ | ⅛ | ¼ |
| | N5 | 4 | ¼ | ¼ | ¼ |
| | N7 | 4 | ¼ | ¼ | ½ |
| | C5 | 4 | ¼ | ¼ | ¾ |
| | C6 | 4 | ½ | ¼ | ½ |
| | C7 | 6 | ¼ | — | ½ |
| | C8 | 6 | ¼ | — | ¾ |

TABLE 22

| | paramCombination-Doppler-r18 | L | $v \in \{1, 2\}$ | $v \in \{3, 4\}$ | β |
|---|---|---|---|---|---|
| Legacy (Rel. 16) + 2 new combinations | N14 | 2 | ⅛ | ¹⁄₁₆ | ½ |
| | C2 | 2 | ¼ | ⅛ | ½ |
| | C3 | 4 | ¼ | ⅛ | ¼ |
| | N5 | 4 | ¼ | ¼ | ¼ |
| | N7 | 4 | ¼ | ¼ | ½ |
| | C5 | 4 | ¼ | ¼ | ¾ |
| | C6 | 4 | ½ | ¼ | ½ |
| | C7 | 6 | ¼ | — | ½ |
| | C8 | 6 | ¼ | — | ¾ |

TABLE 23

| | paramCombination-Doppler-r18 | L | $v \in \{1, 2\}$ | $v \in \{3, 4\}$ | β |
|---|---|---|---|---|---|
| Legacy (Rel. 16) + 2 new combinations | N15 | 2 | ⅛ | ¹⁄₁₆ | ¼ |
| | N14 | 2 | ⅛ | ¹⁄₁₆ | ½ |
| | C3 | 4 | ¼ | ⅛ | ¼ |
| | N5 | 4 | ¼ | ¼ | ¼ |
| | N7 | 4 | ¼ | ¼ | ½ |
| | C5 | 4 | ¼ | ¼ | ¾ |
| | C6 | 4 | ½ | ¼ | ½ |
| | C7 | 6 | ¼ | — | ½ |
| | C8 | 6 | ¼ | — | ¾ |

In another embodiment, the supported parameter combinations (L, $p_v$, β) for the Type II Doppler codebook based on the Rel.16 based extension are the same as those for the legacy Rel. 16 parameter combinations, however, there is at least one restriction (in addition to the restrictions, if any, from legacy Rel.16).

In one example, the restriction corresponds to supporting only $N_4=1$ for paramCombination-Doppler-r18=7,8 or 1,2 (i.e., paramComb with L=6). Alternatively, the UE 116 is not expected to be configured with paramCombination-Doppler-r18=7,8 or 1,2 when $N_4>1$. Or the UE 116 is expected to be configured with paramCombination-Doppler-r18=1-6 or 3-8 when $N_4>1$. Alternatively, the UE 116 is not expected to be configured with $N_4>1$ when paramCombination-Doppler-r18=7,8 or 1,2. Or, the UE 116 is expected to be configured with $N_4=1$ when paramCombination-Doppler-r18=7,8 or 1,2.

In one example, the restriction corresponds to supporting only Q=1 for paramCombination-Doppler-r18=7,8 or 1,2 (i.e., paramComb with L=6). Alternatively, the UE 116 is not expected to be configured with paramCombination-Doppler-r18=7,8 or 1,2 when Q>1 (e.g., Q=2). Or the UE 116 is expected to be configured with paramCombination-Doppler-r18=1-6 or 3-8 when Q>1 (e.g., Q=2). Alternatively, the UE 116 is not expected to be configured with Q>1 (e.g., Q=2) when paramCombination-Doppler-r18=7,8 or 1,2. Or, the UE 116 is expected to be configured with Q=1 when paramCombination-Doppler-r18=7,8 or 1,2.

In one example, the restriction corresponds to supporting only $N_4=1$ and Q=1 for paramCombination-Doppler-r18=7,8 (i.e., paramComb with L=6). Alternatively, the UE 116 is not expected to be configured with paramCombination-Doppler-r18=7,8 when $N_4>1$ or Q>1 (e.g., Q=2). Or the UE 116 is expected to be configured with paramCombination-Doppler-r18=1-6 when $N_4>1$ or Q>1 (e.g., Q=2). Alternatively, the UE 116 is not expected to be configured with $N_4>1$ or/and Q>1 (e.g., Q=2) when paramCombination-Doppler-r18=7,8. Or, the UE 116 is expected to be configured with $N_4=1$ or/and Q=1 when paramCombination-Doppler-r18=7,8.

In one example, the restriction corresponds to supporting only $N_4=1$ for paramCombination-Doppler-r18=8 (i.e., paramComb with L=6). Alternatively, the UE 116 is not expected to be configured with paramCombination-Doppler-r18=8 when $N_4>1$. Or the UE 116 is expected to be configured with paramCombination-Doppler-r18=1-7 when $N_4>1$. Alternatively, the UE 116 is not expected to be configured with $N_4>1$ when paramCombination-Doppler-r18=8. Or the UE 116 is expected to be configured with $N_4=1$ when paramCombination-Doppler-r18=8.

In one example, the restriction corresponds to supporting only Q=1 for paramCombination-Doppler-r18=8 (i.e., paramComb with L=6). Alternatively, the UE 116 is not expected to be configured with paramCombination-Doppler-r18=8 when Q>1 (e.g., Q=2). Or the UE 116 is expected to be configured with paramCombination-Doppler-r18=1-7 when Q>1 (e.g., Q=2). Alternatively, the UE 116 is not expected to be configured with Q>1 (e.g., Q=2) when paramCombination-Doppler-r18=8. Or the UE 116 is expected to be configured with Q=1 when paramCombination-Doppler-r18=8.

In one example, the restriction corresponds to supporting only $N_4=1$ and Q=1 for paramCombination-Doppler-r18=8 (i.e., paramComb with L=6). Alternatively, the UE 116 is not expected to be configured with paramCombination-Doppler-r18=8 when $N_4>1$ or Q>1 (e.g., Q=2). Or the UE 116 is expected to be configured with paramCombination-Doppler-r18=1-7 when $N_4>1$ or Q>1 (e.g., Q=2). Alternatively, the UE 116 is not expected to be configured with $N_4>1$ or/and Q>1 (e.g., Q=2) when paramCombination-Doppler-r18=8. Or the UE 116 is expected to be configured with $N_4=1$ or/and Q=1 when paramCombination-Doppler-r18=8.

In one example, the restriction corresponds to supporting only $N_4 \leq t$ for paramCombination-Doppler-r18=7,8 (i.e., paramComb with L=6), where t is threshold, which can be fixed (e.g., 2), or configured, or reported by the UE 116 (e.g., via UE capability reporting, or CSI report). When t=2, $N_4$ can be 1 or 2. Alternatively, the UE 116 is not expected to be configured with paramCombination-Doppler-r18=7,8 when $N_4>t$. Or the UE 116 is expected to be configured with paramCombination-Doppler-r18=1-6 when $N_4>t$. Alternatively, the UE 116 is not expected to be configured with $N_4>t$ when paramCombination-Doppler-r18=7,8. Or, the UE 116 is expected to be configured with $N_4 \leq t$ when paramCombination-Doppler-r18=7,8.

In one example, the restriction corresponds to supporting only X=1 time domain (TD) CQI for paramCombination-Doppler-r18=7,8 (i.e., paramComb with L=6) Alternatively, the UE 116 is not expected to be configured with paramCombination-Doppler-r18=7,8 when X>1 (e.g., 2) TD CQIs are configured. Or the UE 116 is expected to be configured with paramCombination-Doppler-r18=1-6 when X>1 (e.g., 2) TD CQIs are configured. Alternatively, the UE 116 is not expected to be configured with X>1 (e.g., 2) TD CQIs when paramCombination-Doppler-r18=7,8. Or, the UE 116 is expected to be configured with X=1 TD CQI when paramCombination-Doppler-r18=7,8.

In another embodiment, when Q=1 or/and $N_4=1$, the supported parameter combinations (L, $p_v$, β) for the Type II Doppler codebook based on the Rel.16 based extension are the same as those for the legacy Rel. 16 parameter combinations. However, there can be at least one restriction (in addition to the restrictions, if any, from legacy Rel.16).

In one example, there is no additional restrictions (i.e., only legacy Rel. 16 restrictions are applied).

In one example, the restriction corresponds to supporting only a subset S of indices paramCombination-Doppler-r18=1-8, for example, S can include {1, . . . , 4}, {1, . . . , 5}, {1, . . . , 6}, or {1, . . . , 7} or {2, . . . , 8}, {3, . . . , 8}, or {4, . . . , 8}, or {5, . . . 8}.

In one example, the restriction corresponds to supporting only X=1 time domain (TD) CQI.

In one example, the restriction corresponds to supporting (i) only a subset S of indices paramCombination-Doppler-r18=1-8, for example, S can include {1, . . . , 4}, {1, . . . , 5}, {1, . . . , 6}, or {1, . . . , 7} or {2, . . . , 8}, {3, . . . , 8}, or {4, . . . , 8}, or {5, . . . 8}, and (ii) only X=1 time domain (TD) CQI.

In another embodiment, when Q>1 (e.g. 2) or/and $N_4>1$, the supported parameter combinations (L, $p_v$, β) for the Type II Doppler codebook based on the Rel.16 based extension are the same as those for the legacy Rel. 16 parameter combinations. However, there can be at least one restriction (in addition to the restrictions, if any, from legacy Rel.16).

In one example, there is no additional restrictions (i.e., only legacy Rel. 16 restrictions are applied).

In one example, the restriction corresponds to supporting only a subset S of indices paramCombination-Doppler-r18=1-8, for example, S can include {1, . . . , 4}, {1, . . . , 5}, {1, . . . , 6}, or {1, . . . , 7} or {2, . . . , 8}, {3, . . . , 8}, or {4, . . . , 8}, or {5, . . . 8}.

In one example, the restriction corresponds to supporting only X=1 time domain (TD) CQI.

In one example, the restriction corresponds to supporting (i) only a subset S of indices paramCombination-Doppler-r18=1-8, for example, S can include {1, . . . , 4}, {1, . . . , 5}, {1, . . . , 6}, or {1, . . . , 7} or $\{2, \ldots, 8\}$, $\{3, \ldots, 8\}$, or $\{4, \ldots, 8\}$, or $\{5, \ldots 8\}$, and (ii) only X=1 time domain (TD) CQI.

In another embodiment, the supported parameter combinations (M, α, β) for the Type II Port Selection Doppler codebook based on the Rel.17 based extension include (i) a subset $S_1$ of parameter combinations from the legacy Rel. 17 parameter combinations (Table 7), and (ii) either no additional parameter combination ($S_2$ is empty), or another subset $S_2$ of parameter combinations that are new (not supported in legacy Rel.17 parameter combinations). In one example, S is empty, i.e., there is no additional parameter combinations supported. In one example, $S_1$ includes $\{1, \ldots, 7\}$, $\{1, \ldots, 6\}$, or $\{1, \ldots, 5\}$, or $\{1, \ldots 4\}$ or $\{2, \ldots, 8\}$, $\{3, \ldots, 8\}$, or $\{4, \ldots, 8\}$, or $\{5, \ldots 8\}$. In one example, the supported parameter combinations can be for (a) $N_4$=1 or/and Q=1, or (a) $N_4$>1 (e.g., 2, 4, 8, 16) or/and Q>1 (e.g., 2), or (c) both (a) and (b).

In one example, $S_1$ includes 6 parameter combinations from legacy Rel. 17 table, e.g., paramCombination-r17=1-6, and $S_2$ replaces 2 parameter combinations from legacy Rel. 17 table, e.g., paramCombination-r17=7-8, with two of the 9 new combinations shown in Table 24. Two examples are shown. In Ex1, a new β value (different from legacy, and lower than legacy) is introduced. In Ex2, a new $β=cβ_{R17}$, where $β_{R17}$ is the legacy value and c<1 is a scaling.

In one example, the two new combinations are (N1, N2).
In one example, the two new combinations are (N1, N3).
In one example, the two new combinations are (N1, N4).
In one example, the two new combinations are (N1, N5).
In one example, the two new combinations are (N1, N6).
In one example, the two new combinations are (N1, N7).
In one example, the two new combinations are (N1, N8).
In one example, the two new combinations are (N1, N9).
In one example, the two new combinations are (N1, N10).
In one example, the two new combinations are (N1, N11).
In one example, the two new combinations are (N1, N12).
In one example, the two new combinations are (N2, N3).
In one example, the two new combinations are (N2, N4).
In one example, the two new combinations are (N2, N5).
In one example, the two new combinations are (N2, N6).
In one example, the two new combinations are (N2, N7).
In one example, the two new combinations are (N2, N8).
In one example, the two new combinations are (N2, N9).
In one example, the two new combinations are (N2, N10).
In one example, the two new combinations are (N2, N11).
In one example, the two new combinations are (N2, N12).
In one example, the two new combinations are (N3, N4).
In one example, the two new combinations are (N3, N5).
In one example, the two new combinations are (N3, N6).
In one example, the two new combinations are (N3, N7).
In one example, the two new combinations are (N3, N8).
In one example, the two new combinations are (N3, N9).
In one example, the two new combinations are (N3, N10).
In one example, the two new combinations are (N3, N11).
In one example, the two new combinations are (N3, N12).
In one example, the two new combinations are (N4, N5).
In one example, the two new combinations are (N4, N6).
In one example, the two new combinations are (N4, N7).
In one example, the two new combinations are (N4, N8).
In one example, the two new combinations are (N4, N9).
In one example, the two new combinations are (N4, N10).
In one example, the two new combinations are (N4, N11).
In one example, the two new combinations are (N4, N12).
In one example, the two new combinations are (N5, N6).
In one example, the two new combinations are (N5, N7).
In one example, the two new combinations are (N5, N8).
In one example, the two new combinations are (N5, N9).
In one example, the two new combinations are (N5, N10).
In one example, the two new combinations are (N5, N11).
In one example, the two new combinations are (N5, N12).
In one example, the two new combinations are (N6, N7).
In one example, the two new combinations are (N6, N8).
In one example, the two new combinations are (N6, N9).
In one example, the two new combinations are (N6, N10).
In one example, the two new combinations are (N6, N11).
In one example, the two new combinations are (N6, N12).
In one example, the two new combinations are (N7, N8).
In one example, the two new combinations are (N7, N9).
In one example, the two new combinations are (N7, N10).
In one example, the two new combinations are (N7, N11).
In one example, the two new combinations are (N7, N12).
In one example, the two new combinations are (N8, N9).
In one example, the two new combinations are (N8, N10).
In one example, the two new combinations are (N8, N11).
In one example, the two new combinations are (N8, N12).
In one example, the two new combinations are (N9, N10).
In one example, the two new combinations are (N9, N11).
In one example, the two new combinations are (N9, N12).
In one example, the two new combinations are (N10, N11).
In one example, the two new combinations are (N10, N12).
In one example, the two new combinations are (N11, N12).

TABLE 24

| New combinations | M | α | Ex1: β | Ex2 $β_{R17}$ | Ex2 c |
|---|---|---|---|---|---|
| N1 | 1 | 3/4 | 1/4 | 1/2 | 1/2 |
| N2 | 1 | 3/4 | 3/8 | 1/2 | 3/4 |
| N3 | 1 | 1 | 1/4 | 1/2 | 1/2 |
| N4 | 1 | 1 | 3/8 | 1/2 | 3/4 |
| N5 | 2 | 1/2 | 1/4 | 1/2 | 1/2 |
| N6 | 2 | 1/2 | 3/8 | 1/2 | 3/4 |
| N7 | 2 | 3/4 | 1/4 | 1/2 | 1/2 |
| N8 | 2 | 3/4 | 3/8 | 1/2 | 3/4 |
| N9 | 2 | 1 | 1/4 | 1/2 | 1/2 |
| N10 | 2 | 1 | 3/8 | 1/2 | 3/4 |
| N11 | 1 | 1/2 | 1/4 | | |
| N12 | 1 | 1/2 | 3/8 | | |

In one example, $S_1$ includes 7 parameter combinations from legacy Rel. 17 table, e.g., paramCombination-r17=1-7, and $S_2$ replaces 1 parameter combination from legacy Rel. 17 table, e.g., paramCombination-r17=8, with one of the 12 new combinations shown in Table 24.

In one example, the one new combination is N1.
In one example, the one new combination is N2.
In one example, the one new combination is N3.
In one example, the one new combination is N4.
In one example, the one new combination is N5.
In one example, the one new combination is N6.
In one example, the one new combination is N7.
In one example, the one new combination is N8.
In one example, the one new combination is N9.
In one example, the one new combination is N10.
In one example, the one new combination is N11.
In one example, the one new combination is N12.

In one example, $S_1$ includes 5 parameter combinations from legacy Rel. 17 table, e.g., paramCombination-r17=1-5, and $S_2$ replaces 3 parameter combination from legacy Rel. 17 table, e.g., paramCombination-r17=6-8, with three of the 12 new combinations shown in Table 24. Two examples are shown. In Ex1, a new β value (different from legacy, and lower than legacy) is introduced. In Ex2, a new $\beta=c\beta_{R17}$, where $\beta_{R17}$ is the legacy value and c<1 is a scaling.

In one example, the three new combinations are (N1, Nx, Ny), where (x, y) is at least one pair from the set of pairs {(i, j): i≠j, i,j∈{2,3, . . . , 12}.

In one example, the three new combinations are (N2, Nx, Ny), where (x, y) is at least one pair from the set of pairs {(i, j): i≠j, i,j∈{3, . . . , 12}.

In one example, the three new combinations are (N3, Nx, Ny), where (x, y) is at least one pair from the set of pairs {(i, j): i≠j, i,j∈{4, . . . , 12}.

In one example, the three new combinations are (N4, Nx, Ny), where (x, y) is at least one pair from the set of pairs {(i, j): i≠j, i,j∈{5, . . . , 12}.

In one example, the three new combinations are (N5, Nx, Ny), where (x, y) is at least one pair from the set of pairs {(i, j): i≠j, i,j∈{6, . . . , 12}.

In one example, the three new combinations are (N6, Nx, Ny), where (x, y) is at least one pair from the set of pairs {(i, j): i≠j, i,j∈{7, . . . , 12}.

In one example, the three new combinations are (N7, Nx, Ny), where (x, y) is at least one pair from the set of pairs {(i, j): i≠j, i,j∈{8, . . . , 12}.

In one example, the three new combinations are (N8, Nx, Ny), where (x, y) is at least one pair from the set of pairs {(i, j): i≠j, i,j∈{9, . . . , 12}.

In one example, the three new combinations are (N9, Nx, Ny), where (x, y) is at least one pair from the set of pairs {(i, j): i≠j, i,j∈{10, . . . , 12}.

In one example, the three new combinations are (N10, N11, N12).

In one example, $S_1$ includes 4 parameter combinations from legacy Rel. 17 table, e.g., paramCombination-r17=1-4, and $S_2$ replaces 4 parameter combination from legacy Rel. 17 table, e.g., paramCombination-r17=5-8, with three of the 12 new combinations shown in Table 24. Two examples are shown. In Ex1, a new β value (different from legacy, and lower than legacy) is introduced. In Ex2, a new $\beta=c\beta_{R17}$, where $\beta_{R17}$ is the legacy value and c<1 is a scaling.

In one example, the four new combinations are (N1, Nx, Ny, Nz), where (x, y, z) is at least one triple from the set of triples {(i, j, k): i≠j≠k, i,j,k∈{2,3, . . . , 12}.

In one example, the four new combinations are (N2, Nx, Ny, Nz), where (x, y, z) is at least one triple from the set of triples {(i, j, k): i≠j≠k, i,j,k∈{3, . . . , 12}.

In one example, the four new combinations are (N3, Nx, Ny, Nz), where (x, y, z) is at least one triple from the set of triples {(i, j, k): i≠j≠k, i,j,k∈{4, . . . , 12}.

In one example, the four new combinations are (N4, Nx, Ny, Nz), where (x, y, z) is at least one triple from the set of triples {(i, j, k): i≠j≠k, i,j,k∈{5, . . . , 12}.

In one example, the four new combinations are (N5, Nx, Ny, Nz), where (x, y, z) is at least one triple from the set of triples {(i, j, k): i≠j≠k, i,j,k∈{6, . . . , 12}.

In one example, the four new combinations are (N6, Nx, Ny, Nz), where (x, y, z) is at least one triple from the set of triples {(i, j, k): i≠j≠k, i,j,k∈{7, . . . , 12}.

In one example, the four new combinations are (N7, Nx, Ny, Nz), where (x, y, z) is at least one triple from the set of triples {(i, j, k): i≠j≠k, i,j,k∈{8, . . . , 12}.

In one example, the four new combinations are (N8, Nx, Ny, Nz), where (x, y, z) is at least one triple from the set of triples {(i, j, k): i≠j≠k, i,j,k∈{9, . . . , 12}.

In one example, the four new combinations are (N9, N10, N11, N12).

In one example, the UE 116 is configured with a Type II Port Selection Doppler codebook, e.g. via higher layer parameter codebookConfig set to 'typeII-PortSelection-Doppler-r18', for a CSI reporting, wherein the parameter (M, α, β) is configured via a parameter paramCombination-PortSelection-Doppler-r18, which takes a value from a table that includes each of or a subset of the combinations shown in tables in one or more examples described herein with the following mapping between L and α.

α values are derived from the L for Rel-16 based Doppler codebook, as described herein, where each α value is the nearest value of $$\min\left\{1, \frac{2L}{P_{CSI-RS}}\right\}$$

to {½, ¾, 1}, $P_{CSI-RS} \in \{4,8,12,16,24,32\}$.

α values are derived from the L for Rel-16 based Doppler codebook, as described herein, where each α value is the nearest value of $$\frac{2L}{P_{CSI-RS}}$$

to {½, ¾, 1}, $P_{CSI-RS} \in \{4,8,12,16,24,32\}$.

α values are derived from the L for Rel-16 based Doppler codebook, as described herein, where each α value is the value of $$\frac{2L}{P_{CSI-RS}}$$

and $P_{CSI-RS} \in \{4,8,12,16,24,32\}$.

Regarding (M, β), the legacy values are reused, with restriction on M=2, i.e., $P_{CSI-RS} \le t$, where t is a threshold (e.g., 16).

| M | β | Condition |
|---|---|---|
| 1 | ½ (or ⅛) | |
|   | ¾ | |
|   | 1 | |
| 2 | ½ (or ⅛) | $P_{CSI-RS} \le t$ |
|   | ¾ | $P_{CSI-RS} \le t$ |

In one embodiment, the supported parameter combinations (M, α, β) for the Type II Port selection Doppler codebook based on the Rel.17 based extension are the same as those for the legacy Rel. 17 parameter combinations. However, there is at least one restriction (in addition to the restrictions, if any, from legacy Rel.17).

In one example, the restriction corresponds to supporting only $N_4=1$ for paramCombinationPortSelection-Doppler-r18=7,8 (i.e., paramComb with M=2 and α=1). Alternatively, the UE 116 is not expected to be configured with paramCombination-PortSelection-Doppler-r18=7,8 when $N_4>1$. Or the UE 116 is expected to be configured with paramCombination-PortSelection-Doppler-r18=1-6 when $N_4>1$. Alternatively, the UE 116 is not expected to be configured with $N_4>1$ when paramCombination-PortSelection-Doppler-r18=7,8.

Or, the UE 116 is expected to be configured with $N_4=1$ when paramCombination-PortSelection-Doppler-r18=7,8.

In one example, the restriction corresponds to supporting only Q=1 for paramCombination-PortSelection-Doppler-r18=7,8 (i.e., paramComb with M=2 and a=1). Alternatively, the UE 116 is not expected to be configured with paramCombination-PortSelection-Doppler-r18=7,8 when Q>1 (e.g., Q=2). Or the UE 116 is expected to be configured with paramCombination-PortSelection-PortSelection-Doppler-r18=1-6 when Q>1 (e.g., Q=2). Alternatively, the UE 116 is not expected to be configured with Q>1 (e.g., Q=2) when paramCombination-PortSelection-Doppler-r18=7,8.

Or, the UE 116 is expected to be configured with Q=1 when paramCombination-PortSelection-Doppler-r18=7,8.

In one example, the restriction corresponds to supporting only $N_4=1$ and Q=1 for paramCombination-PortSelection-Doppler-r18=7,8 (i.e., paramComb with M=2 and a=1). Alternatively, the UE 116 is not expected to be configured with paramCombination-PortSelection-Doppler-r18=7,8 when $N_4>1$ or Q>1 (e.g., Q=2). Or the UE 116 is expected to be configured with paramCombination-PortSelection-Doppler-r18=1-6 when $N_4>1$ or Q>1 (e.g., Q=2). Alternatively, the UE 116 is not expected to be configured with $N_4>1$ or/and Q>1 (e.g., Q=2) when paramCombination-PortSelection-Doppler-r18=7,8. Or, the UE 116 is expected to be configured with $N_4=1$ or/and Q=1 when paramCombination-PortSelection-Doppler-r18=7,8.

In one example, the restriction corresponds to supporting only $N_4=1$ for paramCombination-PortSelection-Doppler-r18=8 (i.e., paramComb with M=2 and a=1). Alternatively, the UE 116 is not expected to be configured with paramCombination-PortSelection-Doppler-r18=8 when $N_4>1$. Or the UE 116 is expected to be configured with paramCombination-PortSelection-Doppler-r18=1-7 when $N_4>1$. Alternatively, the UE 116 is not expected to be configured with $N_4>1$ when paramCombination-PortSelection-Doppler-r18=8. Or the UE 116 is expected to be configured with $N_4=1$ when paramCombination-PortSelection-Doppler-r18=8.

In one example, the restriction corresponds to supporting only Q=1 for paramCombination-PortSelection-Doppler-r18=8 (i.e., paramComb with M=2 and a=1). Alternatively, the UE 116 is not expected to be configured with paramCombination-PortSelection-Doppler-r18=8 when Q>1 (e.g., Q=2). Or the UE 116 is expected to be configured with paramCombination-PortSelection-Doppler-r18=1-7 when Q>1 (e.g., Q=2). Alternatively, the UE 116 is not expected to be configured with Q>1 (e.g., Q=2) when paramCombination-PortSelection-Doppler-r18=8. Or the UE 116 is expected to be configured with Q=1 when paramCombination-PortSelection-Doppler-r18=8.

In one example, the restriction corresponds to supporting only $N_4=1$ and Q=1 for paramCombination-PortSelection-Doppler-r18=8 (i.e., paramComb with M=2 and a=1). Alternatively, the UE 116 is not expected to be configured with paramCombination-PortSelection-Doppler-r18=8 when $N_4>1$ or Q>1 (e.g., Q=2). Or the UE 116 is expected to be configured with paramCombination-PortSelection-Doppler-r18=1-7 when $N_4>1$ or Q>1 (e.g., Q=2). Alternatively, the UE 116 is not expected to be configured with $N_4>1$ or/and Q>1 (e.g., Q=2) when paramCombination-PortSelection-Doppler-r18=8. Or the UE 116 is expected to be configured with $N_4=1$ or/and Q=1 when paramCombination-PortSelection-Doppler-r18=8.

In one example, the restriction corresponds to supporting only $N_4 \leq t$ for paramCombination-PortSelection-Doppler-r18=7,8 (i.e., paramComb with M=2 and a=1), where t is threshold, which can be fixed (e.g., 2), or configured, or reported by the UE 116 (e.g., via UE capability reporting, or CSI report). When t=2, $N_4$ can be 1 or 2. Alternatively, the UE 116 is not expected to be configured with paramCombination-PortSelection-Doppler-r18=7,8 when $N_4>t$. Or the UE 116 is expected to be configured with paramCombination-PortSelection-Doppler-r18=1-6 when $N_4>t$. Alternatively, the UE 116 is not expected to be configured with $N_4>t$ when paramCombination-PortSelection-Doppler-r18=7,8. Or, the UE 116 is expected to be configured with $N_4 \leq t$ when paramCombination-PortSelection-Doppler-r18=7,8.

In one example, the restriction corresponds to supporting only X=1 time domain (TD) CQI for paramCombination-PortSelection-Doppler-r18=7,8 (i.e., paramComb with M=2 and α=1) Alternatively, the UE 116 is not expected to be configured with paramCombination-PortSelection-Doppler-r18=7,8 when X>1 (e.g., 2) TD CQIs are configured. Or the UE 116 is expected to be configured with paramCombination-PortSelection-Doppler-r18=1-6 when X>1 (e.g., 2) TD CQIs are configured. Alternatively, the UE 116 is not expected to be configured with X>1 (e.g., 2) TD CQIs when paramCombination-PortSelection-Doppler-r18=7,8.

Or, the UE 116 is expected to be configured with X=1 TD CQI when paramCombination-PortSelection-Doppler-r18=7,8.

In one embodiment, when Q=1 or/and $N_4=1$, the supported parameter combinations (M, α, β) for the Type II port selection Doppler codebook based on the Rel.17 based extension are the same as those for the legacy Rel. 17 parameter combinations, however, there can be at least one restriction (in addition to the restrictions, if any, from legacy Rel.17).

In one example, there is no additional restrictions (i.e., only legacy Rel. 17 restrictions are applied).

In one example, the restriction corresponds to supporting only a subset S of indices paramCombination-PortSelection-Doppler-r18=1-8, for example, S can include {1,2,3}, {1, . . . , 4}, {1, . . . , 5}, {1, . . . , 6}, or {1, . . . , 7}.

In one example, the restriction corresponds to supporting only X=1 time domain (TD) CQI.

In one example, the restriction corresponds to supporting (i) only a subset S of indices paramCombination-PortSelection-Doppler-r18=1-8, for example, S can include {1,2,3}, {1, . . . , 4}, {1, . . . , 5}, {1, . . . , 6}, or {1, . . . , 7}, and (ii) only X=1 time domain (TD) CQI.

In one example, the restriction corresponds to supporting only M=1.

In one example, the restriction corresponds to not supporting M=2.

In one example, the restriction corresponds to not supporting β=1.

In one example, the restriction corresponds to not supporting β=1 or β=¾.

In one example, the restriction corresponds to not supporting M=2 or β=1.

In one example, the restriction corresponds to not supporting M=2 or β=1 or β=¾.

In one embodiment, when Q>1 (e.g. 2) or/and $N_4>1$, the supported parameter combinations (M, α, β) for the Type II port selection Doppler codebook based on the Rel.17 based extension are the same as those for the legacy Rel. 17 parameter combinations, however, there can be at least one restriction (in addition to the restrictions, if any, from legacy Rel.17).

In one example, there is no additional restrictions (i.e., only legacy Rel. 17 restrictions are applied).

In one example, the restriction corresponds to supporting only a subset S of indices paramCombination-PortSelection-Doppler-r18=1-8, for example, S can include {1,2,3}, {1, . . . , 4}, {1, . . . , 5}, {1, . . . , 6}, or {1, . . . , 7}.

In one example, the restriction corresponds to supporting only X=1 time domain (TD) CQI.

In one example, the restriction corresponds to supporting (i) only a subset S of indices paramCombination-PortSelection-Doppler-r18=1-8, for example, S can include {1,2,3}, {1, . . . , 4}, {1, . . . , 5}, {1, . . . , 6}, or {1, . . . , 7}, and (ii) only X=1 time domain (TD) CQI.

In one example, the restriction corresponds to supporting only M=1.

In one example, the restriction corresponds to not supporting M=2.

In one example, the restriction corresponds to not supporting $\beta=1$.

In one example, the restriction corresponds to not supporting $\beta=1$ or $\beta=3/4$.

In one example, the restriction corresponds to not supporting M=2 or $\beta=1$.

In one example, the restriction corresponds to not supporting M=2 or $\beta=1$ or $\beta=3/4$.

Figure 20:
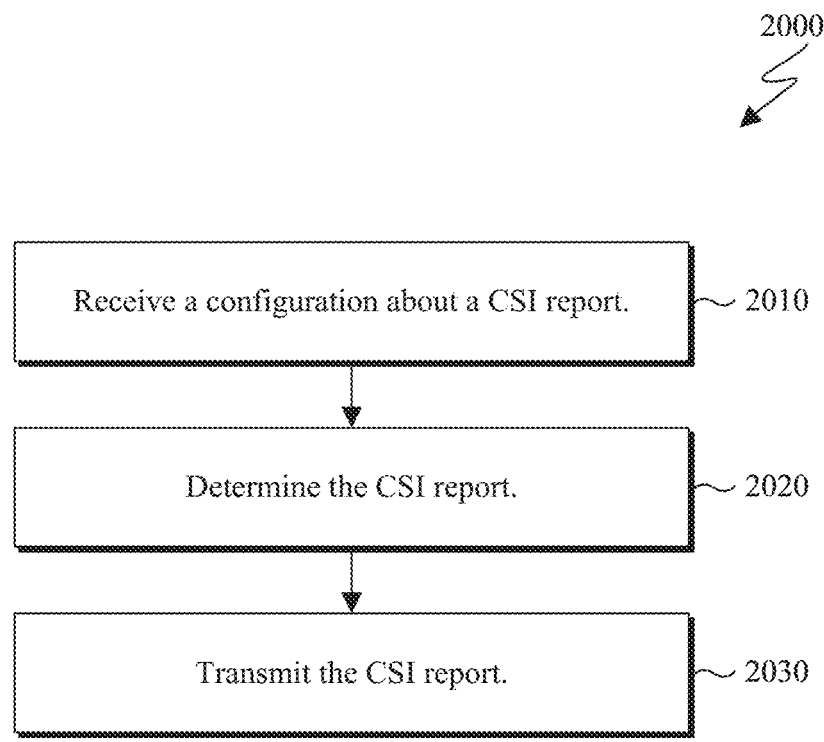
FIG. 20 illustrates an example method performed by a UE in a wireless communication system according to embodiments of the present disclosure.

FIG. 20 illustrates an example method 2000 performed by a UE in a wireless communication system according to embodiments of the present disclosure. The method 2000 of FIG. 20 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 2000 is for illustration only and other embodiments can be used without departing from the scope of the present disclosure.

The method 2000 begins with the UE receiving a configuration about a CSI report (2010). For example, in 2010, the configuration indicates a value of $N_4$, a value of paramCombination indicating values of three parameters, and a codebookType. N4 is a number of TD slot intervals.

In various embodiments, when the codebookType=typeII-Doppler-r18 the paramCombination corresponds to paramCombination-Doppler-r18, the three parameters correspond to (L, $p_\upsilon$, $\beta$), where v is a number of layers, and the value of $N_4$ belongs to a set including {1,2,4,8}. In various embodiments, the values of the three parameters are according to:

| | | $p_\upsilon$ | | |
|---|---|---|---|---|
| paramCombination-Doppler-r18 | L | $\upsilon \in$ {1, 2} | $\upsilon \in$ {3, 4} | $\beta$ |
| v1 | 2 | 1/8 | 1/16 | 1/4 |
| v2 | 2 | 1/4 | 1/8 | 1/2 |
| v3 | 4 | 1/4 | 1/8 | 1/4 |
| v4 | 4 | 1/4 | 1/4 | 1/4 |
| v5 | 4 | 1/4 | 1/4 | 1/2 |
| v6 | 4 | 1/4 | 1/4 | 3/4 |
| v7 | 4 | 1/2 | 1/4 | 1/2 |
| v8 | 6 | 1/4 | — | 1/2 |
| v9 | 6 | 1/4 | — | 3/4 |

In various embodiments, when the codebookType=typeII-Doppler-PortSelection-r18:the paramCombination corresponds to paramCombinationDoppler-PS-r18, the three parameters correspond to (M, $\alpha$, $\beta$), and the value of $N_4$=1. In various embodiments, a number of CQIs associated with $N_4$=1 TD slot interval is one. In various embodiments, the values of the three parameters are according to:

| paramCombinationDoppler-PS-r18 | M | $\alpha$ | $\beta$ |
|---|---|---|---|
| 1 | 1 | 3/4 | 1/2 |
| 2 | 1 | 1 | 1/2 |
| 3 | 1 | 1 | 3/4 |
| 4 | 1 | 1 | 1 |
| 5 | 2 | 1/2 | 1/2 |
| 6 | 2 | 3/4 | 1/2 |
| 7 | 2 | 1 | 1/2 |
| 8 | 2 | 1 | 3/4 |

The UE then, based on the configuration, determines the CSI report (2020). For example, in 2020, in various embodiments, the UE determines at least one of A vectors, each of length $$\frac{P_{CSIRS}}{2},$$

B vectors, each of length $N_3$, Q vectors, each of length $N_4$, when $N_4>1$, and 2C coefficients, C coefficients associated with each of two halves of $P_{CSIRS}$. The UE then determines the CSI report to include indicators indicating at least one of: (i) the A vectors, (ii) the B vectors, (ii) the Q vectors when $N_4>1$, and (iv) amplitude and phase of $K^{NZ}$ coefficients that are non-zero. Here, $N_3>1$, $K^{NZ}\le 2C$, and $P_{CSIRS}$ is a number of CSI-reference signal (RS) ports configured for the CSI report. For example, when the codebookType=typeII-Doppler-r18: A=L, B=$M_\upsilon$, C=ABQ when $N_4>1$, and C=AB when $N_4=1$. In another example, when the codebookType=typeII-Doppler-PortSelection-r18:

$$A = \frac{\alpha P_{CSIRS}}{2},$$

B=M, and C=AB. The UE then transmits the CSI report (2030).

Any of the above variation embodiments can be utilized independently or in combination with at least one other variation embodiment. The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE) comprising:
a transceiver configured to receive a configuration about a channel state information (CSI) report, the configuration indicating (i) a value of $N_4$, (ii) a value of paramCombination indicating values of three parameters, and (iii) a codebookType; and
a processor operably coupled to the transceiver, the processor, based on the configuration, configured to determine the CSI report,
wherein the transceiver is further configured to transmit the CSI report, and
wherein $N_4$ is a number of time-domain (TD) slot intervals.

2. The UE of claim 1, wherein, when the codebookType=typeII-Doppler-r18:
the paramCombination corresponds to paramCombination-Doppler-r18,
the three parameters correspond to (L, $p_v$, β), where v is a number of layers, and
the value of $N_4$ belongs to a set including {1,2,4,8}.

3. The UE of claim 2, wherein the values of the three parameters are according to:

| paramCombination-Doppler-r18 | L | $p_v$ v ∈ {1, 2} | $p_v$ v ∈ {3, 4} | β |
|---|---|---|---|---|
| v1 | 2 | 1/8 | 1/16 | 1/4 |
| v2 | 2 | 1/4 | 1/8 | 1/2 |
| v3 | 4 | 1/4 | 1/8 | 1/4 |
| v4 | 4 | 1/4 | 1/4 | 1/4 |
| v5 | 4 | 1/4 | 1/4 | 1/2 |
| v6 | 4 | 1/4 | 1/4 | 3/4 |
| v7 | 4 | 1/2 | 1/4 | 1/2 |
| v8 | 6 | 1/4 | — | 1/2 |
| v9 | 6 | 1/4 | — | 3/4. |

4. The UE of claim 1, wherein, when the codebookType=typeII-Doppler-PortSelection-r18:
the paramCombination corresponds to paramCombinationDoppler-PS-r18,
the three parameters correspond to (M, α, β), and
the value of $N_4$=1.

5. The UE of claim 4, wherein the values of the three parameters are according to:

| paramCombinationDoppler-PS-r18 | M | α | β |
|---|---|---|---|
| 1 | 1 | 3/4 | 1/2 |
| 2 | 1 | 1 | 1/2 |
| 3 | 1 | 1 | 3/4 |
| 4 | 1 | 1 | 1 |
| 5 | 2 | 1/2 | 1/2 |
| 6 | 2 | 3/4 | 1/2 |
| 7 | 2 | 1 | 1/2 |
| 8 | 2 | 1 | 3/4. |

6. The UE of claim 4, wherein a number of TD channel quality indicators (CQIs) associated with $N_4$=1 TD slot interval is one.

7. The UE of claim 1, wherein:
the processor is further configured to determine at least one of:
A vectors, each of length $$\frac{P_{CSIRS}}{2},$$

B vectors, each of length $N_3$,
Q vectors, each of length $N_4$, when $N_4$>1, and
2C coefficients, C coefficients associated with each of two halves of $P_{CSIRS}$; and
the transceiver is further configured to transmit the CSI report including indicators indicating at least one of: (i) the A vectors, (ii) the B vectors, (ii) the Q vectors when $N_4$>1, and (iv) amplitude and phase of $K^{NZ}$ coefficients that are non-zero,
$N_3$>1,
$K^{NZ}$≤2C,
$P_{CSIRS}$ is a number of CSI-reference signal (RS) ports configured for the CSI report,
when the codebookType=typeII-Doppler-r18:
A=L,
B=$M_v$,
C=ABQ when $N_4$>1, and
C=AB when $N_4$=1, and
when the codebookType=typeII-Doppler-PortSelection-r18:

$$A = \frac{\alpha P_{CSIRS}}{2},$$

B=M, and
C=AB.

8. A base station (BS) comprising:
a processor; and
a transceiver operably coupled to the processor, the transceiver configured to:
transmit a configuration about a channel state information (CSI) report, the configuration indicating (i) a value of $N_4$, (ii) a value of paramCombination indicating values of three parameters, and (iii) a codebookType; and
receive the CSI report,
wherein $N_4$ is a number of time-domain (TD) slot intervals.

9. The BS of claim 8, wherein, when the codebookType=typeII-Doppler-r18:
the paramCombination corresponds to paramCombination-Doppler-r18,
the three parameters correspond to (L, $p_v$, β), where v is a number of layers, and
the value of $N_4$ belongs to a set including {1,2,4,8}.

10. The BS of claim 9, wherein the values of the three parameters are according to:

| paramCombination-Doppler-r18 | L | $p_v$ v ∈ {1, 2} | $p_v$ v∈ {3, 4} | β |
|---|---|---|---|---|
| v1 | 2 | 1/8 | 1/16 | 1/4 |
| v2 | 2 | 1/4 | 1/8 | 1/2 |
| v3 | 4 | 1/4 | 1/8 | 1/4 |
| v4 | 4 | 1/4 | 1/4 | 1/4 |
| v5 | 4 | 1/4 | 1/4 | 1/2 |
| v6 | 4 | 1/4 | 1/4 | 3/4 |
| v7 | 4 | 1/2 | 1/4 | 1/2 |

-continued

| paramCombination-Doppler-r18 | L | $P_\upsilon$ $\upsilon \in \{1, 2\}$ | $\upsilon \in \{3, 4\}$ | β |
|---|---|---|---|---|
| v8 | 6 | ¼ | — | ½ |
| v9 | 6 | ¼ | — | ¾. |

11. The BS of claim 8, wherein, when the codebookType=typeII-Doppler-PortSelection-r18:
the paramCombination corresponds to paramCombinationDoppler-PS-r18,
the three parameters correspond to (M, α, β), and
the value of $N_4=1$.

12. The BS of claim 11, wherein the values of the three parameters are according to:

| paramCombinationDoppler-PS-r18 | M | α | β |
|---|---|---|---|
| 1 | 1 | ¾ | ½ |
| 2 | 1 | 1 | ½ |
| 3 | 1 | 1 | ¾ |
| 4 | 1 | 1 | 1 |
| 5 | 2 | ½ | ½ |
| 6 | 2 | ¾ | ½ |
| 7 | 2 | 1 | ½ |
| 8 | 2 | 1 | ¾. |

13. The BS of claim 11, wherein a number of TD channel quality indicators (CQIs) associated with $N_4=1$ TD slot interval is one.

14. The BS of claim 8, wherein:
the CSI report includes indicators indicating at least one of:
A vectors, each of length $$\frac{P_{CSIRS}}{2},$$

B vectors, each of length $N_3$,
Q vectors, each of length $N_4$, when $N_4>1$, and
amplitude and phase of $K^{NZ}$ coefficients that are non-zero,
$N_3>1$,
$K^{NZ} \leq 2C$,
$P_{CSIRS}$ is a number of CSI-reference signal (RS) ports configured for the CSI report,
when the codebookType=typeII-Doppler-r18:
A=L,
B=$M_\upsilon$,
C=ABQ when $N_4>1$, and
C=AB when $N_4=1$, and
when the codebookType=typeII-Doppler-PortSelection-r18:

$$A = \frac{\alpha P_{CSIRS}}{2},$$

B=M, and
C=AB.

15. A method performed by a user equipment (UE), the method comprising:
receiving a configuration about a channel state information (CSI) report, the configuration indicating (i) a value of $N_4$, (ii) a value of paramCombination indicating values of three parameters, and (iii) a codebookType;
determining the CSI report based on the configuration; and
transmitting the CSI report,
wherein $N_4$ is a number of time-domain (TD) slot intervals.

16. The method of claim 15, wherein, when the codebookType=typeII-Doppler-r18:
the paramCombination corresponds to paramCombination-Doppler-r18,
the three parameters correspond to (L, $p_\upsilon$, β), where v is a number of layers, and
the value of $N_4$ belongs to a set including {1,2,4,8}.

17. The method of claim 16, wherein the values of the three parameters are according to:

| paramCombination-Doppler-r18 | L | $P_\upsilon$ $\upsilon \in \{1, 2\}$ | $\upsilon \in \{3, 4\}$ | β |
|---|---|---|---|---|
| v1 | 2 | ⅛ | 1/16 | ¼ |
| v2 | 2 | ¼ | ⅛ | ½ |
| v3 | 4 | ¼ | ⅛ | ¼ |
| v4 | 4 | ¼ | ¼ | ¼ |
| v5 | 4 | ¼ | ¼ | ½ |
| v6 | 4 | ¼ | ¼ | ¾ |
| v7 | 4 | ½ | ¼ | ½ |
| v8 | 6 | ¼ | — | ½ |
| v9 | 6 | ¼ | — | ¾. |

18. The method of claim 15, wherein, when the codebookType=typeII-Doppler-PortSelection-r18:
the paramCombination corresponds to paramCombinationDoppler-PS-r18,
the three parameters correspond to (M, α, β), and
the value of $N_4=1$.

19. The method of claim 18, wherein the values of the three parameters are according to:

| paramCombinationDoppler-PS-r18 | M | α | β |
|---|---|---|---|
| 1 | 1 | ¾ | ½ |
| 2 | 1 | 1 | ½ |
| 3 | 1 | 1 | ¾ |
| 4 | 1 | 1 | 1 |
| 5 | 2 | ½ | ½ |
| 6 | 2 | ¾ | ½ |
| 7 | 2 | 1 | ½ |
| 8 | 2 | 1 | ¾. |

20. The method of claim 18, wherein a number of TD channel quality indicators (CQIs) associated with $N_4=1$ TD slot interval is one.

* * * * *